United States Patent [19]
Terada et al.

[11] Patent Number: 5,932,136
[45] Date of Patent: Aug. 3, 1999

[54] LIQUID CRYSTAL DEVICE AND LIQUID CRYSTAL APPARATUS

[75] Inventors: Masahiro Terada, Hadano; Yukio Hanyu, Isehara; Koichi Sato, Atsugi; Hirokatsu Miyata, Hadano; Syuji Yamada, Atsugi; Yasufumi Asao, Isehara; Takashi Moriyama, Atsugi, all of Japan

[73] Assignee: Canon Kabushiki Kaisha, Tokyo, Japan

[21] Appl. No.: 08/733,773

[22] Filed: Oct. 18, 1996

[30] Foreign Application Priority Data

Oct. 20, 1995 [JP] Japan ..................... 7-272737

[51] Int. Cl.$^6$ .................. C09K 19/52; G02F 1/1333
[52] U.S. Cl. ................. 252/299.01; 252/299.4; 252/299.5; 252/299.6; 349/126; 349/128; 349/129; 349/134; 349/135; 349/136; 349/171; 349/172; 349/184; 428/1
[58] Field of Search ............... 252/299.01, 299.4, 252/299.6, 299.61, 299.62, 299.63, 299.64, 299.65, 299.66, 299.67; 349/184, 126, 128, 129, 134, 135, 136, 171, 172; 428/1

[56] References Cited

U.S. PATENT DOCUMENTS

| | | | |
|---|---|---|---|
| 4,367,924 | 1/1983 | Clark et al. | 350/334 |
| 4,655,561 | 4/1987 | Kanbe et al. | 359/56 |
| 4,932,758 | 6/1990 | Hanyu et al. | 359/350 |

(List continued on next page.)

FOREIGN PATENT DOCUMENTS

| | | |
|---|---|---|
| 0360521 | 3/1990 | European Pat. Off. . |
| 0588012 | 3/1994 | European Pat. Off. . |
| 0637622 | 2/1995 | European Pat. Off. . |
| 0682098 | 11/1995 | European Pat. Off. . |
| 0694599 | 1/1996 | European Pat. Off. . |
| 59 193426 | 11/1984 | Japan . |
| 59 193427 | 11/1984 | Japan . |
| 60 156046 | 8/1985 | Japan . |
| 60 156047 | 8/1985 | Japan . |
| 2 142753 | 5/1990 | Japan . |
| 6347796 | 12/1994 | Japan . |
| WO93 22396 | 11/1993 | WIPO . |

OTHER PUBLICATIONS

Yukio Ouchi et al., Smectic C*Chevron Layer Structure Studied by X–Ray Diffraction, Apr. 18, 1988, pp. L725–L728.
N.A. Clark et al., Structures and Applications of SSFLC Devices, Sep. 30, to Oct. 2, 1986, pp. 456–458, 1986.
M. Schadt et al, Voltage–Dependent Optical Activity of a Twisted Nematic Liquid Crystal, Feb. 15, 1971, pp. 127–128.
A. Fukuda et al., Structures and Properties of Ferroelectric Liquid Crystals, 1990, pp. 344–357.
M.D. Radcliffe et al., Smectic A and Smectic C Materials with Large Negative Thermal Expansion Coefficients, 1993, p. 46.

*Primary Examiner*—Shean C. Wu
*Attorney, Agent, or Firm*—Fitzpatrick, Cella, Harper & Scinto

[57] ABSTRACT

A liquid crystal device is constituted by a pair of substrates each having thereon an electrode, and a smectic liquid crystal having a plurality of smectic liquid crystal layers disposed between the substrates. The smectic liquid crystal is disposed to form a first region wherein the smectic liquid crystal layers are aligned to have a layer inclination angle smaller than a calculated layer inclination angle based on a temperature-dependent layer spacing-changing characteristic or are aligned in a direction perpendicular to the substrates to form a bookshelf structure, and a second region wherein the smectic liquid crystal layers are aligned to form a chevron structure having a substantial layer inclination angle or having a layer inclination angle substantially equal to a calculated layer inclination angle based on a temperature-dependent layer spacing-changing characteristic. The liquid crystal device having the first an second regions described above is effective in improving a contrast ratio and a driven margin parameter.

73 Claims, 14 Drawing Sheets

U.S. PATENT DOCUMENTS

| | | | |
|---|---|---|---|
| 5,013,137 | 5/1991 | Tsuboyama et al. | 350/333 |
| 5,082,587 | 1/1992 | Janulis | 252/299.01 |
| 5,092,665 | 3/1992 | Kanbe et al. | 359/56 |
| 5,093,737 | 3/1992 | Kanbe et al. | 359/56 |
| 5,189,536 | 2/1993 | Hanyu et al. | 359/56 |
| 5,200,848 | 4/1993 | Hanyu et al. | 359/100 |
| 5,262,082 | 11/1993 | Janulis et al. | 252/299.01 |
| 5,305,131 | 4/1994 | Terada et al. | 359/104 |
| 5,381,254 | 1/1995 | Kanbe et al. | 359/54 |
| 5,418,634 | 5/1995 | Kanbe et al. | 359/56 |
| 5,453,861 | 9/1995 | Shinjo et al. | 359/78 |
| 5,543,943 | 8/1996 | Hanyu et al. | 359/43 |
| 5,557,435 | 9/1996 | Hanyu et al. | 359/75 |
| 5,568,295 | 10/1996 | Nakamura et al. | 359/75 |
| 5,582,763 | 12/1996 | Yamada et al. | 252/299.01 |
| 5,583,680 | 12/1996 | Nakamura et al. | 349/134 |
| 5,583,682 | 12/1996 | Kitayama et al. | 349/172 |
| 5,641,427 | 6/1997 | Shinjo et al. | 252/299.01 |
| 5,786,879 | 7/1998 | Kodera et al. | 349/134 |
| 5,822,031 | 10/1998 | Kodera et al. | 349/172 |

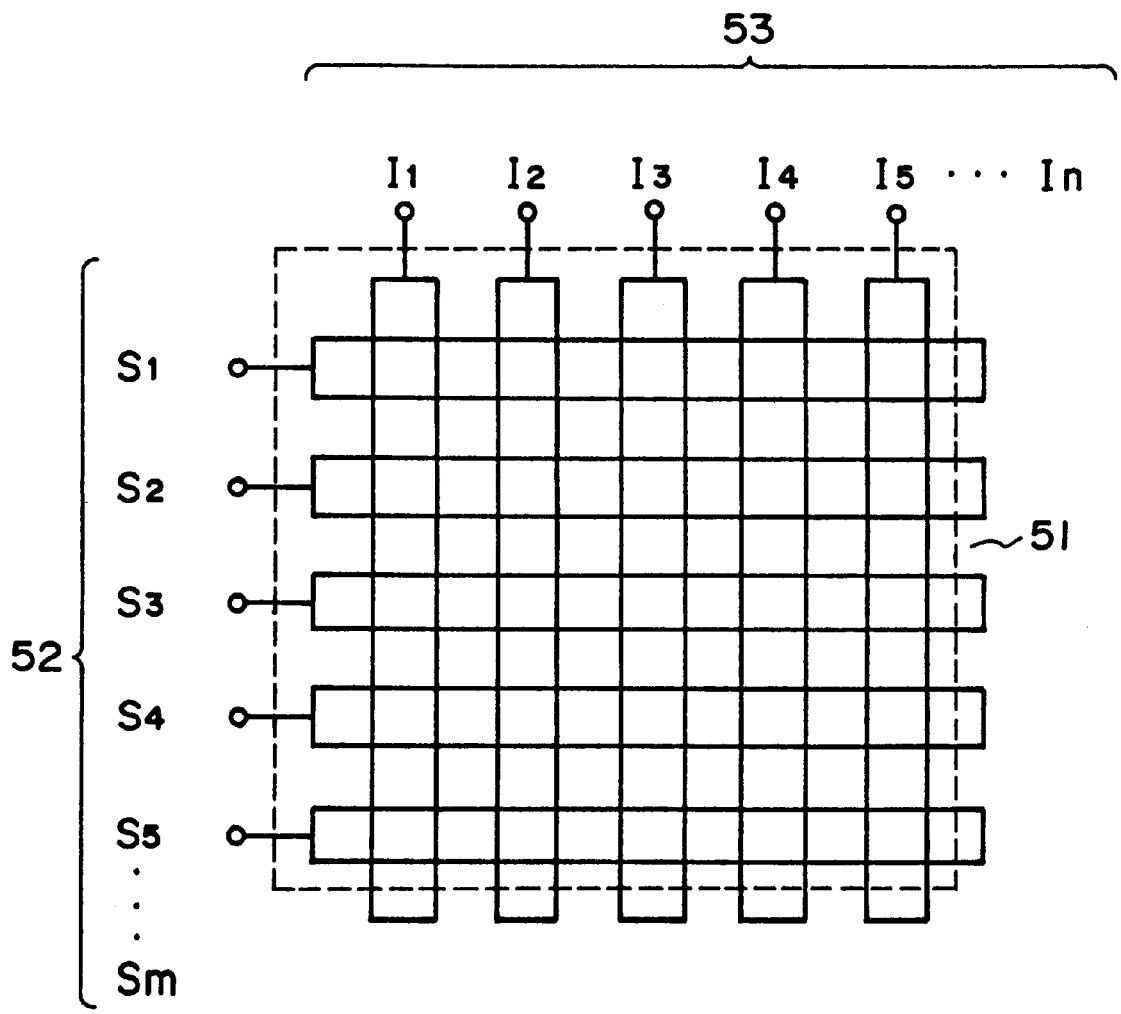
F I G. 5

LIQUID CRYSTAL DEVICE AND LIQUID CRYSTAL APPARATUS

FIELD OF THE INVENTION AND RELATED ART

The present invention relates to a liquid crystal device using a smectic liquid crystal for use in light-valves for flat-panel displays, projection displays, printers, etc. The present invention also relates to a liquid crystal apparatus, particularly a liquid crystal display apparatus, using the liquid crystal device.

As a type of a liquid crystal device widely used theretofore, there has been known a liquid crystal device, including a type using a twisted nematic (TN) liquid crystal as disclosed by M. Schadt and W. Helfrich, "Applied Physics Letters", Vol. 18, No. 4 (Feb. 17, 1971), pp. 127–128.

The liquid crystal device using a TN-liquid crystal includes a simple matrix-type liquid crystal device which is advantageous from a viewpoint of easy device preparation and production cost. This type of liquid crystal device is however accompanied with a problem that it is liable to cause crosstalk when driven in a multiplex manner by using an electrode matrix of a high pixel density, and therefore the number of pixels is retracted. Further, such a liquid crystal device provides a slow response speed of 10 milli-seconds or above, thus being only applicable to restricted uses for displays.

In contrast with such a simple matrix-type liquid crystal device, a TFT-type liquid crystal device has been developed in recent years, wherein each pixel is provided with and driven with a TFT (thin film transistor). As a result, the problems of crosstalk and response speed can be solved but, on the other hand, a larger area device of the type poses an extreme difficulty in industrial production thereof without inferior pixels. Further, even if such production is possible, the production cost can be increased enormously.

For providing improvements to the above-mentioned difficulties of the conventional types of liquid crystal devices, a liquid crystal device using a liquid crystal exhibiting bistability, has been proposed by Clark and Lagerwall (Japanese Laid-Open Patent Application (JP-A) 56-107216, U.S. Pat. No. 4,367,924). As the liquid crystal exhibiting bistability, a chiral smectic or ferroelectric liquid crystal having chiral smectic C phase (SmC*) is generally used. Such a chiral smectic (ferroelectric) liquid crystal has a very quick response speed because it causes inversion switching based on its spontaneous polarization. Thus, the chiral smectic liquid crystal develops bistable states showing a memory characteristic and further has an excellent viewing angle characteristic. Accordingly, the chiral smectic liquid crystal is considered to be suitable for constituting a display device or a light valve of a high speed, a high resolution and a large area.

Such a chiral smectic liquid crystal is accompanied with problems, such as the occurrence of zigzag-shaped alignment defects leading to a remarkable lowering in contrast (as described in, e.g., "Structures and Properties of Ferroelectric Liquid Crystals" (in Japanese) authored by Atsuo Fukuda and Hideo Takezoe; Corona Publishing Co. Ltd., (1990)). The defects are considered to be attributable to a smectic layer structure of a chiral smectic liquid crystal including two types of chevron structures different in bending direction between a pair of substrates and its bending angle (i.e., a layer inclination angle $\delta$ based on the substrate normal).

In recent years, there have been studied a method for forming a liquid crystal layer structure not of the bent chevron structure having the above defects but of a bookshelf structure wherein smectic liquid crystal layers are substantially perpendicular to the substrate or a structure close thereto, thereby realizing a liquid crystal device providing a high contrast.

For instance, as a liquid crystal material providing a bookshelf structure or a structure close thereto, a mesomorphic compound having a perfluoroalkyl ether terminal chain (U.S. Pat. No. 5,262,082), a liquid crystal composition containing such a mesomorphic compound (Marc D. Radcliffe et al. The 4th International Ferroelectric Liquid Crystal Conference, p-46 (1993)), etc., have been proposed. By using such a liquid crystal material, it is possible to provide a bookshelf structure or a similar structure having a small layer inclination angle based on properties of the liquid crystal material per se.

However, according to our detailed observation, an inclination angle $\delta$ of a smectic layer is essentially generated due to a temperature dependence of a change in layer spacing, i.e., width of respective smectic layers and therefore has a certain value which is below several degrees but not zero degrees. Accordingly, in case where an alignment control is not effected sufficiently and precisely, disclination lines due to discontinuity of a layer structure in the presence of the bent smectic layers are confirmed although the above-mentioned zig-zag defects due to the chevron structure are not confirmed clearly in many cases.

In case where a liquid crystal device having such a liquid crystal-aligning characteristic is used as a display device of a simple matrix-driving scheme, when data signals similar to alternating signal are applied continuously, increases in reverse domains of liquid crystal molecules generated from the above disclination lines and in a degree of fluctuation in molecular position on a switching cone are caused. As a result, the liquid crystal device has provided a small drive margin and has caused a phenomenon such that a contrast at the time of driving is abruptly decreased.

SUMMARY OF THE INVENTION

In view of the above-mentioned circumstances, an object of the present invention is to provide a liquid crystal device using a chiral smectic liquid crystal or ferroelectric liquid crystal capable of providing a high contrast and a large drive margin and capable of suppressing a lowering in contrast at the time of drive of the device.

Another object of the present invention is to provide a liquid crystal apparatus using the liquid crystal device.

According to a first aspect of the present invention, there is provided a liquid crystal device, comprising: a pair of substrates each having thereon an electrode, and a smectic liquid crystal having a plurality of smectic liquid crystal layers disposed between the substrates, wherein the smectic liquid crystal is disposed to form a first region wherein the smectic liquid crystal layers are aligned to have a layer inclination angle smaller than a calculated layer inclination angle based on a temperature-dependent layer spacing-changing characteristic, and a second region wherein the smectic liquid crystal layers are aligned to form a chevron structure having a substantial layer inclination angle.

According to a second aspect of the present invention, there is provided a liquid crystal device, comprising: a pair of substrates each having thereon an electrode, and a smectic liquid crystal having a plurality of smectic liquid crystal layers disposed between the substrates, wherein the smectic liquid crystal is disposed to form a first region wherein the smectic liquid crystal layers are aligned to have a layer inclination angle smaller than a calculated layer inclination angle based on a temperature-dependent layer spacing-changing characteristic, and a second region wherein the smectic liquid crystal layers are aligned to form a chevron structure having a layer inclination angle substantially equal to a calculated layer inclination angle based on a temperature-dependent layer spacing-changing characteristic.

According to a third aspect of the present invention, there is provided a liquid crystal device, comprising: a pair of substrates each having thereon an electrode, and a smectic liquid crystal having a plurality of smectic liquid crystal layers disposed between the substrates, wherein the smectic liquid crystal is disposed to form a first region wherein the smectic liquid crystal layers are aligned in a direction substantially perpendicular to the substrates to form a bookshelf structure, and a second region wherein the smectic liquid crystal layers are aligned to form a chevron structure having a substantial layer inclination angle.

According to a fourth aspect of the present invention, there is provided a liquid crystal device, comprising: a pair of substrates each having thereon an electrode, and a smectic liquid crystal having a plurality of smectic liquid crystal layers disposed between the substrates, wherein the smectic liquid crystal is disposed to form a first region wherein the smectic liquid crystal layers are aligned in a direction substantially perpendicular to the substrates to a form a bookshelf structure, and a second region wherein the smectic liquid crystal layers are aligned to form a chevron structure having a layer inclination angle substantially equal to a calculated layer inclination angle based on a temperature-dependent layer spacing-changing characteristic.

The present invention further provides liquid crystal apparatus including one of the above-mentioned liquid crystal devices of the first to fourth aspects and a drive means for driving the device.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 5 is a plan view of an electrode matrix.

FIGS. 16A, 16B and 16C are respectively a schematic illustration of a smectic layer structure wherein FIG. 16A shows a conventional chevron structure; FIG. 16B shows a bookshelf structure in a first (P1) region and a chevron structure in a second (P2) region wherein smectic liquid crystal layers are bent in the same direction, with respect to a smectic liquid crystal incorporated in the liquid crystal device of the present invention; and FIG. 16C shows a bookshelf structure in a first (P1) region and a chevron structure in a second (P2) region wherein smectic liquid crystal layer are bent in different two directions, with respect to a smectic liquid crystal incorporated in the liquid crystal device of the present invention.

DETAILED DESCRIPTION OF THE PREFERRED EMBODIMENTS

Figure 1:
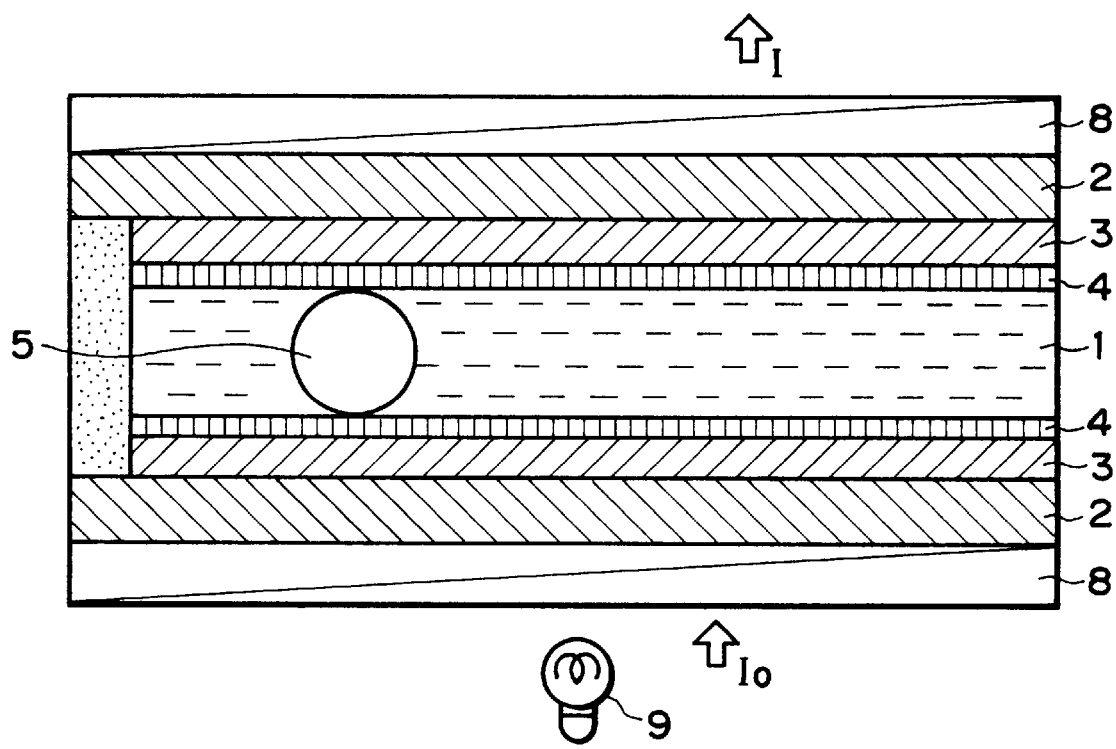
FIG. 1 is a schematic sectional view of an embodiment of a liquid crystal device according to the present invention.

The liquid crystal device according to the present invention has an optical modulation region (e.g., a display region) including a first region and a second region different in an alignment characteristic in a specific areal ratio by appropriately selecting and controlling several factors, such as a liquid crystal material, an alignment control film material and its thickness, an aligning treating method and production conditions (e.g., a cooling rate and an application of external electric field).

The first region is a region wherein a smectic liquid crystal (particularly a chiral smectic liquid crystal composition) has a plurality of smectic (liquid crystal) layers providing a layer inclination angle smaller than a calculated layer inclination angle calculated based on a temperature-dependent layer spacing changing characteristic (in the devices according to the first and second aspects described above) or a region wherein a smectic liquid crystal layers are aligned in a direction substantially perpendicular to substrates to form a bookshelf structure (in the devices according to the third and fourth aspects described above).

On the other hand, the second region is a region wherein a smectic liquid crystal layers are aligned to form a chevron structure having a substantial inclination angle (in the devices of the first and third aspects) or having a layer inclination angle substantially equal to a calculated layer inclination angle calculated based on a temperature-dependent layer spacing changing characteristic (in the devices of the second and fourth aspects).

In the present invention, in addition to the second region described above, the first region described above is clearly present in the optical modulation region in a certain areal ratio, whereby minute alignment defects are minimized or suppressed to provide a good alignment characteristic with accuracy. As a result, the liquid crystal device effectively realize a high contrast ratio and an improved drive margin to enhance its display characteristic.

Herein, the term "chevron structure" in the second region means a layer structure wherein respective smectic liquid crystal layers are bent at an intermediate point (generally at a midpoint) thereof between a pair of substrates to provide a layer inclination angle of above 3 degrees, preferably above 3 degrees to at most 7 degrees. In the second region composed of the chevron structure, the layer inclination angle is substantially equal to the calculated layer inclination angle, i.e., at least 80% of the calculated layer inclination angle.

On the other hand, the term "bookshelf structure" in the first region means a layer structure wherein respective smectic layers extend substantially without bending in a direction substantially perpendicular to the pair of substrates.

The first region may also comprise a smectic layer structure closer to the bookshelf structure which may be sometimes called herein a "quasi-bookshelf structure" wherein the smectic liquid crystal layers are aligned to have a layer inclination angle which is smaller than the calculated layer inclination angle, preferably below 80% of the calculated layer inclination angle or at most 3 degrees. As far as the above layer inclination angle characteristic is satisfied, the smectic liquid crystal layers can be bent between the substrates.

In the present invention, the layer inclination angle is an angle formed by inclined or tilted smectic layers and a normal to a pair of parallel substrates when a smectic liquid crystal is disposed between the pair of substrates.

The "layer inclination angle" represented by a symbol δ (or δx-ray) is determined based on values at a measurement temperature (e.g., 30° C.) obtained from an X-ray diffraction pattern in X-ray diffraction analysis basically similar to the method used by Clark and Lagerwall (Japan Display '86, Sept. 30–Oct. 2, 1986, p.p. 456–458) or the method of Ohuchi et al (J.J.A.P., 27 (5) (1988), p.p. L725–L728).

The "calculated layer inclination angle" represented by a symbol δ (or δcal) is calculated and determined from the following equation:

$$\delta(\delta cal) = \cos^{-1}(dc/dTAC),$$

wherein dc represents a layer spacing a distance between adjacent smectic layers at a measurement temperature (e.g., 30° C.) obtained through X-ray diffraction analysis in combination with the Bragg's formula and dTAC represents a layer spacing at a phase transition temperature from smectic A (SmA) phase to (chiral) smectic C (SmC(*)) phase obtained through X-ray diffraction analysis in combination with the Bragg's formula.

Particularly, in the liquid crystal devices according to the first, second and fourth aspects of the present invention, a co-present state of the first and second regions is appropriately controlled so that the layer inclination angle δx-ray and the calculated layer inclination angle δcal satisfy a specific relationship, thus attaining excellent device characteristics.

In the liquid crystal device (according to the fist to fourth aspects) of the present invention, the first region may preferably have an areal ratio of at least 10% based on an entire effective optical modulation region (display region), thus effectively providing a good alignment state as a whole within the devices to improve a contrast ratio and a drive margin. Further, in the second region (wherein the liquid crystal is aligned to form a chevron structure), the substantial layer inclination angle δx-ray may preferably at most 7 degrees, more preferably 3–7 degrees.

In a preferred embodiment, in a step of filling and cooling the liquid crystal devices according to the first to fourth aspects of the present invention, the smectic liquid crystal may desirably be supplied with an external electric field in a whole smectic A (SmA) phase-providing temperature range (set by, e.g., a gradual cooling after injecting the liquid crystal in an isotropic liquid state or a phase transition from a higher-order phase (than SmA phase) to SmA phase), whereby the first region (in which the relationship of: δx-ray<δcal is satisfied or the liquid crystal is aligned perpendicular to the substrate to form a bookshelf structure) is remarkable increased in an areal ratio, particularly an areal ratio of at least 40% based on the entire effective optical modulation region. In other words, the layer structure of the smectic liquid crystal can be controlled by applying an electric field in SmA phase.

In this case, the electric field application is effected in SmA phase wherein the liquid crystal does not have a spontaneous polarization. Accordingly, the above areal ratio-increasing effect may presumably be attributable to an electroclinic effect caused by the electric field application in SmA phase.

The electric field application in SmA phase may preferably be performed for at least 1 minute in a whole temperature range providing SmA phase (a temperature range from a phase transition temperature where a higher order phase (than SmA phase) is changed to SmA phase to a phase transition temperature ($T_{AC}$) where SmA phase is changed to chiral smectic C (SmC*) phase). The whole temperature range may preferably be at least 1° C. and may more preferably include a temperature T higher than $T_{AC}$ by 5° C. ($T-T_{AC}=5°$ C.).

The applied electric field may preferably include a voltage of at least 5 V and a relatively low frequency of at most 1 kHz.

Hereinbelow, the liquid crystal device of the present invention will be described specifically with reference to FIG. 1.

FIG. 1 is a schematic sectional view of an embodiment of the liquid crystal device for explanation of the structure thereof.

Referring to FIG. 1, the liquid crystal device includes a liquid crystal layer 1 comprising a smectic liquid crystal, preferably a chiral smectic liquid crystal composition disposed between a pair of substrates 2 each having thereon a group of transparent electrodes 3 for applying a voltage to the liquid crystal layer 1 and an alignment control layer 4. The periphery of the substrates 2 is sealed up with a sealing agent. Outside the substrates 2, a pair of polarizers 8 are disposed so as to modulate incident light $I_0$ from a light source 9 in cooperation with the liquid crystal 1 to provide modulated light I.

The liquid crystal layer 1 may preferably have a thickness (corresponding to a cell gap) of at most 5 μm in order to realize bistability as in the above-described Clark and Lagerwall-type cell. Each of two substrates 2 comprise a high transparent material such as glass or plastic and is coated with a transparent electrode 3 having a prescribed pattern (e.g., stripe pattern) and comprising a transparent electroconductive film of e.g., ITO (indium-tin-oxide) to form an electrode plate. On at least one of the substrates 2, the alignment control layer 4 affecting an alignment state of the liquid crystal is formed. Examples of a material for the alignment control layer 4 may include: an inorganic material, such as silicon monoxide, silicon dioxide, aluminum oxide, zirconium oxide, magnesium fluoride, cerium oxide, cerium fluoride, silicon nitride, silicon carbide, or boron nitride; and an organic material, such as polyvinyl alcohol, polyimide, polyamide-imide, polyester, polyamide, polyester-imide, polyparaxylylene, polycarbonate, polyvinyl acetal, polyvinyl chloride, polystyrene, polysiloxane, cellulose resin, melamine resin, urea resin or acrylic resin. The alignment control layer 4 formed on at least one of the substrate 1 may desirably be subjected to a uniaxial aligning treatment (e.g., rubbing treatment).

The uniaxial aligning-treated alignment control layer is, e.g., formed on the substrate (or a prescribed layer formed thereon) by applying a solution containing the above inorganic or organic material or by vapor deposition or sputtering of such materials. The surface of thus prepared alignment control layer 4 is subjected to a prescribed uniaxial aligning treatment, e.g., by rubbing the surface with a fibrous material such as velvet, cloth or paper. The (uniaxial aligning-treated) alignment control layer 4 may be formed by an oblique vapor deposition method wherein a film of an oxide such as $SiO_2$ or an nitride is vapor-deposited on the substrate(s) from an oblique direction to the substrate.

The alignment control layer 4 may preferably have a thickness of at most 200 Å, more preferably 100 Å, in order to improve a switching performance since such a thin alignment control layer is effective in lowering a magnitude of a reverse electric field caused by switching of a spontaneous polarization Ps.

In the present invention, the alignment control layers 4 formed on the pair of substrates 1 may preferably be subjected to mutually different aligning treatment depending on kinds of the liquid crystal material used. The liquid crystal material (or liquid crystal composition) can include a compound free from cholesteric phase in order to provide the above-described layer inclination angle δ. In such a case, the liquid crystal used forms its alignment (orientation) state in a phase transition from isotropic (Iso.) phase to smectic (Sm) phase while gradually generating battonets (e.g., islands of smectic phase). The mutually different aligning treatments to the alignment control layers 4 are effective in providing the liquid crystal with a uniform alignment state since such a cell structure tends to readily bring about a phenomenon such that the battonets are generated from one substrate side and glow toward the other substrate side. In a more preferred embodiment, the mutually different aligning treatments may include a uniaxial aligning treatment to one alignment control layer and another aligning treatment (e.g., non-uniaxial aligning treatment) to the other alignment control layer. Further, in case where two alignment control layers subjected to mutually different aligning treatments includes a uniaxial aligning-treated polyimide alignment control film and are used in combination with a chiral smectic liquid crystal composition as described hereinafter, it is possible to realize a liquid crystal device having good driving characteristics, particularly a good two stable states-providing characteristic, a high reliability and a drive stability.

In view of an alignment control ability, the alignment control layer 4 formed on at least one of the substrates 1 may preferably comprise a polyimide film represented by the following formula (P) as a recurring unit.

In this instance, in the case of employing the above-described mutually different aligning treatments, one alignment control layer comprises a polyimide (preferably a uniaxial aligning-treated polyimide) alignment control layer and the other alignment control layer comprises a film comprising a matrix material containing oxide fine particles in view of an alignment control characteristic.

Formula (P)

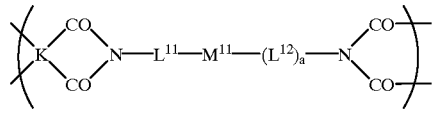

in which

K is 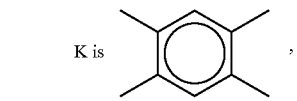,

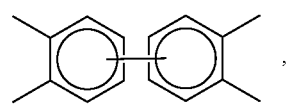,

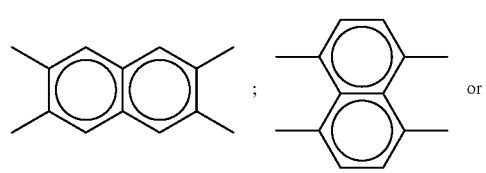 or

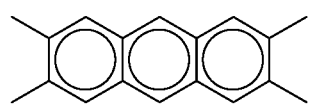;

$L^{11}$ and $L^{12}$ independently denote 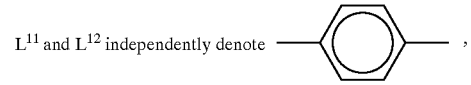,

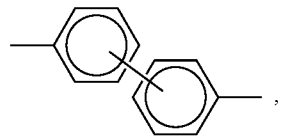,

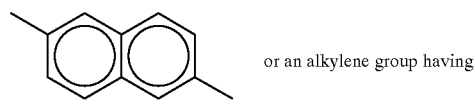 or an alkylene group having 1–20 carbon atoms;

$M^{11}$ is a single bond or —O—; and a is 0, 1 or 2.

Specific examples of the polyimide of the formula (P) include those having the following recurring units shown below.

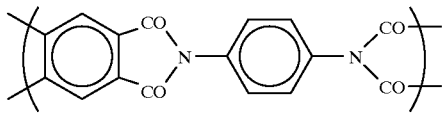

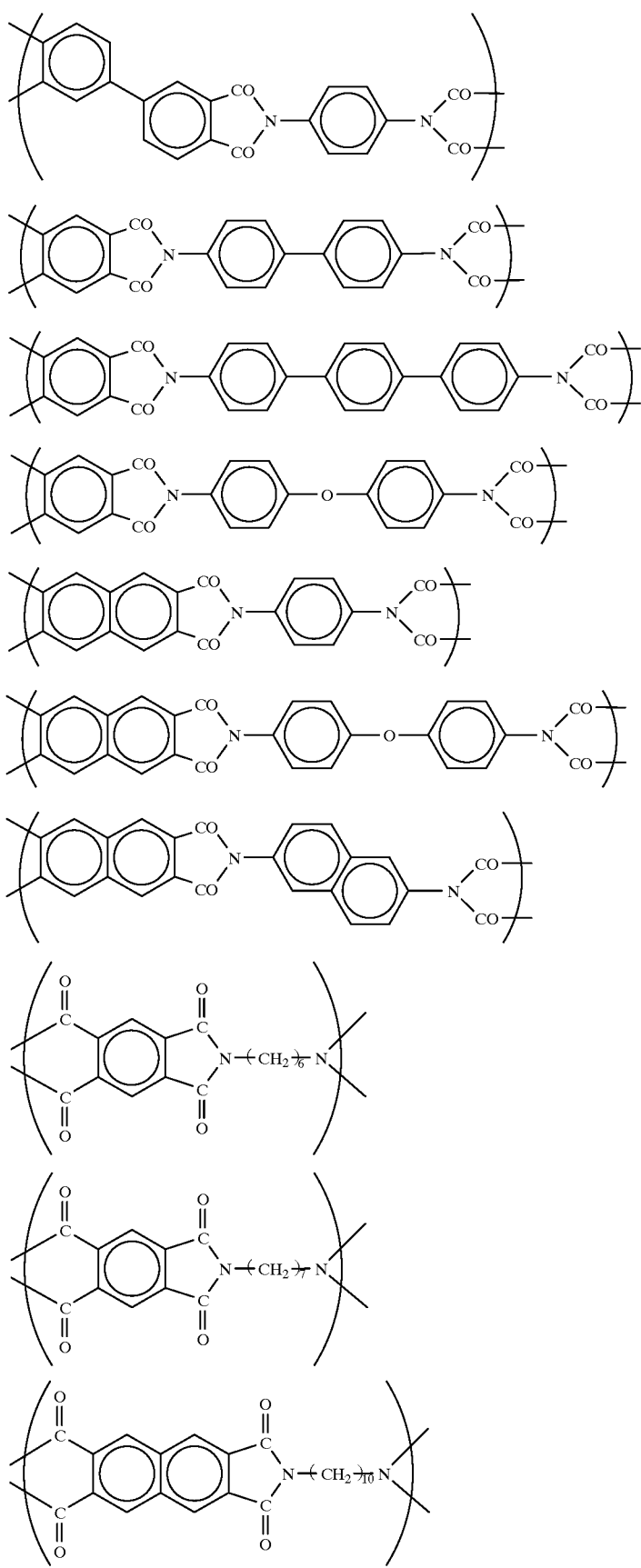

-continued

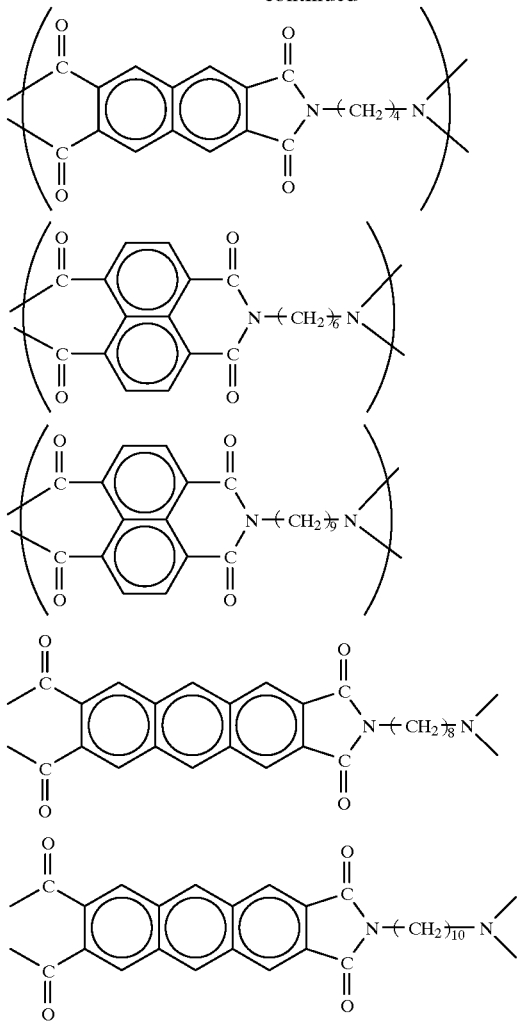

The alignment control layer 4 formed on at least one of the substrate 1 may include an insulating polymer film and a film comprising a matrix material containing oxide fine particles dispersed therein and doped with an electroconductivity-controlling impurity, as desired. Specific examples of the oxide may include those containing group II elements, such as ZnO, CdO, and ZnCdOx; and those containing group IV elements, such as $GeO_2$, $SnO_2$, GeSnOx, $TiO_2$, $ZrO_2$ and TiZiOx. Specific examples of the electroconductivity-controlling impurity may include: an n-type impurity of group III elements, such as B, Al, Ga and In, and a p-type impurity of group I element, such as Cu, Ag, Au and Li, each for the oxides of group II elements described above; and an n-type impurity of group V element, such as P, As, Sb and Bi, and a p-type impurity of group III element, such as B, Cl, Ga and In, each for the oxides of group IV elements described above. Preferred examples of the film may include a coating-type film comprising matrix material, such as silica or siloxane polymer, containing, e.g., dispersed $SnO_2$ fine particles doped with, e.g., Sb, as desired.

In the present invention, the two alignment control layers 4 may preferably include a uniaxial aligning-treated polyimide film and a (coating-type) film wherein oxide fine particles (doped with an electroconductivity-controlling impurity) are uniformly dispersed in a matrix material as described above.

The liquid crystal device of the invention may further comprise a short circuit-preventing layer for the-pair of substrates such as an insulating layer, an inorganic material layer and an organic material layer other than those for the above-mentioned alignment control layer 4. The pair of substrates 2 are held to have a prescribed (but arbitrary) gap (e.g., at most 5 μm) with a gap-controlling spacer 5 of, e.g., silica beads. A voltage is applied to the liquid crystal layer 1 in accordance with a switching signal from a signal power supply (not shown), thus effecting switching. As a result, the liquid crystal device functions as a light valve for a display device. Further, in case where two groups of electrodes are arranged in matrix (so as to intersect with each other, e.g., at right angles) on the pair of substrates, it is possible to perform pattern display and pattern exposure, so that the liquid crystal device is used as a display device for a personal computer, a word processor, etc., or a light valve for a printer.

In the liquid crystal devices of the present invention, the liquid crystal layer 1 may preferably comprise a chiral smectic liquid crystal composition.

The chiral smectic liquid crystal composition may desirably contain at least one species of a fluorine-containing mesomorphic compound which preferably has a structure including a fluorocarbon terminal portion and a hydrocarbon terminal portion connected by a central core and has smectic phase or latent smectic phase. The term "latent smectic phase" refers to a property of a compound concerned that the compound alone does not exhibit smectic phase but can be a component compatibly contained in smectic phase of a liquid crystal composition.

In a preferred class of the fluorine-containing mesomorphic compound, the fluorocarbon terminal portion may preferably be:

a group (perfluoroalkyl-type terminal portion) represented by the formula $-D^1-C_{xa}F_{2xa}-X$, where xa is 1–20; X is —H or —F; $-D^1-$ is —CO—O—$(CH_2)_{ra}$—, —O—$(CH_2)_{ra}$—, —$(CH_2)_{ra}$—, —O—$SO_2$—, —$SO_2$—, —$SO_2$—$(CH_2)_{ra}$—, —O—$(CH_2)_{ra}$—O—$(CH_2)_{rb}$—, —$(CH_2)_{ra}$—N$(C_{pa}H_{2pa+1})$—$SO_2$— or —$(CH_2)_{ra}$—N$(C_{pa}H_{2pa+1})$—CO—; where ra and rb are independently 1–20; and pa is 0–4; or a group (perfluoroalkyl ether-type terminal portion) represented by $-D^2-(C_{xb}F_{2xb}-O)_{za}-C_{ya}F_{2ya+1}$, wherein xb is 1–10 independently for each $(C_{xb}F_{2xb}-O)$; ya is 1–10; za is 1–10; $-D^2-$ is —CO—O—$C_{rc}H_{2rc}$, —O—$C_{rc}H_{2rc}$—$C_{rc}H_{2rc}$—, —O—$(C_{sa}H_{2sa}-O)_{ta}$—$C_{rd}H_{2rd}$—, —O—$SO_2$—, —$SO_2$—, —$SO_2$—$C_{rc}H_{2rc}$—, —$C_{rc}H_{2rc}$—N$(C_{pb}H_{2pb+1})$—$SO_2$—, —$C_{rc}H_{2rc}$—N$(C_{pb}H_{2pb+1})$—CO—, or a covalent bond, where rc and rd are independently 1–20; sa is independently 1–10 for each $(C_{sa}H_{2sa}-O)$; ta is 1–6; and pb is 0–4.

In the case of a mesomorphic compound having a perfluoroalkyl-type terminal portion, the mesomorphic compound may preferably have a central core comprising at least two aromatic, heteroaromatic, cycloaliphatic, or substituted aromatic, heteroaromatic, or cycloaliphatic rings. The aromatic or heteroaromatic ring may be selected from fused aromatic, heteroaromatic, or non-fused aromatic or heteroaromatic rings, and the rings may be connected one with another by means of functional groups selected from —COO—, —COS—, —HC=N—, —COSe—. Heteroatoms within the heteroaromatic ring comprise at least one atom selected from N, O or S.

In the case of a mesomorphic compound having a perfluoroalkyl ether-type terminal portion, the mesomorphic compound may preferably have a central core comprising at least two rings independently selected from aromatic, heteroaromatic, cycloaliphatic, or substituted aromatic, heteroaromatic, or cycloaliphatic rings, connected one with another by a covalent bond or by groups selected from —COO—, —COS—, —HC=N—, —COSe—. Rings may be fused or non-fused. Heteroatoms within the heteroaromatic ring comprise at least one atom selected from N, O or S. Non-adjacent methylene groups in cycloaliphatic rings may be substituted by O or S atoms.

It is particularly preferred to use a fluorine-containing mesomorphic compound of the following general formula (I) or general formula (II):

Formula (I):

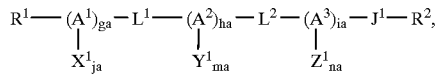

wherein $A^1$, $A^2$ and $A^3$ are each independently

-continued

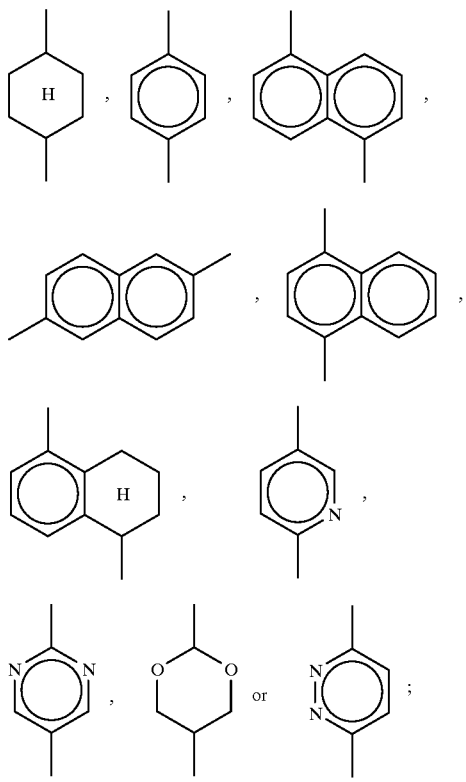

ga, ha and ia are independently an integer of 0–3 with the proviso that the sum of ga+ha+ia be at least 2;

$L^1$ and $L^2$ are each independently a covalent bond, —CO—O—, —O—CO—, —COS—, —S—CO—, —CO—Se—, —Se—CO—, —CO—Te—, —Te—CO—, —$CH_2Cl_2$—, —CH=CH—, —C≡C—, —CH=N—, —N=CH—, —$CH_2$—O—, —O—$CH_2$—, —CO— or —O—;

$X^1$, $Y^1$ and $Z^1$ are each a substituent of $A^1$, $A^2$ and $A^3$, respectively, and each $X^1$, $Y^1$ and $Z^1$ are independently —H, —Cl, —F, —Br, —I, —OH, —$OCH_3$, —$CH_3$, —CN or —$NO_2$;

each ja, ma and na are independently an integer of 0–4;

$J^1$ is —CO—O—$(CH_2)_{ra}$—, —O—$(CH_2)_{ra}$—, —$(CH_2)_{ra}$—, —O—$SO_2$—, —$SO_2$—, —$SO_2$—$(CH_2)_{ra}$—, —O—$(CH_2)_{ra}$—O—$(CH_2)_{rb}$—, —$(CH_2)_{ra}$—N$(C_{pa}H_{2pa+1})$—$SO_2$— or —$(CH_2)_{ra}$—N$(C_{pa}H_{2pa+1})$—CO—; where ra and rb are independently 1–20, and pa is 0–4;

$R^1$ is —O—$C_{qa}H_{2qa}$—O—$C_{qb}H_{2qb+1}$, —$C_{qa}H_{2qa}$—O—$C_{qb}H_{2qb+1}$, —$C_{qa}H_{2qa}$—$R^3$, —O—$C_{qa}H_{21qa}$—$R^3$, —CO—O—$C_{qa}H_{2qa}$—$R^3$, or —O—CO—$C_{qa}H_{2qa}$—$R^3$ which may be either straight chain or branched; where $R^3$ is —O—CO—$C_{qb}H_{2qb+1}$, —CO—O—$C_{qb}H_{2qb+1}$, —H, —Cl, —F, —$CF_3$, —$NO_2$ or —CN; and qa and qb are independently 1–20;

$R^2$ is $C_{xa}F_{2xa}$—X, where X is —H or —F, xa is an integer of 1–20.

Formula (II):

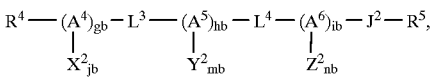

wherein $A^4$, $A^5$ and $A^6$ are each independently

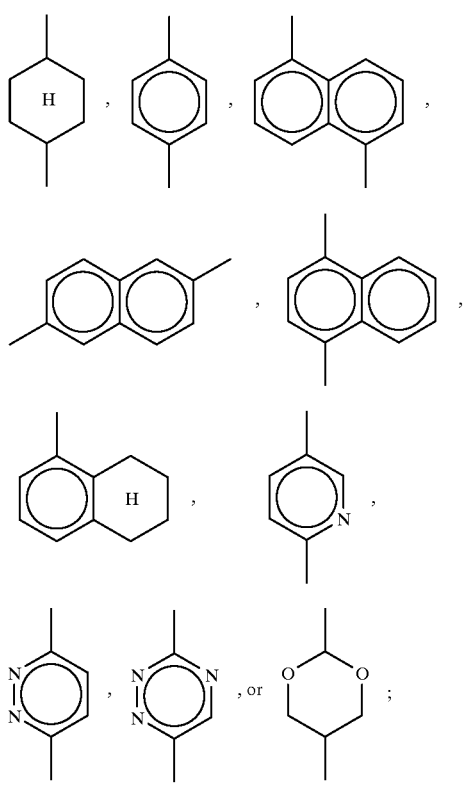

gb, hb and ib are each independently an integer of 0–3 with the proviso that the sum of gb+hb+ib be at least 2;

each $L^3$ and $L^4$ are independently a covalent bond, —CO—O—, —O—CO—, —CO—S—, —S—CO—, —CO—Se—, —Se—CO—, —CO—Te—, —Te—CO—, —(CH$_2$CH$_2$)$_{ka}$— (ka is 1–4), —CH=CH—, —C≡C—, —CH=N—, —N=CH—, —CH$_2$—O—, —O—CH$_2$—, —CO— or —O—;

$X^2$, $Y^2$ and $Z^2$ are each a substituent of $A^4$, $A^5$ and $A^6$, respectively, and each $X_2$, $Y_2$ and $Z_2$ are independently —H, —Cl, —F, —Br, —I, —OH, —OCH$_3$, —CH$_3$, —CF$_3$, —O—CF$_3$, —CN or —NO$_2$; each jb, mb and nb are independently an integer of 0–4;

$J^2$ is —CO—O—C$_{rc}$H$_{2rc}$—, —O—C$_{rc}$H$_{2rc}$—, —C$_{rc}$H$_{2rc}$—, —O—(C$_{sa}$H$_{2sa}$—O)$_{ta}$—C$_{rd}$H$_{2rd}$—, —O—SO$_2$—, —SO$_2$—, —SO$_2$—C$_{rc}$H$_{2rc}$—, —C$_{rc}$H$_{2rc}$—N(C$_{pb}$H$_{2pb+1}$)—SO$_2$— or —C$_{rc}$H$_{2rc}$—N(C$_{pb}$H$_{2pb+1}$)—CO—; rc and rd are independently 1–20; sa is independently 1–10 for each (C$_{sa}$H$_{2sa}$—O), ta is 1–6; pb is 0–4;

$R^4$ is —O—(C$_{qc}$H$_{2qc}$—O)$_{wa}$—C$_{qd}$H$_{2qd+1}$, —(C$_{qc}$H$_{2qc}$—O)$_{wa}$—C$_{qd}$H$_{2qd+1}$, —C$_{qc}$H$_{2qc}$—R$^6$, —O—C$_{qc}$H$_{2qc}$—R$^6$, —CO—O—C$_{qc}$H$_{2qc}$—R$^6$, or O—CO—C$_{qc}$H$_{2qc}$—R$^6$ which may be either straight chain or branched; $R^6$ is —O—CO—C$_{qd}$H$_{2qd+1}$; —CO—O—C$_{qd}$H$_{2qd+1}$, —Cl, —F, —CF$_3$, —NO$_2$, —CN or —H; qc and qd are independently an integer of 1–20; wa is an integer of 1–10;

$R^5$ is (C$_{xb}$F$_{2xb}$—O)$_{za}$—C$_{ya}$F$_{2ya+1}$, wherein xb is independently 1–10 for each (C$_{xb}$F$_{2xb}$—O); ya is 1–10; and za is 1–10.

The compounds represented by the general formula (I) may be obtained through a process described in U.S. Pat. No. 5,082,587 (corr. to JP-A 2-142753). Specific examples thereof are enumerated below.

I-1

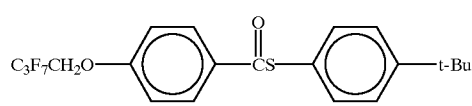

I-2

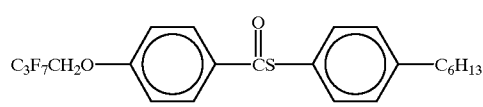

I-3

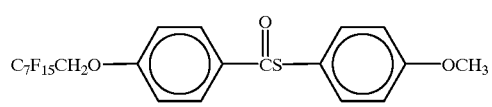

I-4

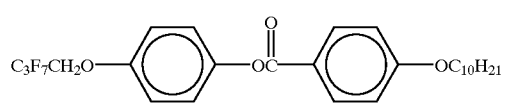

I-5

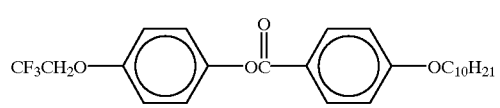

I-6

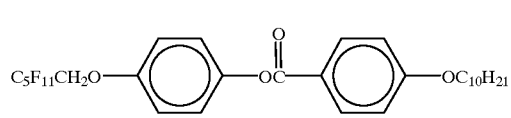

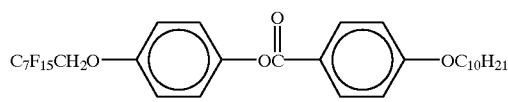
I-7
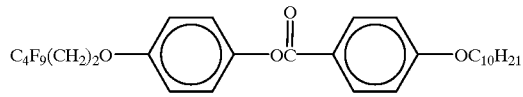
I-8
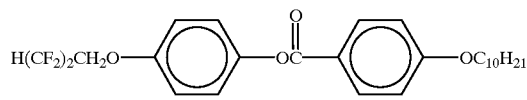
I-9
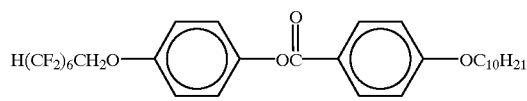
I-10
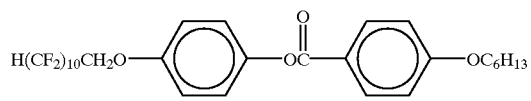
I-11
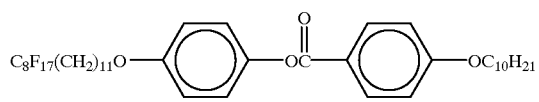
I-12
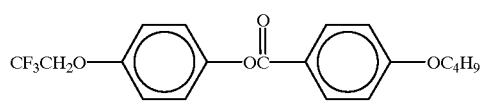
I-13
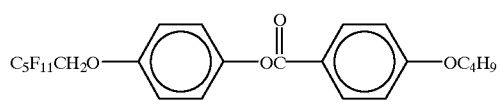
I-14
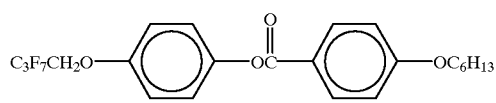
I-15
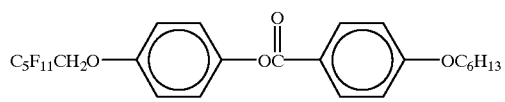
I-16
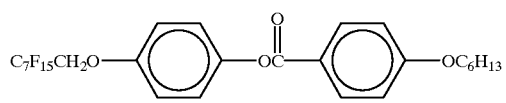
I-17
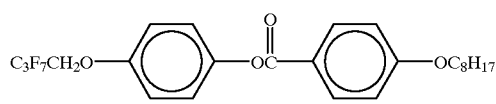
I-18
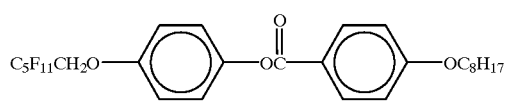
I-19

-continued
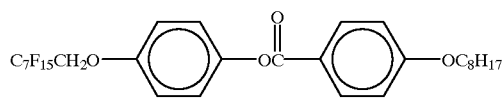
I-20
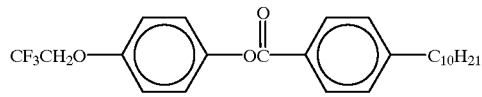
I-21
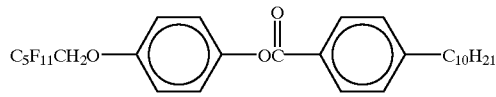
I-22
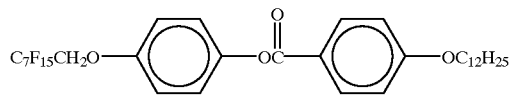
I-23
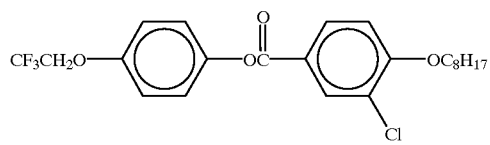
I-24
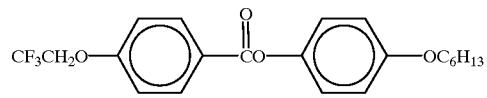
I-25
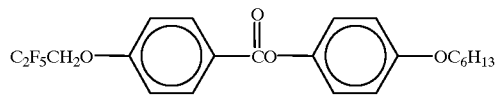
I-26
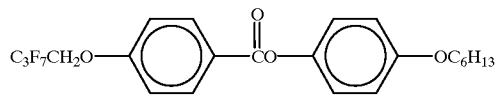
I-27
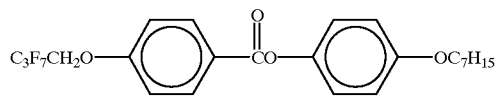
I-28
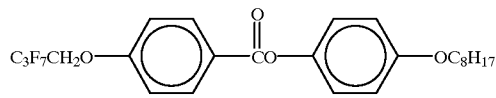
I-29
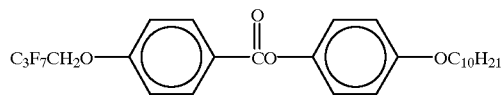
I-30
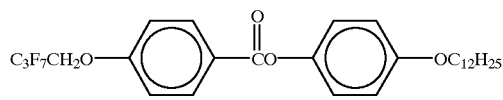
I-31
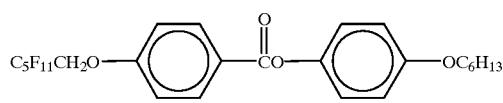
I-32

-continued
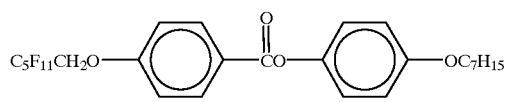
I-33
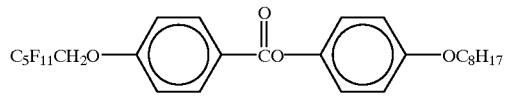
I-34
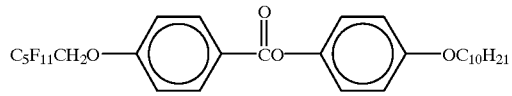
I-35
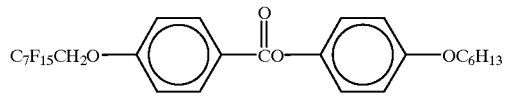
I-36
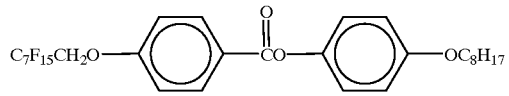
I-37
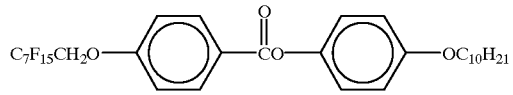
I-38
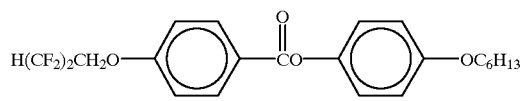
I-39
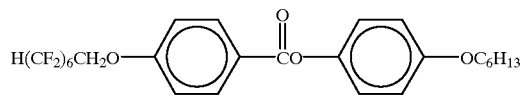
I-40
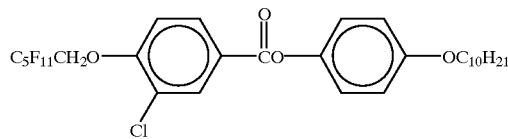
I-41
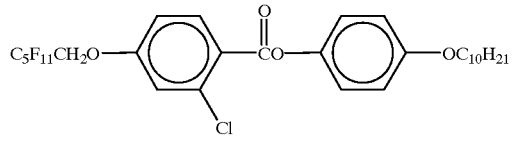
I-42
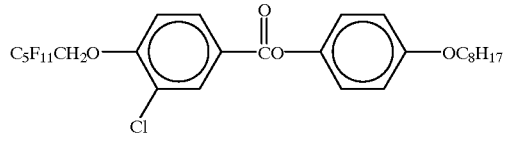
I-43
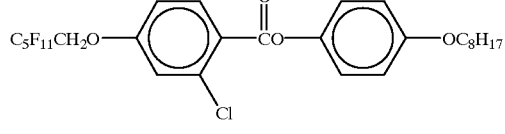
I-44

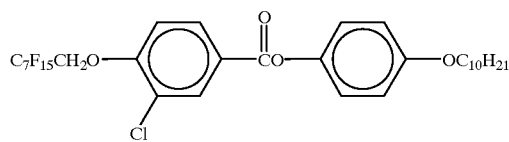
I-45
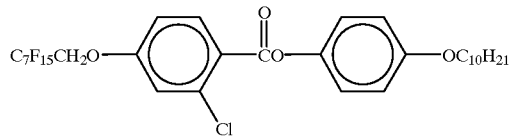
I-46
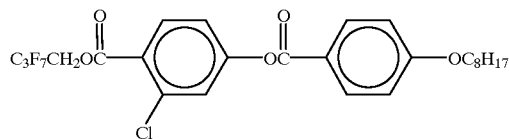
I-47
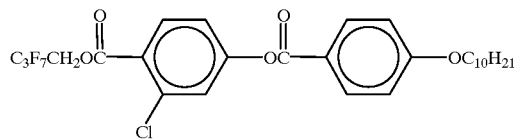
I-48
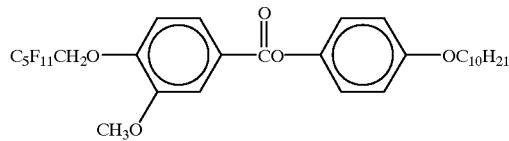
I-49
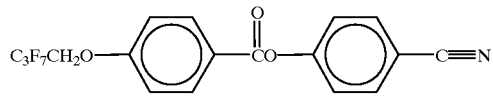
I-50
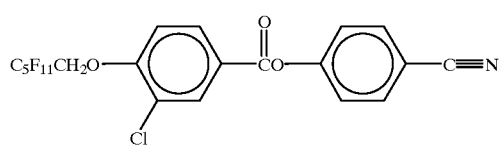
I-51
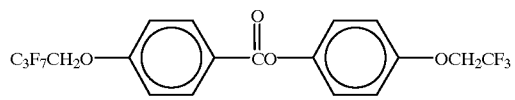
I-52
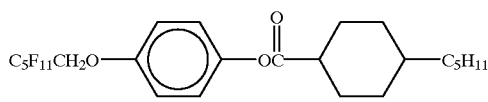
I-53
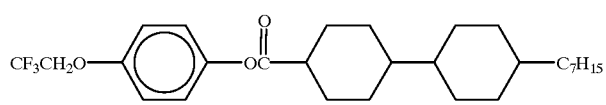
I-54
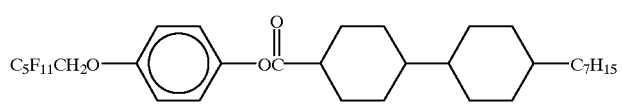
I-55

-continued
I-56
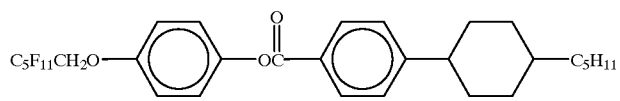
I-57
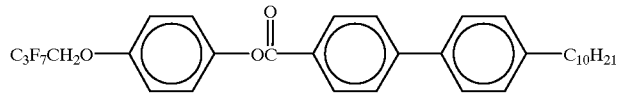
I-58
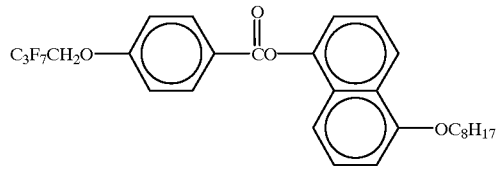
I-59
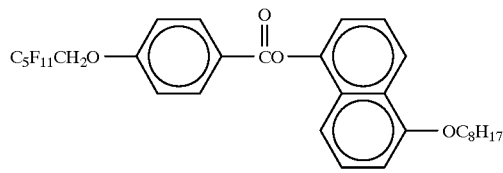
I-60
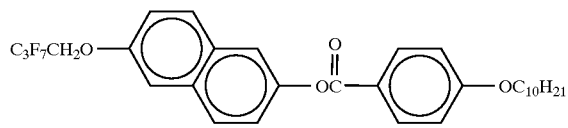
I-61
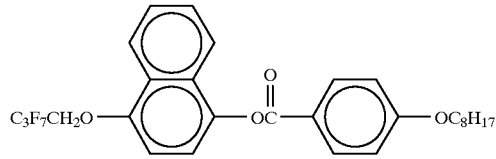
I-62
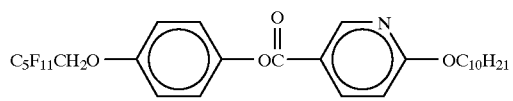
I-63
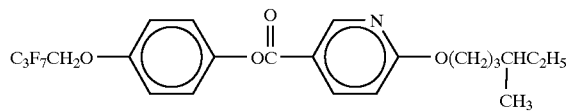
I-64
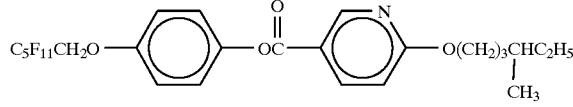
I-65
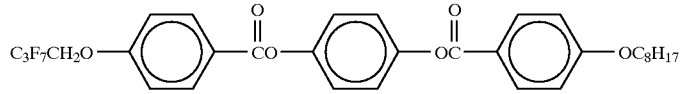
I-66
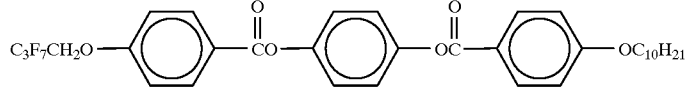

I-67
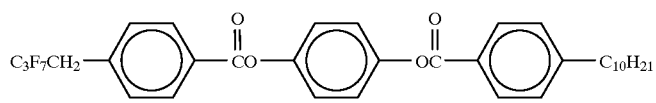
I-68
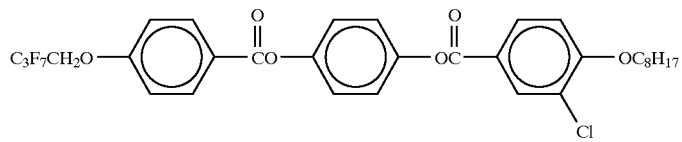
I-69
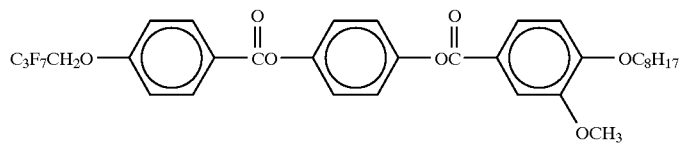
I-70
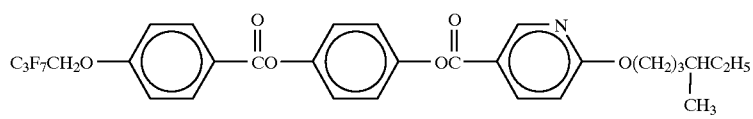
I-71
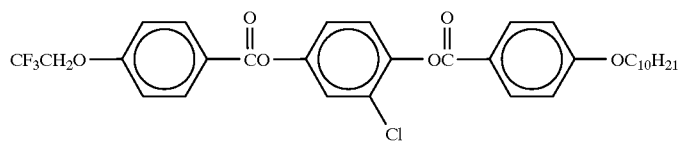
I-72
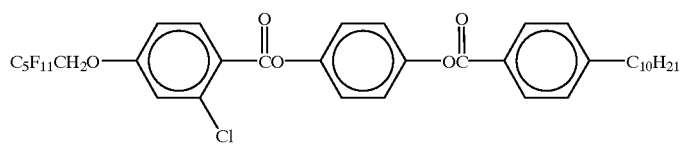
I-73
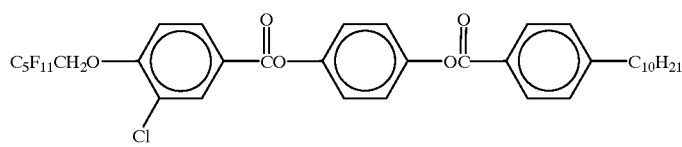
I-74
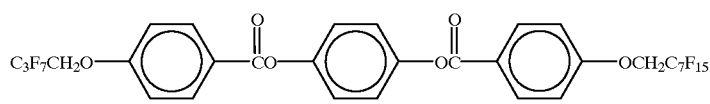
I-75
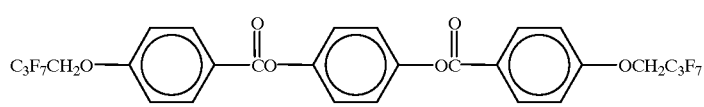
I-76
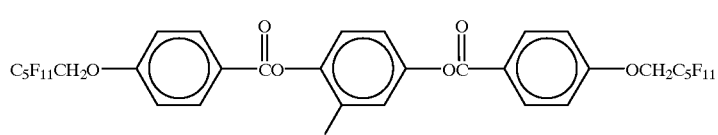
I-77
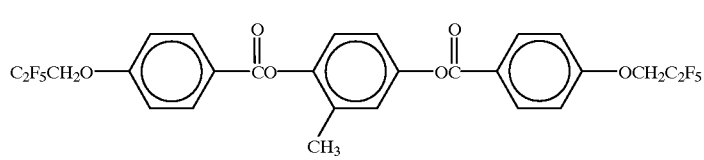

I-78
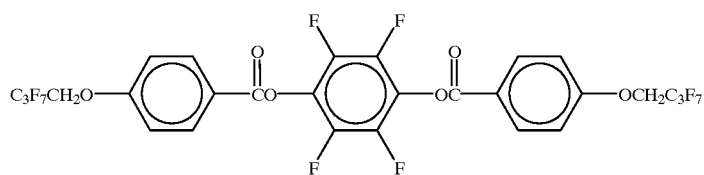
I-79
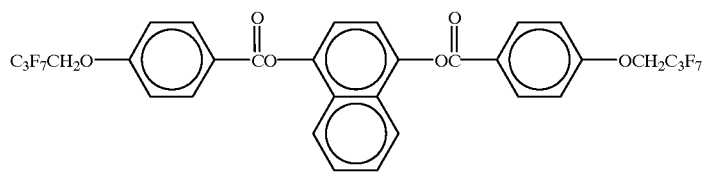
I-80
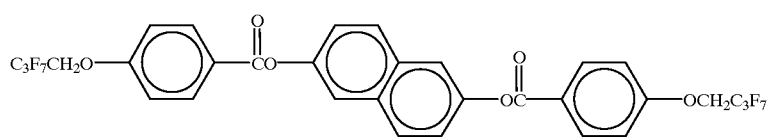
I-81
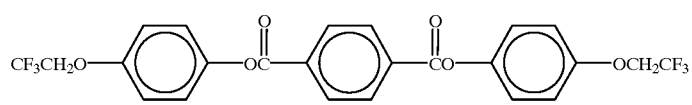
I-82
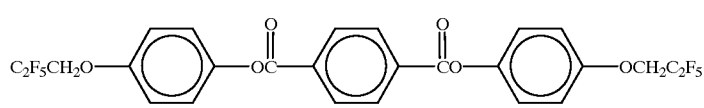
I-83
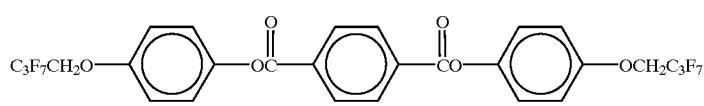
I-84
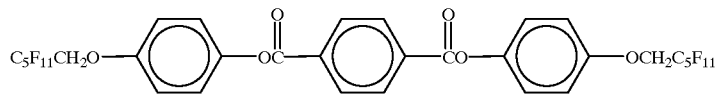
I-85
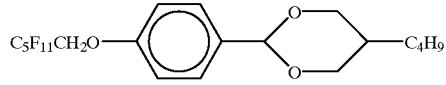
I-86
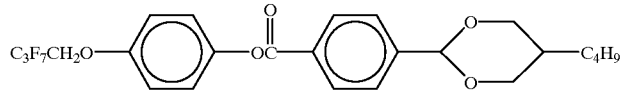
I-87
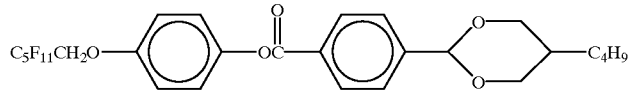
I-88
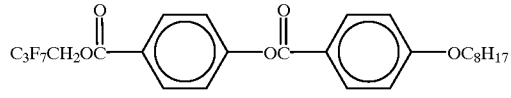

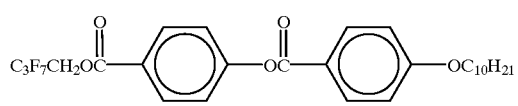 I-89
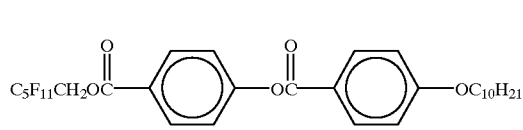 I-90
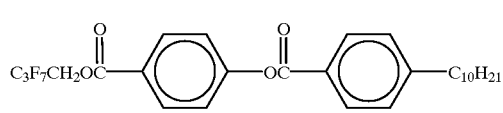 I-91
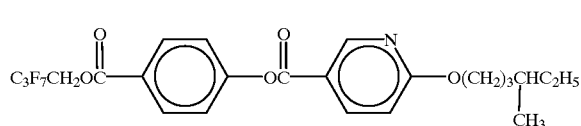 I-92
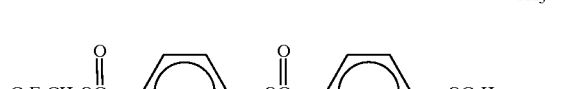 I-93
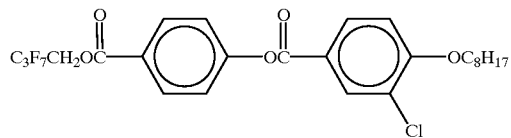 I-94
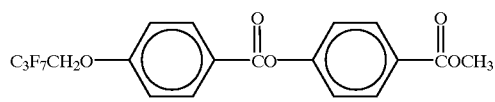 I-95
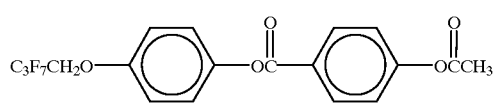 I-96
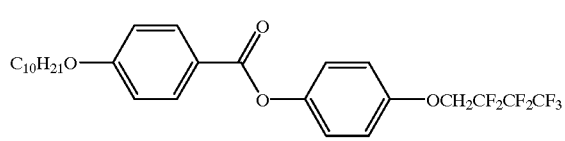 I-97
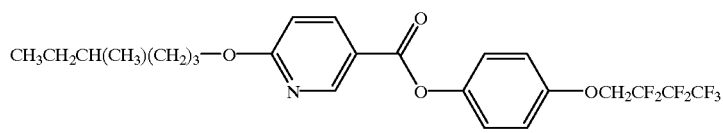 I-98
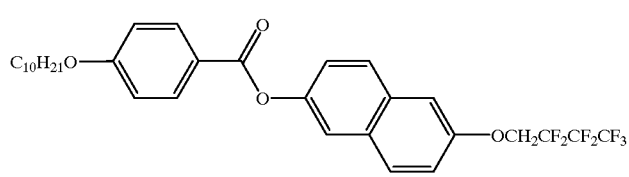 I-99
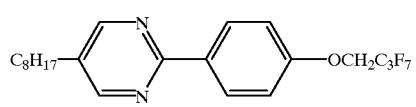 I-100
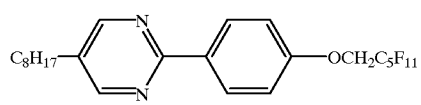

I-101
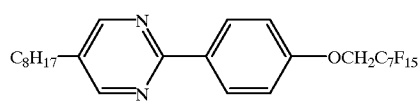
I-102
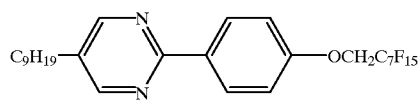
I-103
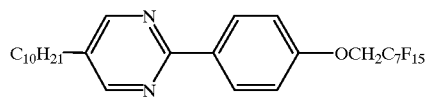
The compounds represented by the general formula (II) may be obtained though a process described in PCT Publication WO93/22396 (corr. to JP (Tokuhyo) 7-506368). Specific examples thereof are enumerated below.
II-1
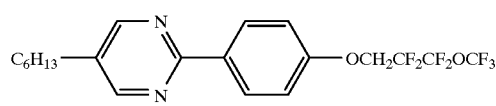
II-2
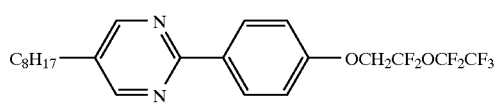
II-3
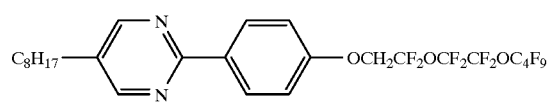
II-4
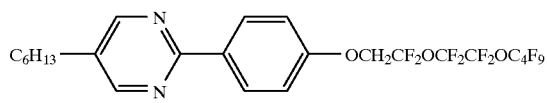
II-5
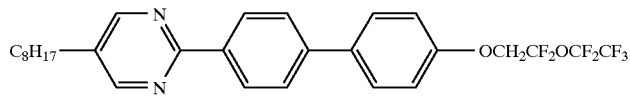
II-6
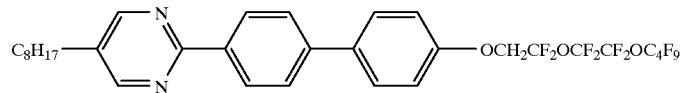
II-7
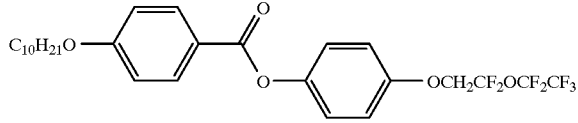

II-8
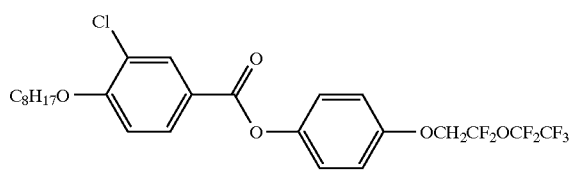
II-9
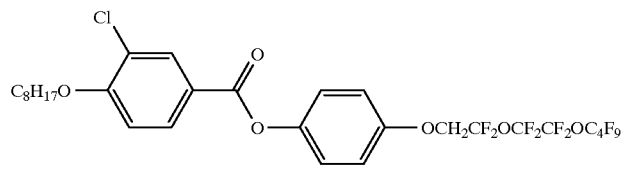
II-10
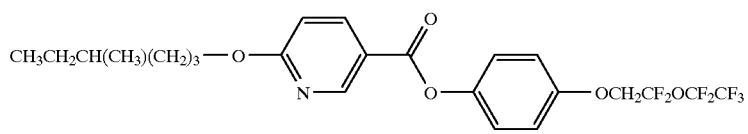
II-11
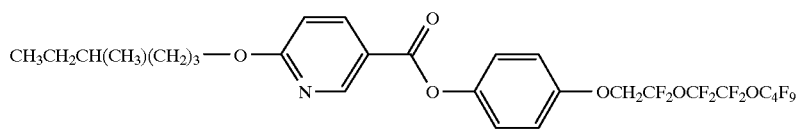
II-12
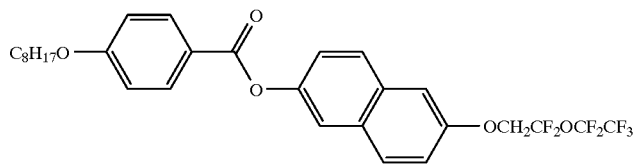
II-13
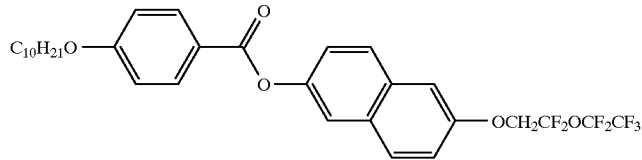
II-14
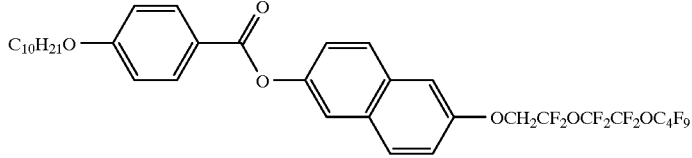
II-15
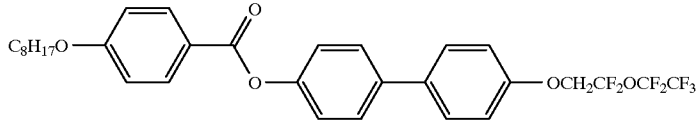
II-16
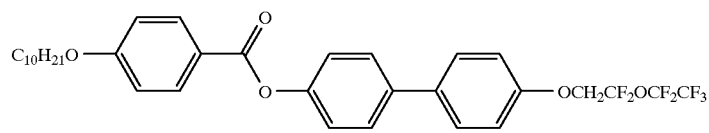

II-17
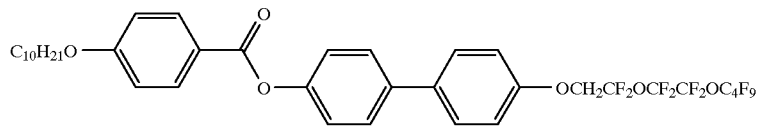
II-18
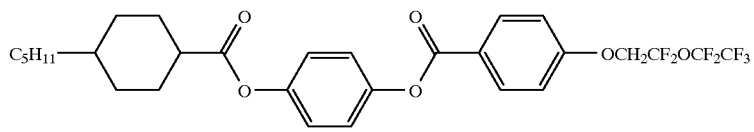
II-19
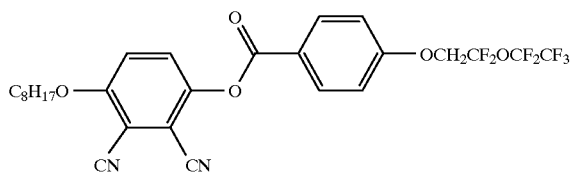
II-20
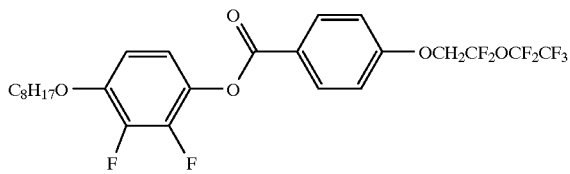
II-21
II-22
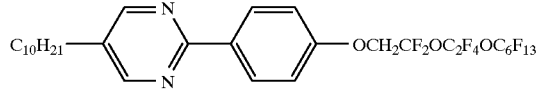
II-23
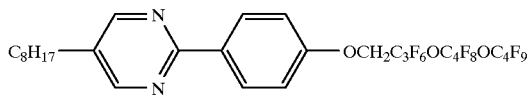
II-24
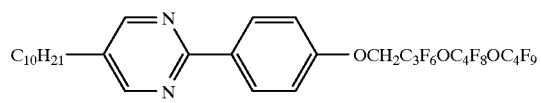
II-25
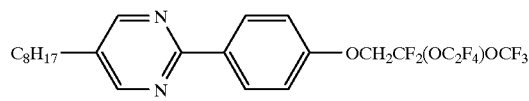
II-26
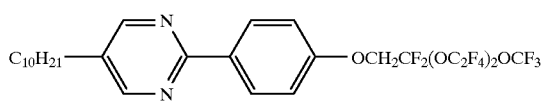
II-27
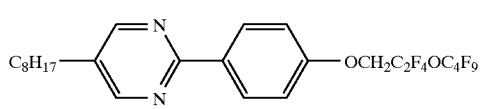

II-28
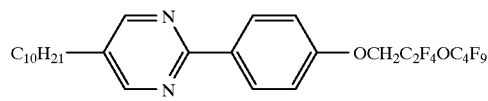
II-29
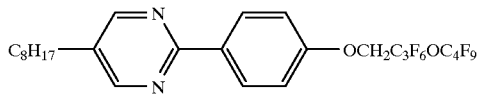
II-30
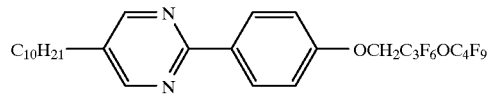
II-31
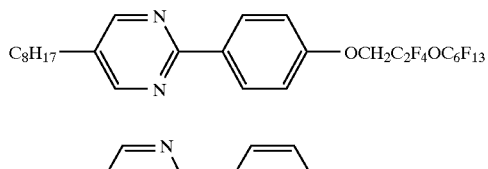
II-32
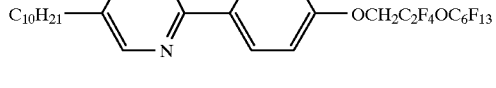
II-33
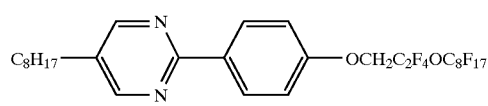
II-34
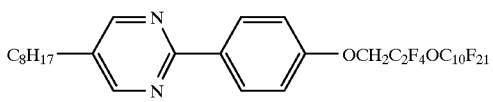
II-35
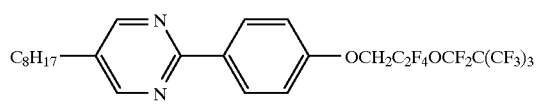
II-36
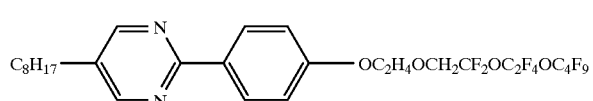
II-37
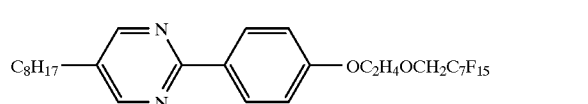
II-38
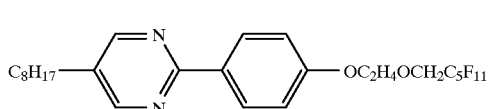
II-39
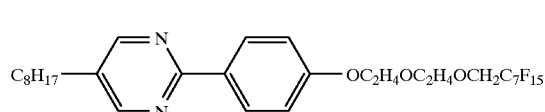
II-40
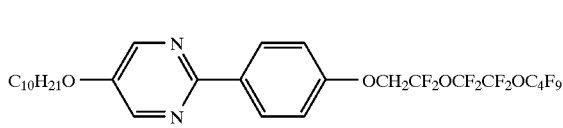

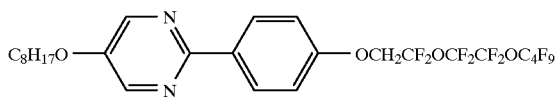

II-41

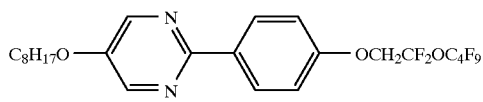

II-42

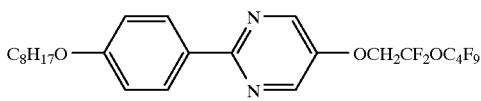

II-43

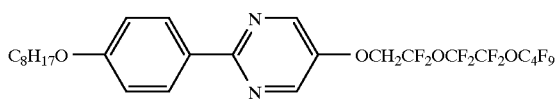

II-44

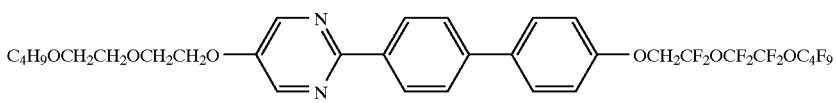

II-45

The liquid crystal composition may further contain another mesomorphic compound having no fluorocarbon terminal portion ("hydrocarbon-type mesomorphic compound") in an appropriate amount.

The liquid crystal composition may preferably contain at least one species of an optically active (chiral) compound having a chined or cyclic optically active cite. The optically active compound may appropriately be selected in view of mutual solubility or compatibility with the fluorine-containing mesomorphic compound and other component compounds.

Specific examples of the hydrocarbon-type mesomorphic compound (free from a perfluorocarbon chain) as another mesomorphic compound may include those shown below.

III-1

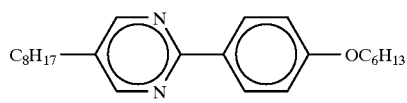

III-2

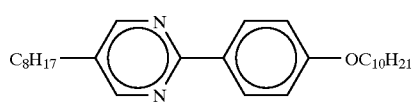

III-3

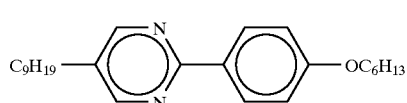

III-4

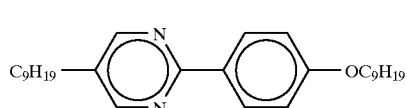

III-5

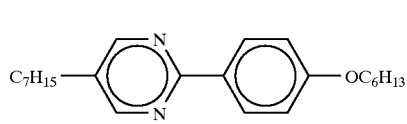

III-6
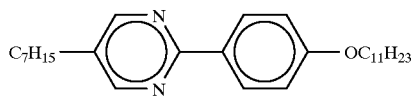
III-7
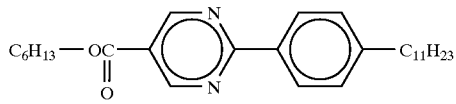
III-8
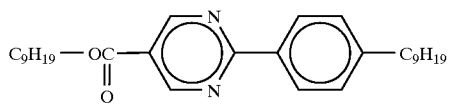
III-9
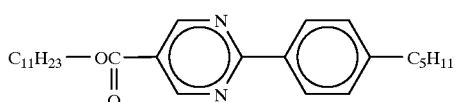
III-10
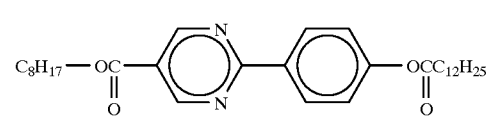
III-11
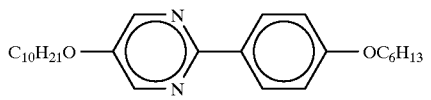
III-12
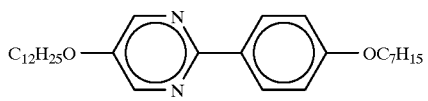
III-13
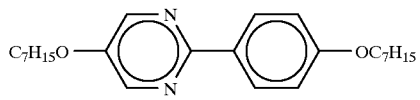
III-14
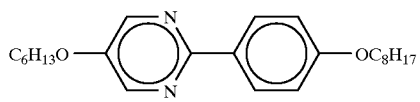
III-15
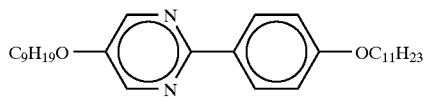
III-16
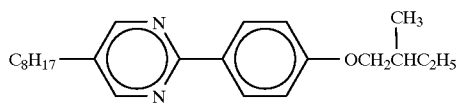
III-17
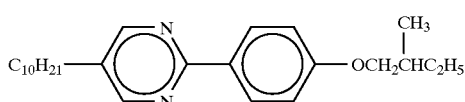
III-18
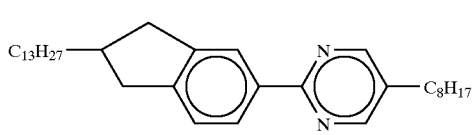

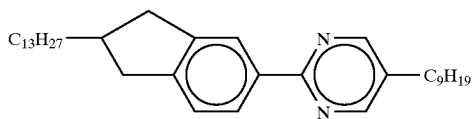
III-19
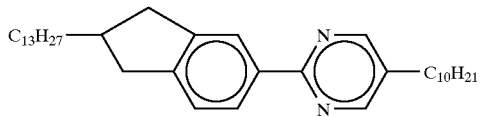
III-20
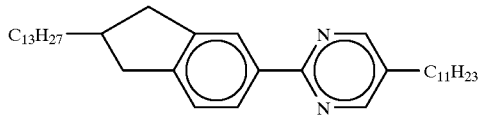
III-21
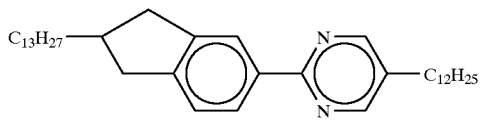
III-22
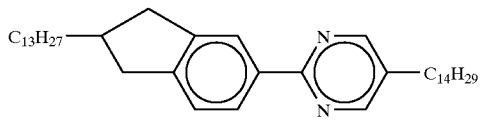
III-23
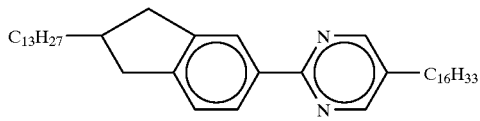
III-24
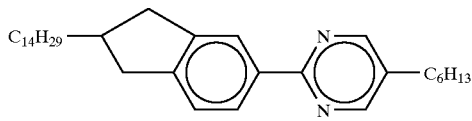
III-25
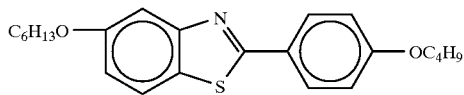
III-26
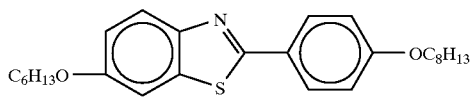
III-27
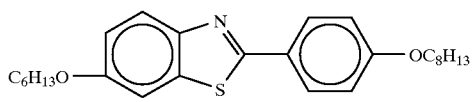
III-28
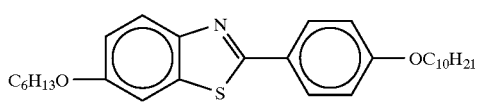
III-29
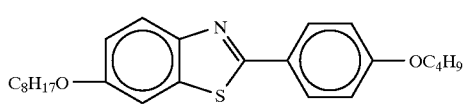
III-30

III-31
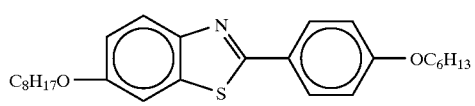
III-32
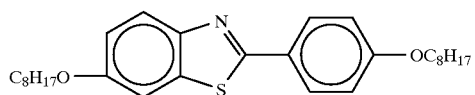
III-33
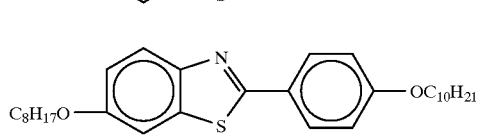
III-34
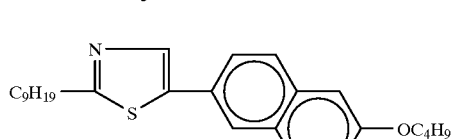
III-35
III-36
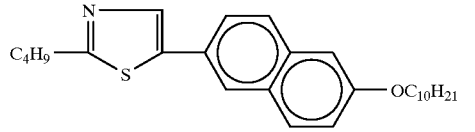
III-37
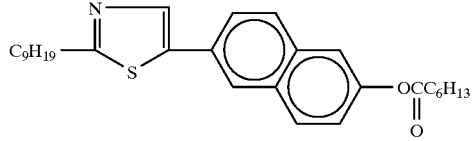
III-38
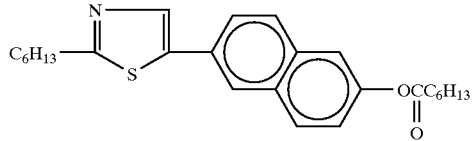
III-39
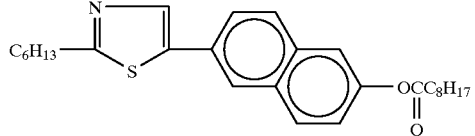
III-40
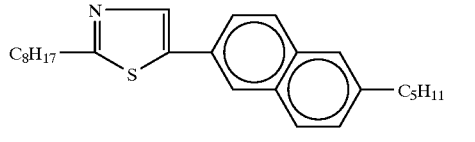
III-41
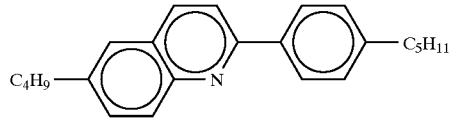
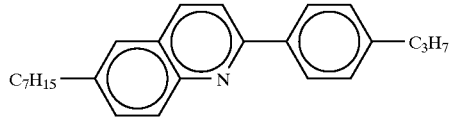

III-42
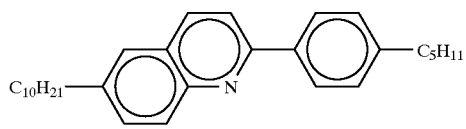
III-43
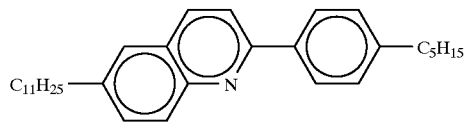
III-44
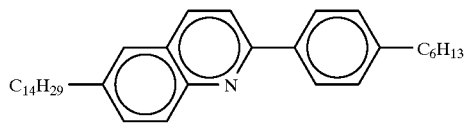
III-45
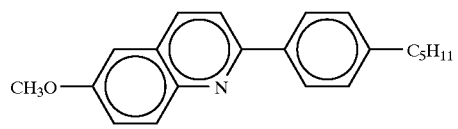
III-46
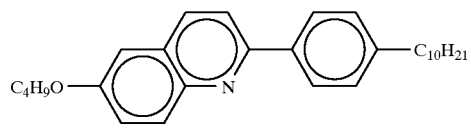
III-47
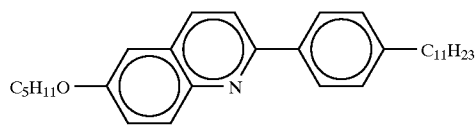
III-48
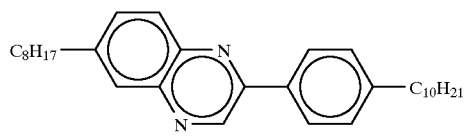
III-49
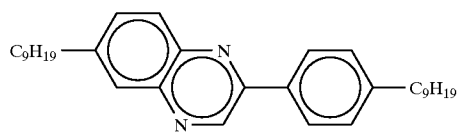
III-50
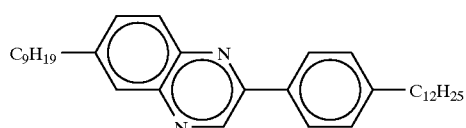
III-51
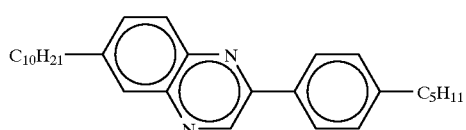
III-52
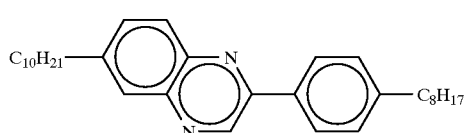

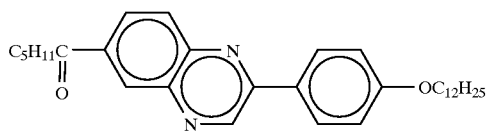
III-53
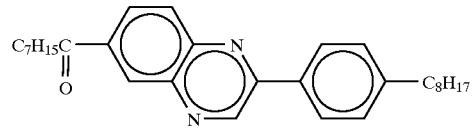
III-54
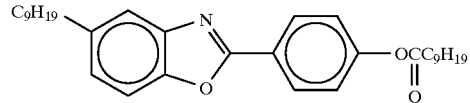
III-55
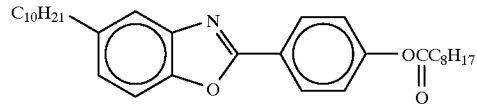
III-56
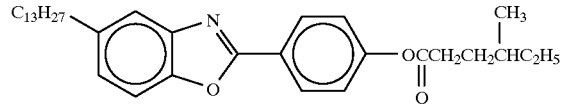
III-57
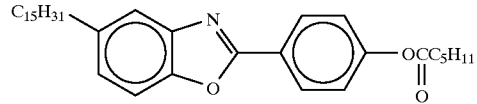
III-58
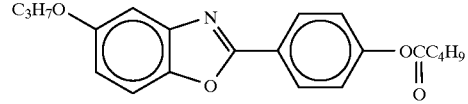
III-59
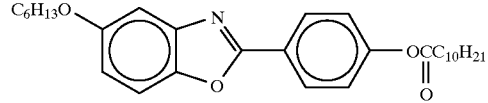
III-60
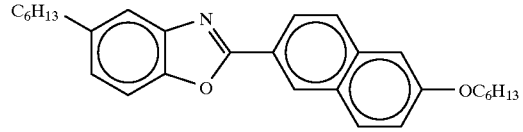
III-61
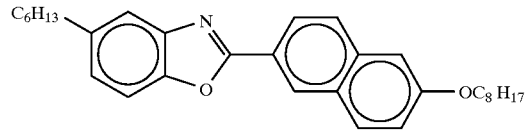
III-62
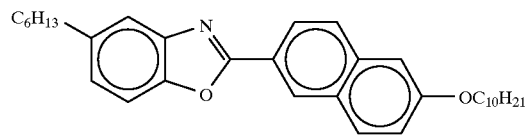
III-63

III-64
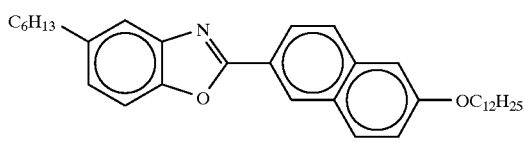
III-65
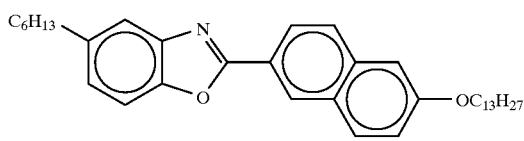
III-66
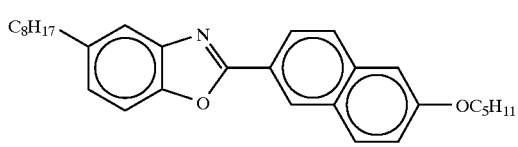
III-67
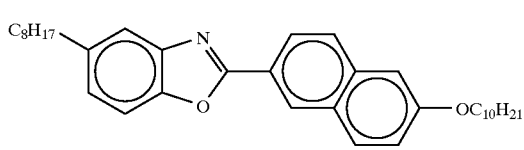
III-68
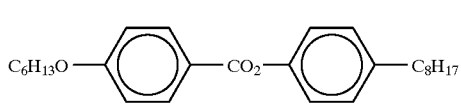
III-69
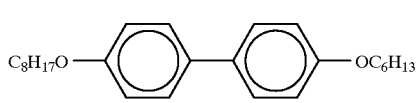
III-70
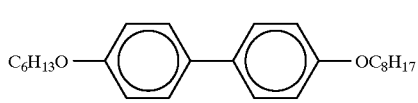
III-71
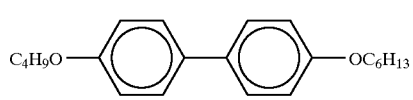
III-72
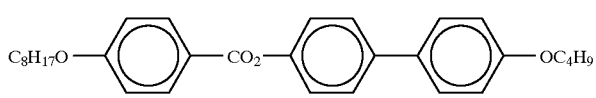
III-73
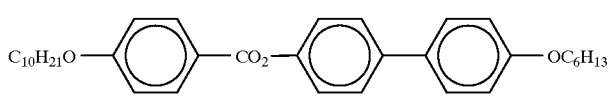
III-74
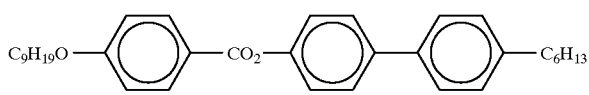
III-75
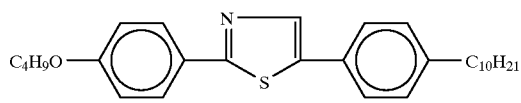
III-76

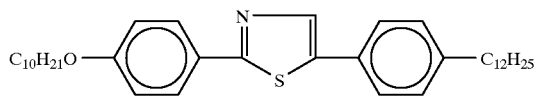
III-77
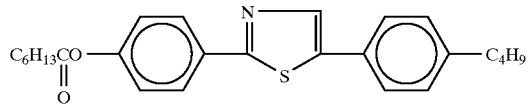
III-78
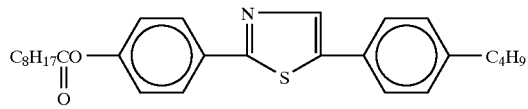
III-79
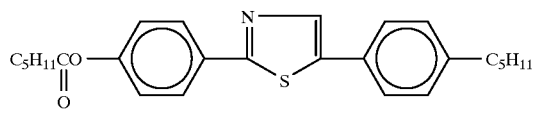
III-80
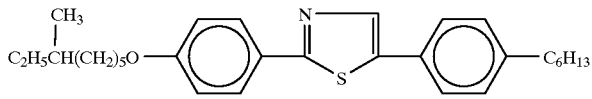
III-81
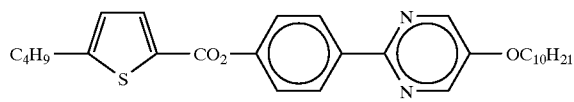
III-82
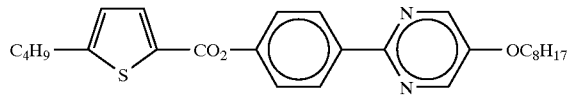
III-83
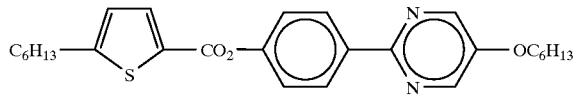
III-84
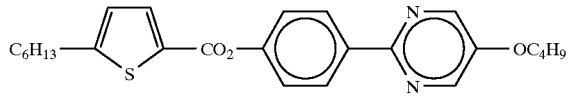
III-85
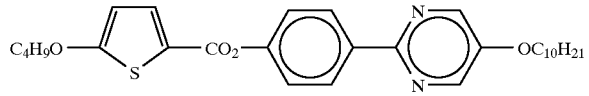
III-86
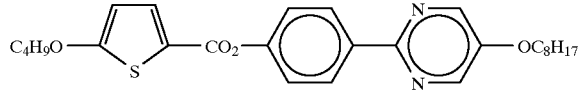
III-87
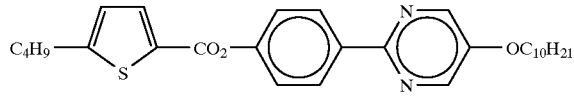
III-88
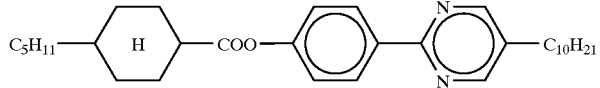
III-89

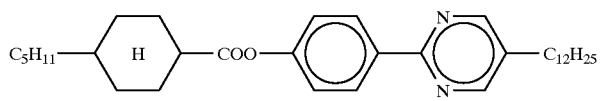
III-90
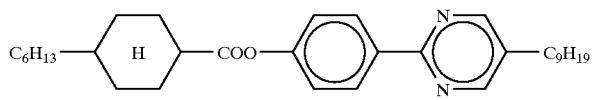
III-91
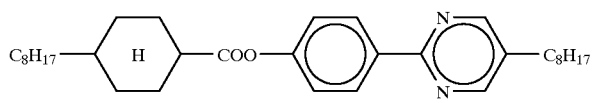
III-92
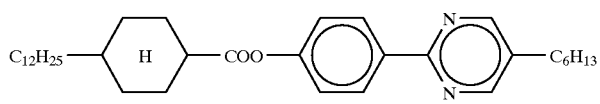
III-93
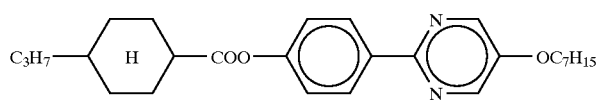
III-94
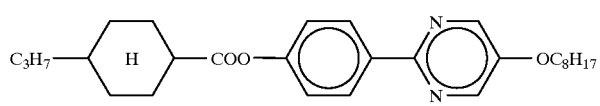
III-95
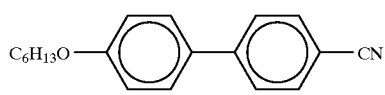
III-96
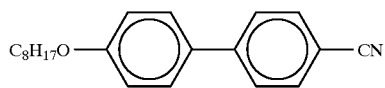
III-97
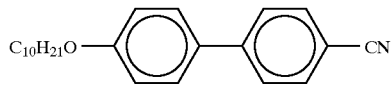
III-98
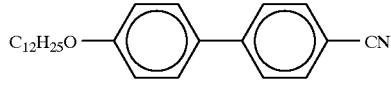
III-99
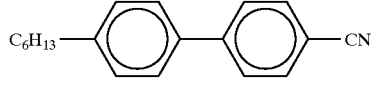
III-100
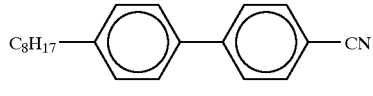
III-101
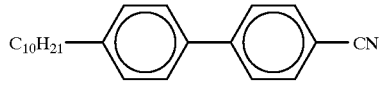
III-102
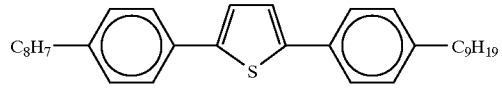
III-103

-continued
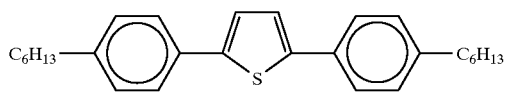
III-104
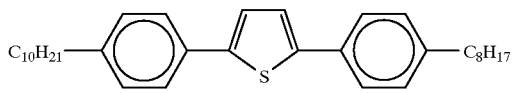
III-105
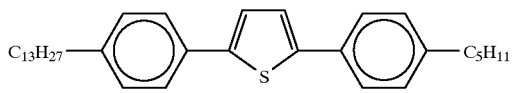
III-106
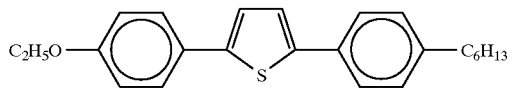
III-107
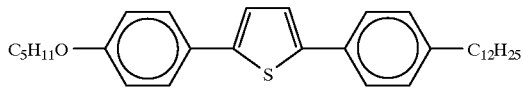
III-108
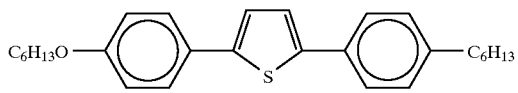
III-109
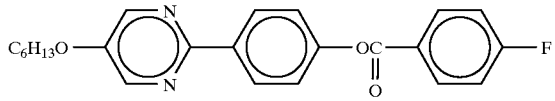
III-110
III-111
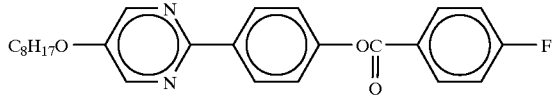
III-112
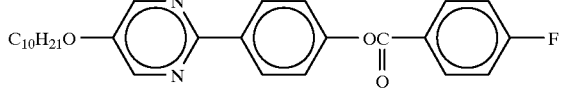
III-113
III-114
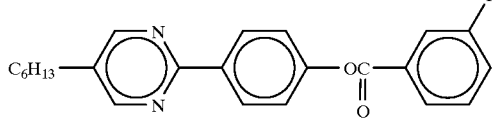
III-115
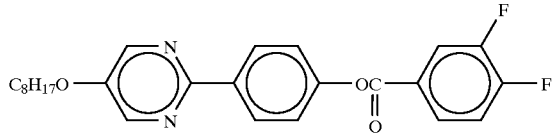
III-116

III-117
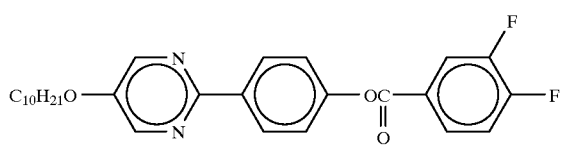

III-118
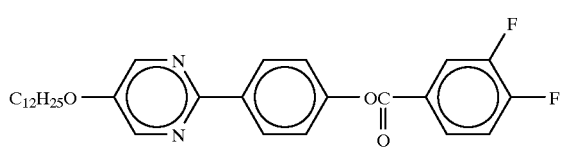

III-119
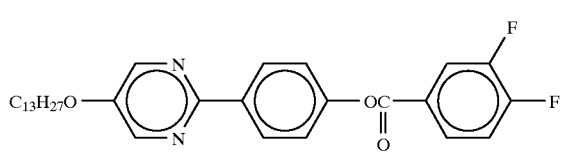

III-120
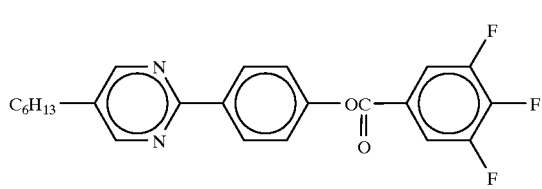

III-121
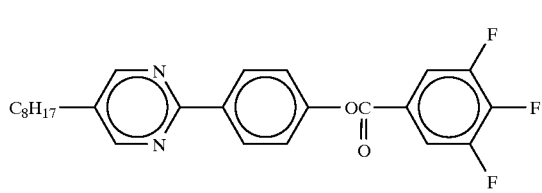

Specific examples of the optically active compound may preferably include those shown below.

Table A (for Compounds Nos. A-1 to A-105)
$R^{6''}-A^{6''}-X^{6''}-A^{7''}-A^{8''}-X^{7''}-R^{7''}-\Sigma**-R^{9''}$

| No. | $R^{6''}$ | $A^{6''}$ | $X^{6''}$ | $A^{7''}$ | $A^{8''}$ | $X^{7''}$ | $R^{7''}$ | $\Sigma''$ | $R^{8''}$ | $R^{9''}$ |
|---|---|---|---|---|---|---|---|---|---|---|
| 1 | $C_6H_{13}$ | — | — | Ph | Ph | — | M1 | Σ | H | $C_8H_{17}$ |
| 2 | $C_8H_{17}O$ | — | — | Ph | Ph | — | M1 | Σ | H | $C_{18}H_{37}$ |
| 3 | $C_6H_{11}O$ | — | — | Ph | Ph2F | — | M1 | Σ | H | $C_6H_{13}$ |
| 4 | $CH_3O$ | — | — | Ph | Ph | — | M1 | Σ | H | $C_6H_{13}$ |
| 5 | $C_6H_{13}CH(CH_3)(CH_2)_2O$ | — | — | Ph | Ph | — | M1 | Σ | H | $C_6H_{13}$ |
| 6 | $C_7H_{15}O$ | — | — | Ph | P23F | — | M1 | Σ | H | $C_6H_{13}$ |
| 7 | $C_6H_{13}$ | — | — | Ph | Ph | — | M1 | Σ | H | $C_2H_{19}$ |
| 8 | $C_7H_{15}O$ | — | — | Ph | Ph | — | M1 | Σ | H | $C_6H_{11}$ |
| 9 | $C_8H_{17}O$ | — | — | Ph | Ph | — | M1 | Σ | H | $C_6H_{13}$ |
| 10 | $C_8H_{17}$ | — | — | Pr1 | Ph | — | M1 | Σ | H | $C_8H_{17}$ |
| 11 | $C_{10}H_{21}$ | — | — | Pr2 | Ph | — | M1 | Σ | H | $C_4H_8$ |
| 12 | $C_{11}H_{23}$ | — | — | Pr2 | Ph | — | M1 | Σ | H | $C_6H_{13}$ |
| 13 | $C_{12}H_{25}$ | — | — | Pr2 | Ph | — | M1 | Σ | H | $C_8H_{17}$ |
| 14 | $C_4H_8O$ | — | — | Py1 | Ph | — | M1 | Σ | H | $C_{10}H_{21}$ |
| 15 | $C_{13}H_{27}$ | — | — | Py2 | Ph | — | M1 | Σ | H | $C_6H_{11}$ |
| 16 | $C_6H_{13}$ | — | — | Py2 | Ph | — | M1 | Σ | H | $C_8H_{17}$ |
| 17 | $C_6H_{13}CH(CH_3)CH_2O$ | — | — | Py2 | Ph | — | M1 | Σ | H | $C_9H_{18}$ |
| 18 | $C_6H_{11}O$ | — | — | Py2 | P23F | — | M1 | Σ | H | $C_4H_9$ |
| 19 | $C_{10}H_{21}$ | — | — | Py2 | Ph | — | M1 | Σ | H | $C_6H_{13}$ |
| 20 | $C_8H_{17}$ | — | — | Py2 | Ph3F | — | M1 | Σ | H | $C_8H_{17}$ |
| 21 | $C_6H_{13}$ | — | — | Cy | Ph | — | M1 | Σ | H | $C_4H_8$ |
| 22 | $C_3H_7$ | — | — | Cy | Ph | — | M1 | Σ | H | $C_6H_{11}$ |
| 23 | $C_6H_{11}$ | — | — | Cy | Ph | — | M1 | Σ | H | $C_{14}H_{28}$ |
| 24 | $C_{10}H_{21}$ | — | — | Cy | Ph | — | M1 | Σ | H | $C_{10}H_{21}$ |
| 25 | $C_6H_{13}$ | — | — | Pa | Ph | — | M1 | Σ | H | $C_{10}H_{21}$ |
| 26 | $C_7H_{15}OCO$ | — | — | Pd | Ph | — | M1 | Σ | H | $C_3H_7$ |
| 27 | $C_6H_{13}$ | — | — | Dt2 | Ph | — | M1 | Σ | H | $C_6H_{13}$ |
| 28 | $C_8H_{17}$ | — | — | Tn | Ph | — | M1 | Σ | H | $C_9H_{18}$ |
| 29 | $C_6H_{19}$ | — | — | Tz1 | Ph | — | M1 | Σ | H | $C_9H_{19}$ |

-continued

| No. | $R^{6"}$ | $A^{6"}$ | $X^{6"}$ | $A^{7"}$ | $A^{8"}$ | $X^{7"}$ | $R^{7"}$ | $\Sigma"$ | $R^{8"}$ | $R^{9"}$ |
|---|---|---|---|---|---|---|---|---|---|---|
| 30 | $C_9H_{18}O$ | — | — | Tz2 | Ph | — | M1 | Σ | H | $C_6H_{13}$ |
| 31 | $C_2H_5$ | — | — | Td | Ph | — | M1 | Σ | H | $C_7H_{15}$ |
| 32 | $C_{10}H_{21}$ | — | — | Dx2 | Ph | — | M1 | Σ | H | $C_8H_{17}$ |
| 33 | $C_6H_{13}$ | — | — | Boa2 | Ph | — | M1 | Σ | H | $C_{10}H_{21}$ |
| 34 | $C_{15}H_{31}$ | — | — | Bob2 | Ph | — | M1 | Σ | H | $C_{10}H_{21}$ |
| 35 | $C_7H_{15}$ | — | — | Bta2 | Ph | — | M1 | Σ | H | $C_6H_{13}$ |
| 36 | $C_{16}H_{33}O$ | — | — | Btb2 | Ph | — | M1 | Σ | H | $C_9H_{18}$ |
| 37 | $C_6H_{13}$ | — | — | Np | Ph | — | M1 | Σ | H | $C_6H_{13}$ |
| 38 | $C_5H_{11}$ | — | — | Np | Ph | — | Cb | Σ | H | $C_4H_8$ |
| 39 | $C_8H_{17}(CH_3)CH_2O$ | — | — | Ep1 | Ph | — | Cb | Σ | H | $C_6H_{13}$ |
| 40 | $C_4H_8$ | — | — | Ep2 | Ph | — | M1 | Σ | H | $C_8H_{17}$ |
| 41 | $C_6H_{13}$ | — | — | Gp1 | Ph | — | M1 | Σ | H | $C_6H_{13}$ |
| 42 | $C_7H_{15}$ | — | — | Gp2 | Ph | — | M1 | Σ | H | $C_{12}H_{25}$ |
| 43 | $C_6H_{13}$ | — | — | Cm1 | Ph | — | M1 | Σ | H | $C_{10}H_{21}$ |
| 44 | $C_8H_{17}$ | — | — | Io1 | Ph | — | M1 | Σ | H | $C_{12}H_{25}$ |
| 45 | $C_{18}H_{37}$ | — | — | Id1 | Ph | M1 | M1 | Σ | H | $C_6H_{13}$ |
| 46 | $C_{11}H_{23}$ | — | — | Id1 | Ph | — | M1 | Σ | H | $C_5H_{11}$ |
| 47 | $C_8H_{17}$ | — | — | Id1 | Ph | — | M1 | Σ | H | $C_5H_{11}$ |
| 48 | $C_5H_{11}$ | — | — | Id1 | Ph2F | — | M1 | Σ | H | $C_6H_{13}$ |
| 49 | $C_6H_{13}$ | — | — | Tn | Ph | — | M1 | Σ | H | $C_6H_{13}$ |
| 50 | $C_4H_9O$ | — | — | Tz1 | Ph | — | M1 | Σ | H | $C_8H_{17}$ |
| 51 | $C_{12}H_{25}$ | — | — | Btb2 | Ph | — | M1 | Σ | H | $C_{10}H_{21}$ |
| 52 | $C_6H_{13}O$ | — | — | Btb2 | Ph | — | M1 | Σ | H | $C_6H_{13}$ |
| 53 | $CH_2=CH(CH_2)_3O$ | — | — | Ep2 | Ph | — | M1 | Σ | H | $C_5H_{11}$ |
| 54 | $C_8H_{18}$ | — | — | Gp2 | Ph | — | M1 | Σ | H | $C_6H_{13}$ |
| 55 | $C_5H_{11}$ | — | — | Np | Ph | — | M1 | Σ | H | $C_6H_{13}$ |
| 56 | $C_6H_{13}$ | Ph | — | Ph | Ph | Cb | M1 | Σ | H | $C_6H_{13}$ |
| 57 | $C_8H_{17}COO$ | Pr2 | — | Ph | Ph | — | M1 | Σ | H | $C_5H_{11}$ |
| 58 | $C_3H_7$ | Py2 | — | Ph | Ph | — | M1 | Σ | H | $C_4H_8$ |
| 59 | $C_5H_{11}$ | — | — | Ha2 | Ph | — | M1 | Σ | H | $C_4H_3$ |
| 60 | $C_6H_{13}$ | Ph | COO | Pr2 | Ph | — | M1 | Σ | H | $C_6H_{13}$ |
| 61 | $C_9H_{18}$ | Ph | — | Pr1 | Ph | — | Cb | Σ | H | $C_6H_{13}$ |
| 62 | $C_{13}H_{27}$ | Ph | — | Cy | P3Br | M1 | Cb | Σ | H | $C_5H_{11}$ |
| 63 | $C_{10}H_{21}O$ | Ph | OCO | Py1 | Ph | — | M1 | Σ | My | $C_6H_{13}$ |
| 64 | $C_7H_{16}$ | Ph | — | Py2 | Ph | — | M1 | Σ | H | $C_5H_{11}$ |
| 65 | $C_4H_9$ | Ph3TF | COO | Pa | Ph | — | M1 | Σ | H | $C_6H_{23}$ |
| 66 | $CH_3$ | — | — | Hb2 | Ph | — | M1 | Σ | H | $C_8H_{17}$ |
| 67 | $C_8H_{17}$ | Ph | — | Tn | Ph | — | M1 | Σ | H | $(CH_2)_3CH(CH_3)_2$ |
| 68 | $C_2H_5$ | Ph | — | Tz1 | Ph2M | — | M1 | Σ | H | $C_8H_{17}$ |
| 69 | $C_6H_{13}$ | Ph | — | Ph | Ph | — | M1 | Σ | H | $C_8H_{17}$ |
| 70 | $C_{10}H_{21}$ | Ph | — | Td | Ph | — | M1 | Σ | H | $(CH_2)_3CH(CH_3)2$ |
| 71 | $C_{10}H_{21}$ | — | — | Ph | Py1 | - | M1 | Σ | H | $C_6H_{13}$ |
| 72 | $C_6H_{13}$ | — | — | Ph | Py1 | — | M1 | Σ | H | $C_4H_8$ |
| 73 | $C_6H_{13}OCO$ | — | — | Ph | Py1 | — | M1 | Σ | H | $C_6H_{13}$ |
| 74 | $C_7H_{15}$ | — | — | Ph | Pr2 | — | M1 | Σ | H | $C_5H_{11}$ |
| 75 | $C_9H_{19}$ | — | — | Ph | Pr2 | — | M1 | Σ | H | $(CH_2)_2CH(CH_3)_2$ |
| 76 | $C_7H_{16}$ | — | — | Ph | Pr2 | — | M1 | Σ | H | $C_6H_{13}$ |
| 77 | $C_5H_{11}O$ | — | — | Py2 | Cy | — | M1 | Σ | H | $C_{10}H_{21}$ |
| 78 | $C_4H_9$ | — | — | Ph | Cy | — | M1 | Σ | H | $C_{12}H_{25}$ |
| 79 | $C_{12}H_{25}$ | — | — | Ph | Cy | — | M1 | Σ | H | $C_5H_{11}$ |
| 80 | $C_6H_{13}C\equiv C$ | — | — | Ph | Pa | — | M1 | Σ | H | $C_{10}H_{21}$ |
| 81 | $C_8H_{17}O$ | — | — | Ph | Pd | — | M1 | Σ | H | $C_6H_{13}$ |
| 82 | $C_3H_7$ | — | — | P2Cl | Tn | — | M1 | Σ | H | $C_{10}H_{21}$ |
| 83 | $C_4H_8$ | — | — | Ph | Tn | — | M1 | Σ | H | $C_8H_{17}$ |
| 84 | $C_8H_{17}$ | — | — | Ph | Tz1 | — | M1 | Σ | H | $C_8H_{17}$ |
| 85 | $C_4H_9OCH(CH_3)COO$ | — | — | Ph | Tz1 | — | M1 | Σ | H | $C_7H_{15}$ |
| 86 | $C_6H_{13}$ | — | — | Ph2F | Td | — | M1 | Σ | My | $(CH_2)_3CH(CH_3)C_6H_{13}$ |
| 87 | $C_5H_{11}$ | — | — | Py2 | Np | — | M1 | Σ | H | $C_9H_{19}$ |
| 88 | $CH_3$ | — | — | Ph | Np | — | M1 | Σ | H | $C_{12}H_{25}$ |
| 89 | $C_{11}H_{23}$ | — | — | Ph | Np | — | M1 | Σ | H | $C_6H_{13}$ |
| 90 | $C_5H_{11}$ | — | — | Py1 | Ep1 | — | M1 | Σ | H | $C_5H_{11}$ |
| 91 | $C_8H_{17}OC_2H_4$ | — | — | Ph | Ep1 | — | M1 | Σ | H | $C_5H_{11}$ |
| 92 | $C_6H_{13}$ | — | — | Ph | Ep1 | — | M1 | Σ | H | $C_8H_{17}$ |
| 93 | $C_9H_{19}$ | — | — | Py1 | Gp1 | — | M1 | Σ | H | $C_6H_{11}$ |
| 94 | $C_8H_{17}$ | — | — | Ph | Gp1 | — | M1 | Σ | H | $C_6H_{13}$ |
| 95 | $C_3H_7COO$ | — | — | Ph | Gp1 | — | M1 | Σ | H | $C_8H_{17}$ |
| 96 | $C_4H_9$ | — | — | Ph | Id1 | — | M1 | Σ | H | $C_8H_{17}$ |
| 97 | $C_{12}H_{25}$ | — | — | Ph | Io1 | Cb | M1 | Σ | H | $C_6H_{13}$ |
| 98 | $C_{10}H_{21}$ | — | — | Ph | Cm1 | — | M1 | Σ | H | $C_8H_{17}$ |
| 99 | $C_6H_{13}$ | — | — | Ph | Ph | — | M1 | Σ | H | $C_8H_{17}$ |
| 100 | $C_3H_7$ | Ph | $OCH_2$ | Ph | Py1 | — | M1 | Σ | H | $C_{12}H_{25}$ |
| 101 | $C_4H_8$ | Ph2CN | — | Ph | Pr1 | — | M1 | Σ | H | $C_{10}H_{21}$ |
| 102 | $C_5H_{11}$ | Ph | $CH_2O$ | Ph3F | Tz1 | Cb | M1 | Σ | H | $C_6H_{13}$ |
| 103 | $C_6H_{13}$ | Ph | — | Ph | Tn | — | M1 | Σ | H | $C_8H_{17}$ |
| 104 | $C_7H_{15}$ | Tn | — | Ph | Py1 | — | M1 | Σ | H | $C_8H_{17}$ |
| 105 | $C_{10}H_{21}$ | Ph | — | Ph | Cy1 | — | M1 | Σ | H | $C_5H_{11}$ |

In Table A, the respective abbreviations (symbols) mean the following groups, respectively.
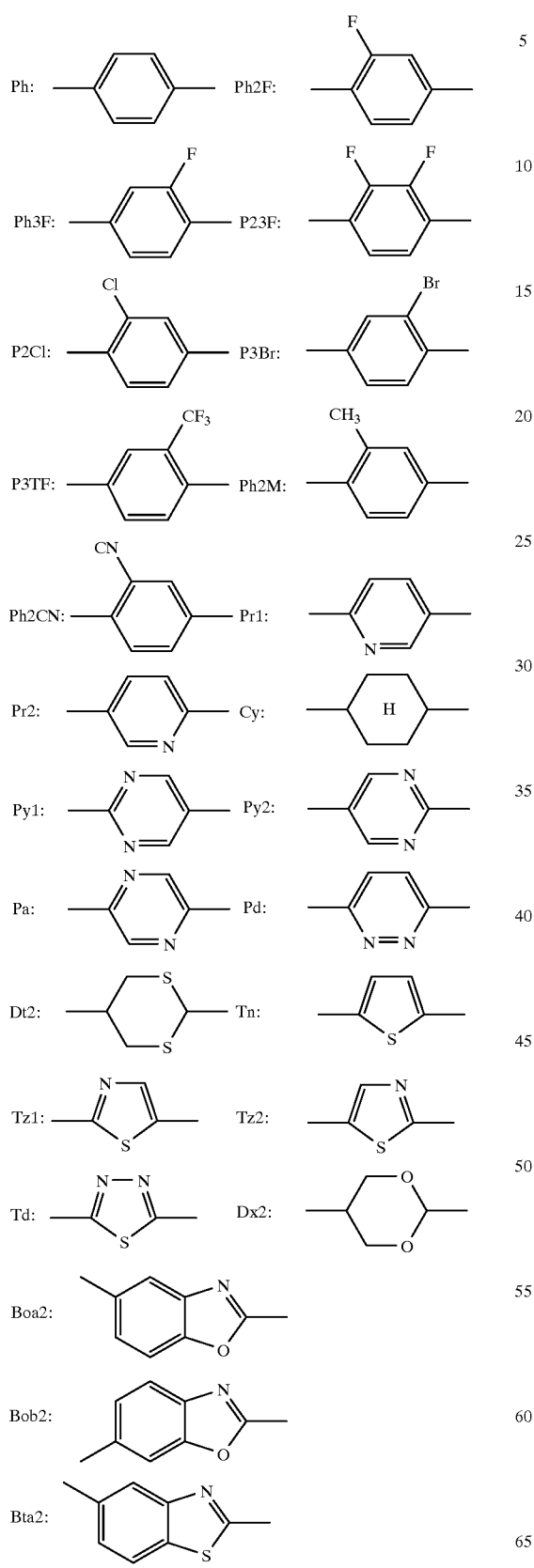
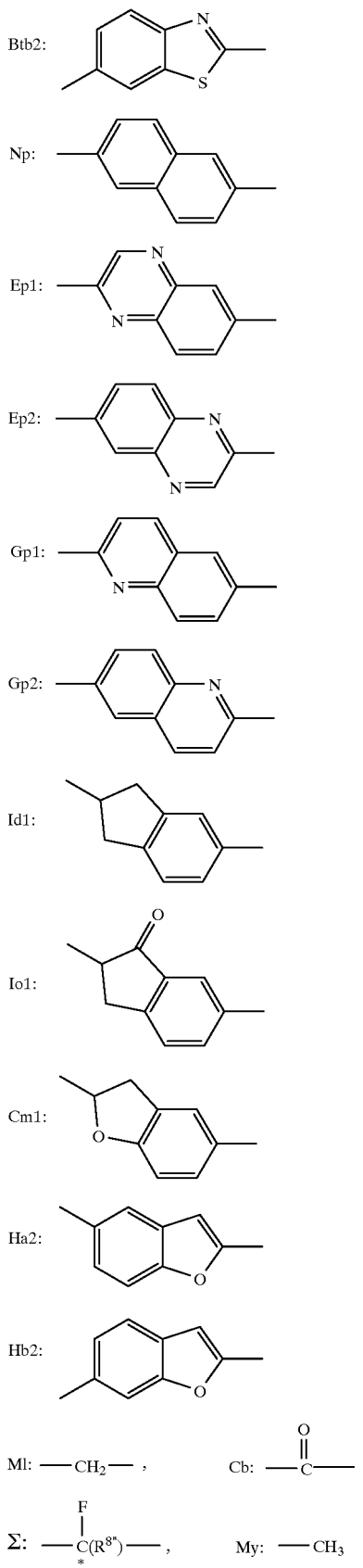

Table B (for Compounds Nos. B-1 to B-105)

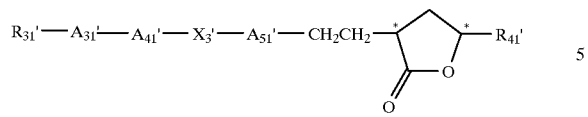

| No. | $R_{31}'$ | $A_{31}'$ | $A_{41}'$ | $X_3'$ | $A_{51}'$ | L | $R_{41}'$ |
|---|---|---|---|---|---|---|---|
| 1 | $C_6H_{13}$ | — | — | — | Ph | L | $C_6H_{17}$ |
| 2 | $C_8H_{17}O$ | — | — | — | Ph | L | $C_{18}H_{37}$ |
| 3 | $C_6H_{11}O$ | — | — | — | Ph2F | L | $C_6H_{13}$ |
| 4 | $CH_3O$ | — | Ph | — | Ph | L | $C_6H_{13}$ |
| 5 | $C_6H_{13}CHF(CH_2)_2O$ | — | Ph | — | Ph | L | $C_6H_{13}$ |
| 6 | $C_7H_{15}O$ | — | Ph | — | P23F | L | $C_6H_{13}$ |
| 7 | $C_6H_{13}$ | — | Ph | —$OCH_2$— | Ph | L | $C_9H_{19}$ |
| 8 | $C_6F_{13}CH_2O$ | — | Ph | —C≡C— | Ph | L | $C_6H_{11}$ |
| 9 | $C_8H_{17}O$ | — | Ph | —COO— | Ph | L | $C_6H_{13}$ |
| 10 | $C_8H_{17}$ | — | Pr1 | — | Ph | L | $C_8H_{17}$ |
| 11 | $C_{10}H_{21}$ | — | Pr2 | — | Ph | L | $C_4H_9$ |
| 12 | $C_{11}H_{23}$ | — | Pr2 | — | Ph | L | $C_6H_{13}$ |
| 13 | $C_{12}H_{25}$ | — | Pr2 | —COO— | Ph | L | $C_8H_{17}$ |
| 14 | $C_4H_9O$ | — | Py1 | — | Ph | L | $C_{10}H_{21}$ |
| 15 | $C_{13}H_{27}$ | — | Py2 | — | Ph | L | $C_6H_{11}$ |
| 16 | $C_6H_{13}$ | — | Py2 | — | Ph | L | $C_8H_{17}$ |
| 17 | $C_6H_{13}CHFCH_2O$ | — | Py2 | — | Ph | L | $C_9H_{19}$ |
| 18 | $C_6H_{11}O$ | — | Py2 | — | P23F | L | $C_4H_9$ |
| 19 | $C_{10}H_{21}$ | — | Py2 | — | Ph | L | $C_6H_{13}$ |
| 20 | $C_8H_{17}$ | — | Py2 | — | Ph3F | L | $C_5H_{15}$ |
| 21 | $C_8H_{13}$ | — | Cy | — | Ph | L | $C_4H_8OC_4H_9$ |
| 22 | $C_7H_{15}OCO$ | — | Cy | — | Ph | L | $C_{14}H_{29}$ |
| 23 | $C_6H_{13}$ | — | Cy | —CH=CH— | Ph | L | $C_{10}H_{21}$ |
| 24 | $C_3H_7$ | — | Cy | —COO— | Ph | L | $C_6H_{13}$ |
| 25 | $C_5H_{11}$ | — | Pa | — | Ph | L | $C_8H_{17}$ |
| 26 | $C_{10}H_{21}$ | — | Pd | — | Ph | L | $C_6H_{13}$ |
| 27 | $C_6H_{13}$ | — | Dt2 | — | Ph | L | $(CH_2)_7CH=CH_2$ |
| 28 | $C_8H_{17}$ | — | Tn | — | Ph | L | $C_9H_{19}$ |
| 30 | $C_5H_{11}$ | — | Tz1 | — | Ph | L | $C_8H_{17}$ |
| 31 | $C_9H_{19}O$ | — | Tz2 | — | Ph | L | $C_5H_{11}$ |
| 32 | $C_2H_5$ | — | Td | — | Ph | L | $C_8H_{17}$ |
| 33 | $C_{10}H_{21}$ | — | Dx2 | — | Ph | L | $C_7H_{15}$ |
| 34 | $C_6H_{13}$ | — | Boa2 | — | Ph | L | $C_{10}H_{21}$ |
| 35 | $C_7H_{15}$ | — | Bob2 | — | Ph | L | $C_6H_{13}$ |
| 36 | $C_{16}H_{33}O$ | — | Bta2 | — | Ph | L | $C_6H_{13}$ |
| 37 | $C_6H_{13}$ | — | Btb2 | — | Ph | L | $C_{14}H_{29}$ |
| 38 | $C_5H_{11}$ | — | Np | —COO— | Ph | L | $C_7H_{15}$ |
| 39 | $C_8H_{17}CFHCH_2O$ | — | Ep1 | — | Ph | L | $C_{10}H_{21}$ |
| 40 | $C_4H_9$ | — | Ep2 | — | Ph | L | $C_6H_{13}$ |
| 41 | $C_6H_{13}$ | — | Gp1 | — | Ph | L | $C_{12}H_{25}$ |
| 42 | $C_7H_{15}$ | — | Gp2 | — | Ph | L | $C_6H_{13}$ |
| 43 | $C_6H_{13}$ | — | Cm1 | — | Ph | L | $C_9H_{17}$ |
| 44 | $C_8H_{17}$ | — | Io1 | — | Ph | L | $C_6H_{13}$ |
| 45 | $C_{20}H_{41}$ | — | Id1 | —COO— | Ph | L | $C_4H_9$ |
| 46 | $C_{11}H_{23}$ | — | Id1 | — | Ph | L | $C_8H_{17}$ |
| 47 | $C_8H_{17}$ | — | Id1 | — | Ph | L | $C_8H_{17}$ |
| 48 | $C_6H_{11}$ | — | Id1 | — | Ph2F | L | $C_6H_{13}$ |
| 49 | $C_6H_{13}$ | — | Tn | — | Ph | L | $C_7H_{15}$ |
| 50 | $C_4H_9O$ | — | Tz2 | — | Ph | L | $C_9H_{19}$ |
| 51 | $C_{12}H_{25}$ | — | Btb2 | — | Ph | L | $C_6H_{13}$ |
| 52 | $C_6H_{13}O$ | — | BtB2 | — | Ph | L | $C_9H_{19}$ |
| 53 | $CH_3=CH(CH_2)_3O$ | — | Ep2 | — | Ph | L | $C_6H_{13}$ |
| 54 | $C_9H_{19}$ | — | Gp2 | — | Ph | L | $C_5H_{11}$ |
| 55 | $C_5H_{11}O$ | — | Np | — | Ph | L | $C_{10}H_{21}$ |
| 56 | $C_6H_{13}$ | Ph | Ph | — | Ph | L | $C_3H_7$ |
| 57 | F | Pr2 | Ph | — | Ph | L | $C_5H_{13}$ |
| 58 | $C_3H_7$ | Py2 | Ph | — | Ph | L | $C_8H_{17}$ |
| 59 | $C_5H_{11}$ | — | Ha2 | — | Ph | L | $C_{11}H_{23}$ |
| 60 | $C_6H_{13}$ | Ph | Pr2 | — | Ph | L | $C_6H_{13}$ |
| 61 | $C_9H_{19}$ | Ph | Pr1 | — | Ph | L | $C_5H_{11}$ |
| 62 | $C_{13}H_{27}$ | Ph | Cy | — | Ph3Br | L | $C_7H_{15}$ |
| 63 | $C_{10}H_{21}O$ | Ph | Py1 | — | Ph | L | $C_6H_{13}$ |
| 64 | $C_7H_{15}$ | Ph | Py2 | — | Ph | L | $C_{10}H_{21}$ |
| 65 | $C_4H_9$ | Ph3TF | Pa | — | Ph | L | $(CH_2)_3CH(CH_3)_2$ |
| 66 | H | — | Hb2 | — | Ph | L | $C_8H_{17}$ |
| 67 | $C_8H_{17}$ | Ph | Tn | — | Ph | L | $C_5H_{11}$ |

-continued

| No. | R$_{31}$' | A$_{31}$' | A$_{41}$' | X$_{3}$' | A$_{51}$' | L | R$_{41}$' |
|---|---|---|---|---|---|---|---|
| 68 | C$_2$H$_5$ | Ph | Tz1 | — | Ph2M | L | C$_3$H$_7$ |
| 69 | C$_5$H$_{13}$ | Ph | Tz2 | — | Ph | L | C$_5$H$_{13}$ |
| 70 | C$_{10}$H$_{21}$ | Ph | Td | — | Ph | L | C$_7$H$_{15}$ |
| 71 | C$_{10}$H$_{21}$ | — | Ph | — | Py1 | L | C$_6$H$_{13}$ |
| 72 | C$_6$H$_{13}$ | — | Ph | — | Py1 | L | C$_6$H$_{13}$ |
| 73 | C$_6$H$_{13}$OCO | — | Ph | — | Py1 | L | C$_5$H$_{11}$ |
| 74 | C$_7$H$_{15}$ | — | — | — | Pr2 | L | C$_{10}$H$_{21}$ |
| 75 | C$_9$H$_{19}$ | — | Ph | — | Pr2 | L | C$_1$H$_{17}$ |
| 76 | C$_3$H$_7$ | — | Ph | — | Pr2 | L | C$_6$H$_{13}$ |
| 77 | C$_5$H$_{11}$O | — | — | — | Cy | L | C$_4$H$_9$ |
| 78 | C$_4$H$_9$ | — | Ph | —CH$_2$O— | Cy | L | C$_7$H$_{15}$ |
| 79 | C$_{12}$H$_{25}$ | — | Ph | — | Cy | L | C$_3$H$_7$ |
| 80 | C$_6$H$_{13}$C≡C | — | Ph | — | Pa | L | C$_6$H$_{13}$ |
| 81 | C$_8$H$_{17}$O | — | Ph | — | Pd | L | C$_5$H$_{11}$ |
| 82 | C$_3$H$_7$ | — | P2Cl | — | Tn | L | C$_{10}$H$_{21}$ |
| 83 | C$_4$H$_9$ | — | Ph | — | Tn | L | C$_7$H$_{15}$ |
| 84 | C$_8$H$_{17}$ | — | Ph | — | Tz1 | L | C$_{12}$H$_{25}$ |
| 85 | C$_4$H$_9$OCH(CH$_3$)COO | — | Ph | — | Tz1 | L | C$_5$H$_{11}$ |
| 86 | C$_6$H$_{13}$ | — | Ph2F | — | Td | L | (CH$_2$)$_3$CH(CH$_3$)C$_6$H$_{13}$ |
| 87 | C$_5$H$_{11}$ | — | — | — | Np | L | C$_9$H$_{19}$ |
| 88 | C$_8$H$_{17}$OCH$_2$CH$_2$ | — | Ph | — | Np | L | C$_5$H$_{11}$ |
| 89 | C$_{11}$H$_{23}$ | — | Ph | — | Np | L | C$_6$H$_{13}$ |
| 90 | C$_5$H$_{11}$ | — | — | — | Ep1 | L | C$_4$H$_8$ |
| 91 | CH$_3$ | — | Ph | — | Ep1 | L | C$_7$H$_{15}$ |
| 92 | C$_6$H$_{13}$ | — | Ph | — | Ep1 | L | C$_6$H$_{13}$ |
| 93 | C$_9$H$_{19}$O | — | — | — | Gp1 | L | C$_8$H$_{17}$ |
| 94 | C$_8$H$_{17}$ | — | Ph | — | Gp1 | L | C$_{10}$H$_{21}$ |
| 95 | C$_3$H$_7$COO | — | Ph | — | Gp1 | L | C$_{11}$H$_{23}$ |
| 96 | C$_4$H$_9$ | — | Ph | — | Id1 | L | C$_7$H$_{15}$ |
| 97 | C$_{12}$H$_{25}$ | — | Ph | — | Io1 | L | C$_6$H$_{13}$ |
| 98 | C$_{10}$H$_{21}$ | — | Ph | — | Cm1 | L | C$_5$H$_{11}$ |
| 99 | C$_6$H$_{13}$ | — | Ph | — | Ph | L | (CH$_2$)$_4$C$_3$F$_7$ |
| 100 | C$_3$H$_7$ | Ph | Ph | — | Py1 | L | C$_7$H$_{15}$ |
| 101 | C$_4$H$_8$ | Ph2CN | Ph | — | Pr1 | L | C$_4$H$_9$ |
| 102 | C$_5$H$_{11}$ | Ph | Ph3F | — | Tz1 | L | C$_3$H$_7$ |
| 103 | CN | Ph | Ph | — | Tn | L | CH$_3$ |
| 104 | C$_7$H$_{15}$ | Tn | Ph | — | Py1 | L | C$_8$H$_{17}$ |
| 105 | C$_{10}$H$_{21}$ | Ph | Ph | — | Cy | L | C$_6$H$_{13}$ |

In Table B, the respective abbreviations mean the following groups, respectively.

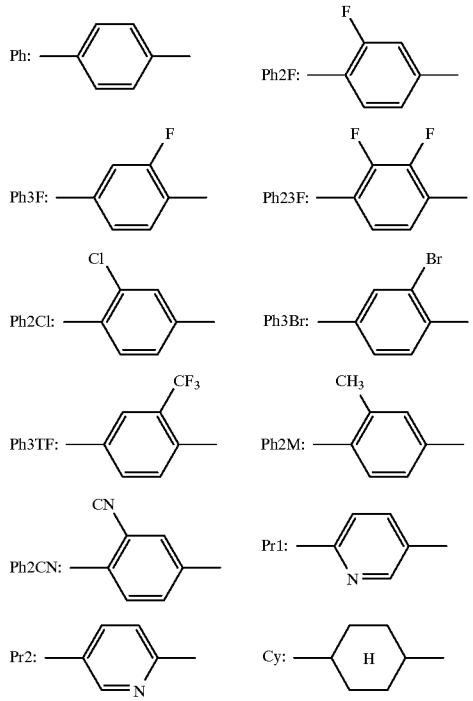

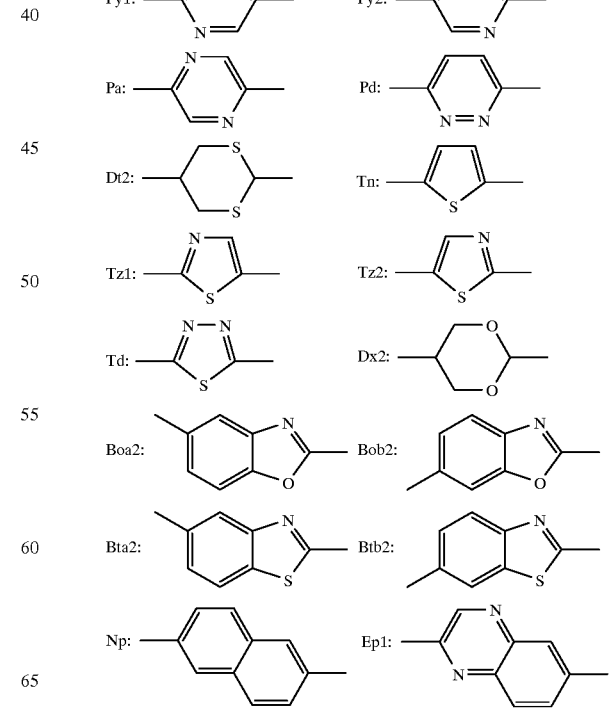

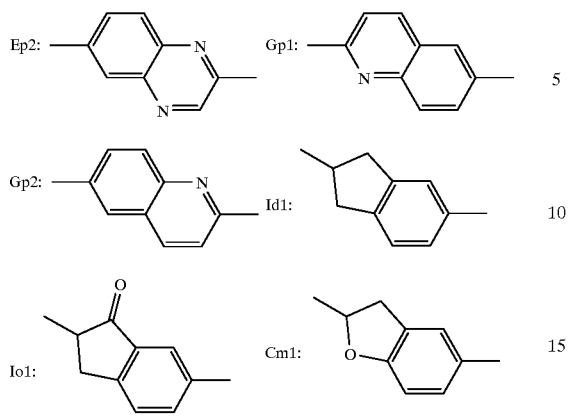
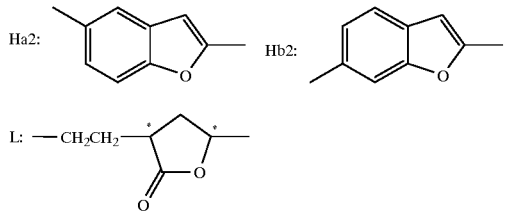
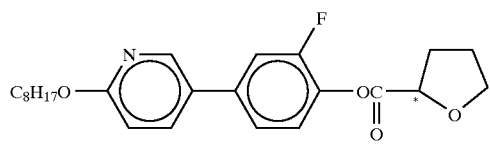
C-1
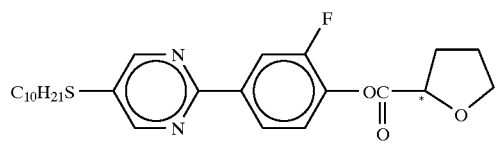
C-2
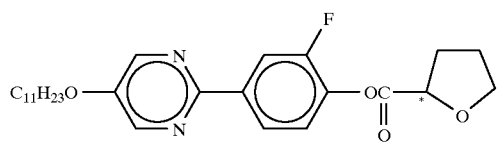
C-3
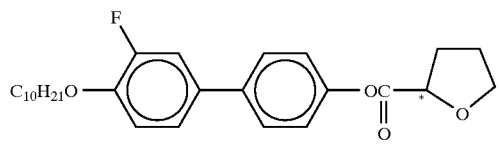
C-4
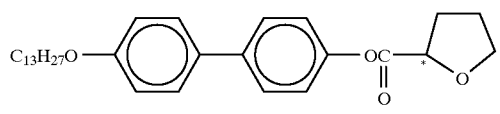
C-5
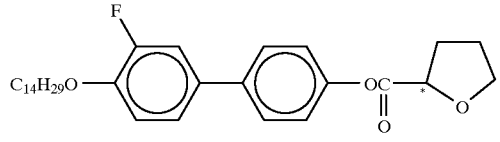
C-6
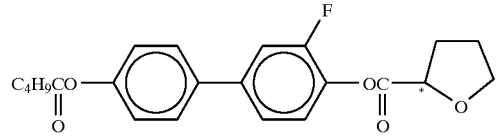
C-7

C-8
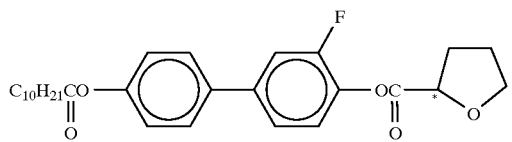
C-9
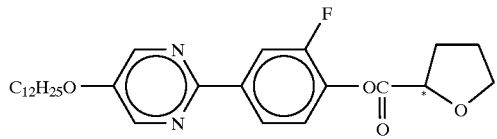
C-10
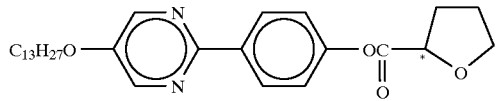
C-11
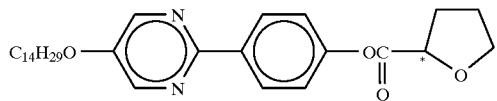
C-12
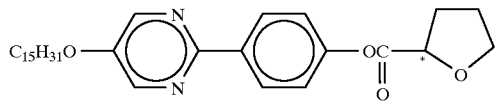
C-13
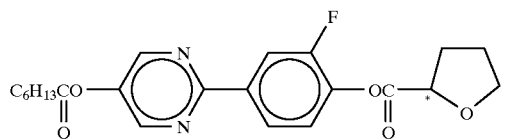
C-14
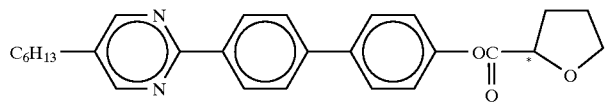
C-15
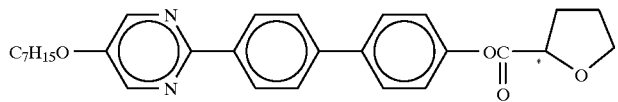
C-16
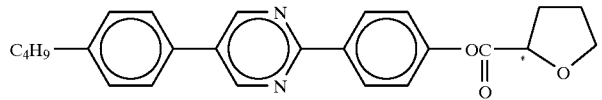
C-17
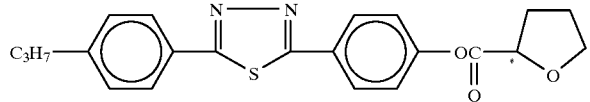
C-18
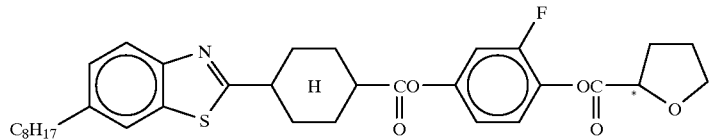
C-19
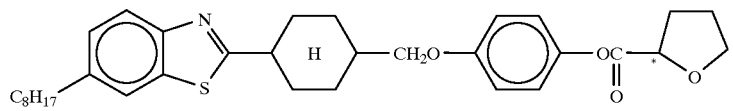

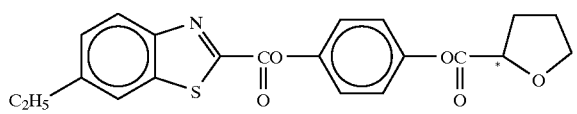
C-20
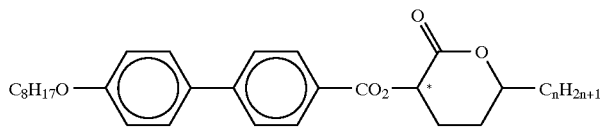
D-1: n = 6, 2R, 5R
D-2: n = 6, 2S, 5R
D-3: n = 4, 2R, 5R
D-4: n = 4, 2S, 5R
D-5: n = 3, 2R, 5R
D-6: n = 2, 2S, 5R
D-7: n = 2, 2R, 5R
D-8: n = 1, 2S, 5R
D-9: n = 1, 2R, 5R
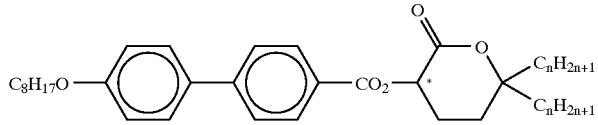
D-10: n = 1
D-11: n = 2
D-12: n = 3
D-13: n = 4
D-14: n = 6
D-15: n = 10
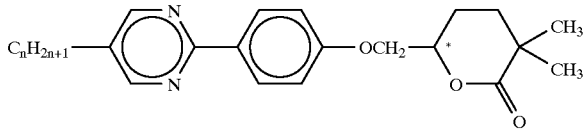
D-16: n = 8
D-17: n = 10
E-1: (2, 5-cis) 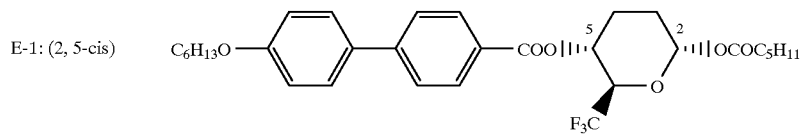
E-2: (2, 5-cis)
E-3: (2, 5-trans) 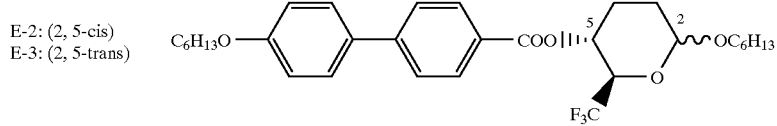
E-4: (2, 5-cis)
E-5: (2, 5-trans) 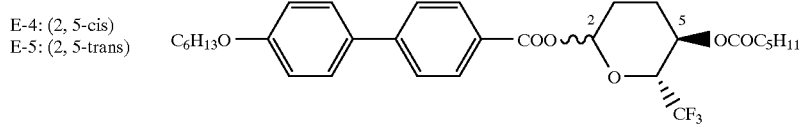
E-6: (2, 5-cis)
E-7: (2, 5-trans) 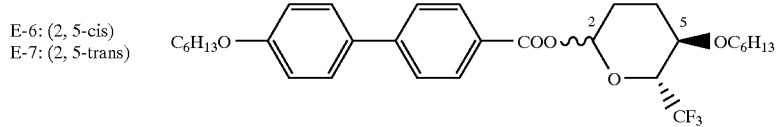
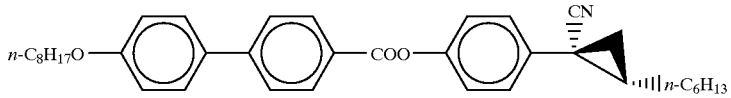

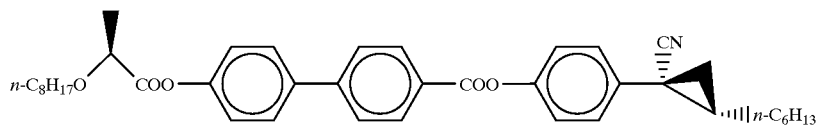

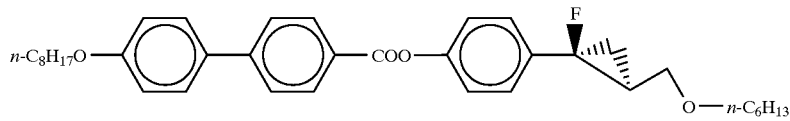

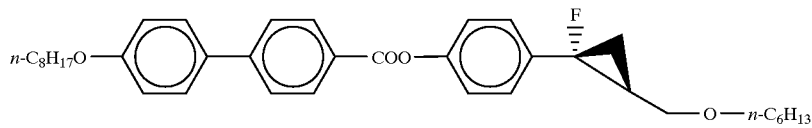

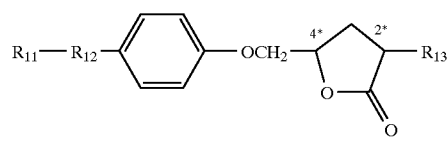

| $R_{11}$ | $R_{12}$ | $R_{13}$ | Configuration |
|---|---|---|---|
| 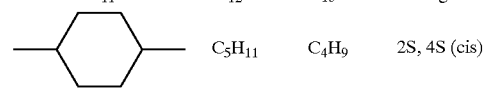 | $C_5H_{11}$ | $C_4H_9$ | 2S, 4S (cis) |
| 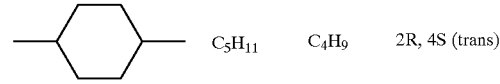 | $C_5H_{11}$ | $C_4H_9$ | 2R, 4S (trans) |
| 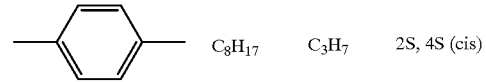 | $C_8H_{17}$ | $C_3H_7$ | 2S, 4S (cis) |
| 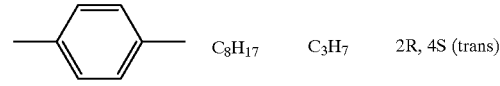 | $C_8H_{17}$ | $C_3H_7$ | 2R, 4S (trans) |
|  | $C_8H_{17}O$ | $C_4H_9$ | 2S, 4S (cis) |
| 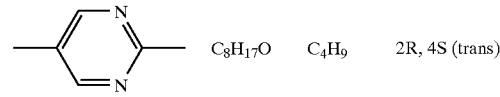 | $C_8H_{17}O$ | $C_4H_9$ | 2R, 4S (trans) |

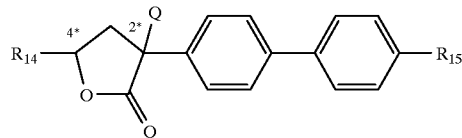

| $R_{14}$ | $R_{15}$ | Q | Configuration |
|---|---|---|---|
| $C_5H_{11}$ | $C_7H_{15}$ | H | 2R, 4S (cis) |
| $C_5H_{11}$ | $C_7H_{15}$ | H | 2S, 4S (trans) |
| $C_7H_{15}$ | $OC_9H_{19}$ | H | 2R, 4S (cis) |
| $C_7H_{15}$ | $OC_9H_{19}$ | H | 2S, 4S (trans) |
| $C_6H_{13}OCH_2$ | $C_7H_{15}$ | H | 2R, 4S (cis) |
| $C_6H_{13}OCH_2$ | $C_7H_{15}$ | H | 2S, 4S (trans) |
| $C_6H_{13}OCH_2$ | $OC_9H_{19}$ | H | 2R, 4S (cis) |
| $C_6H_{13}OCH_2$ | $OC_9H_{19}$ | H | 2S, 4S (trans) |
| $C_7H_{15}$ | $OC_9H_{19}$ | $CH_3$ | 2R, 4S (cis) |
| $C_7H_{15}$ | $OC_9H_{19}$ | $CH_3$ | 2S, 4S (trans) |

F-1

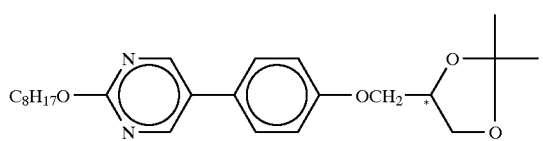

-continued
F-2
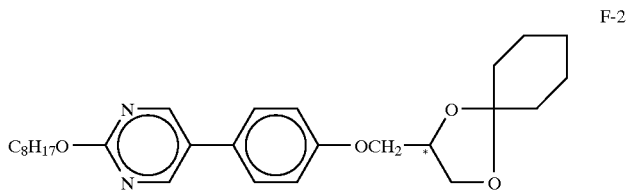
F-3
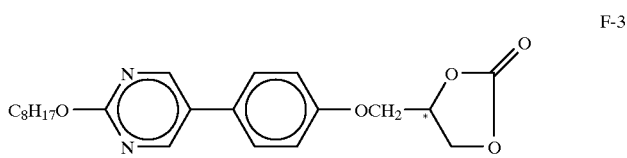
F-4
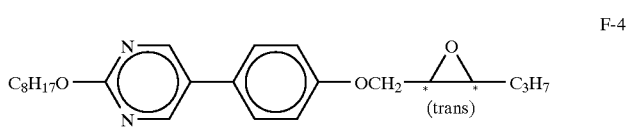
F-5
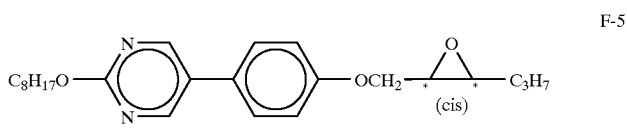
F-6
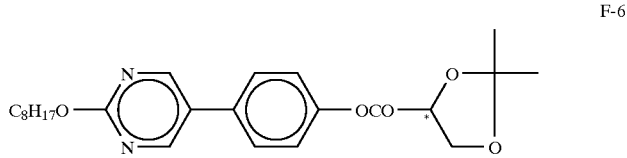
F-7
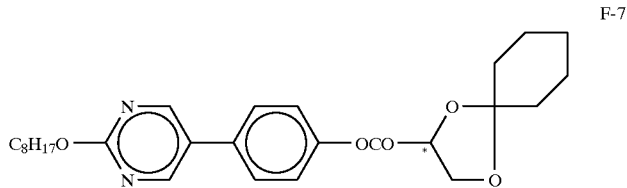
F-8
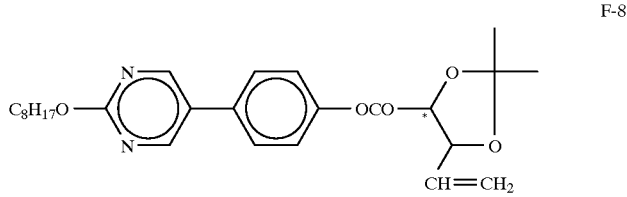
F-9
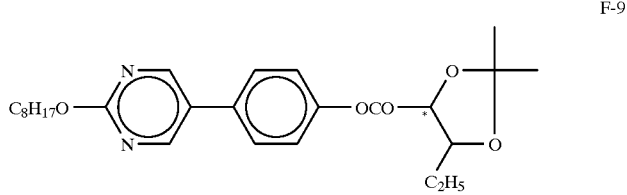
F-10
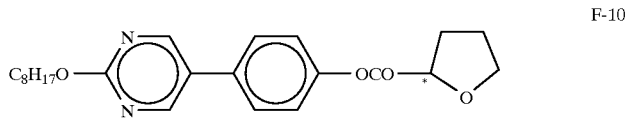
F-11
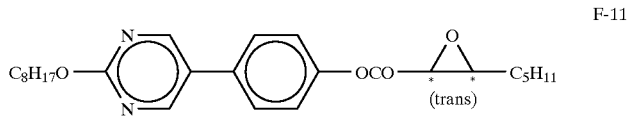

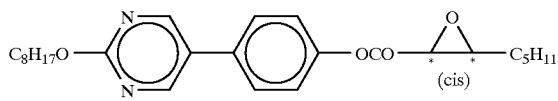

F-12

(cis)

The smectic liquid crystal used in the invention may further contain additives such as an antioxidant, an ultraviolet ray-absorbing agent, dyes and pigments.

The liquid crystal device according to the present invention is used as a display element (medium), for various liquid crystal apparatus, one embodiment of which is described below.

Figure 2:
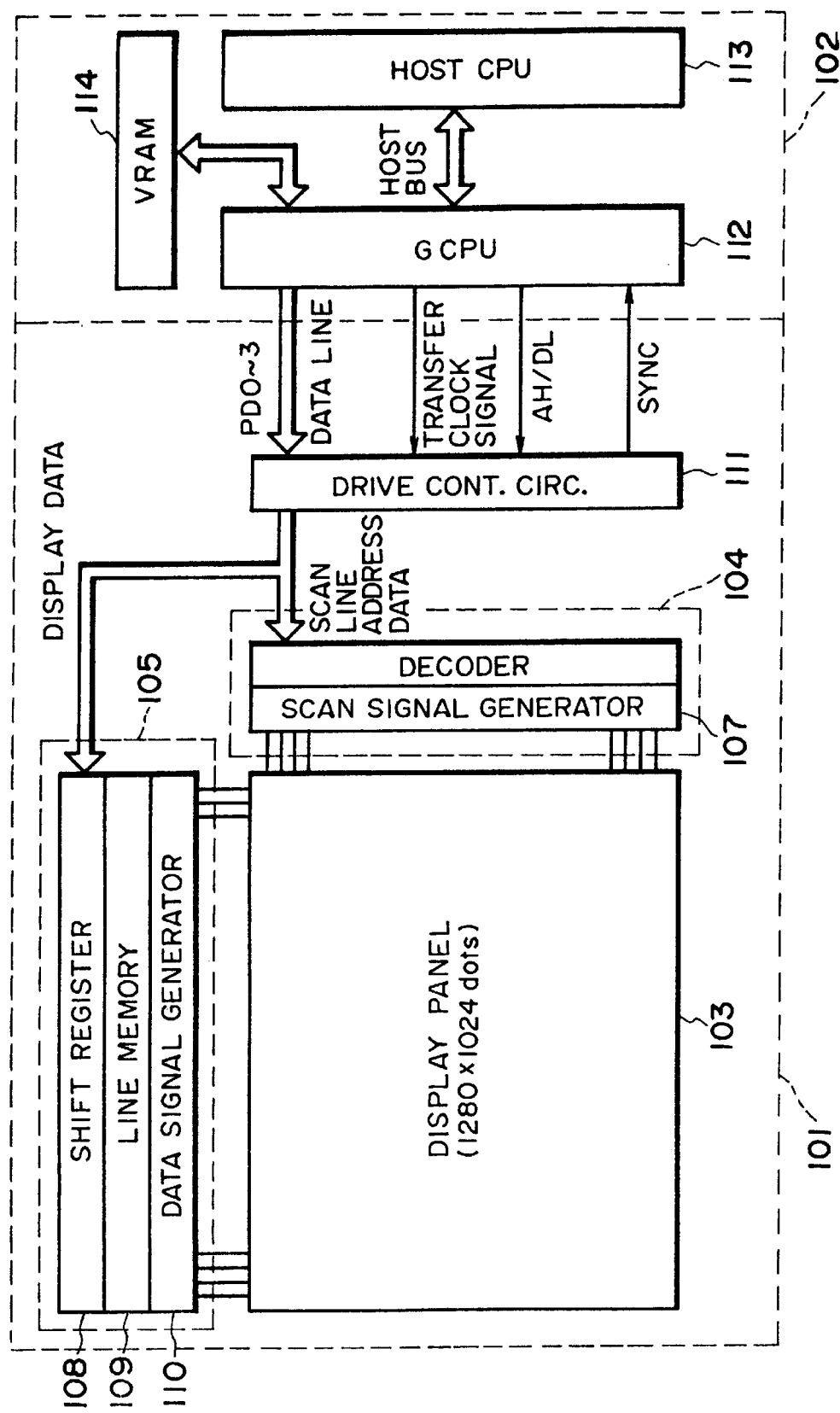
FIG. 2 is a block diagram showing a display apparatus comprising a liquid crystal device of the present invention and a graphic controller.
Figure 3:
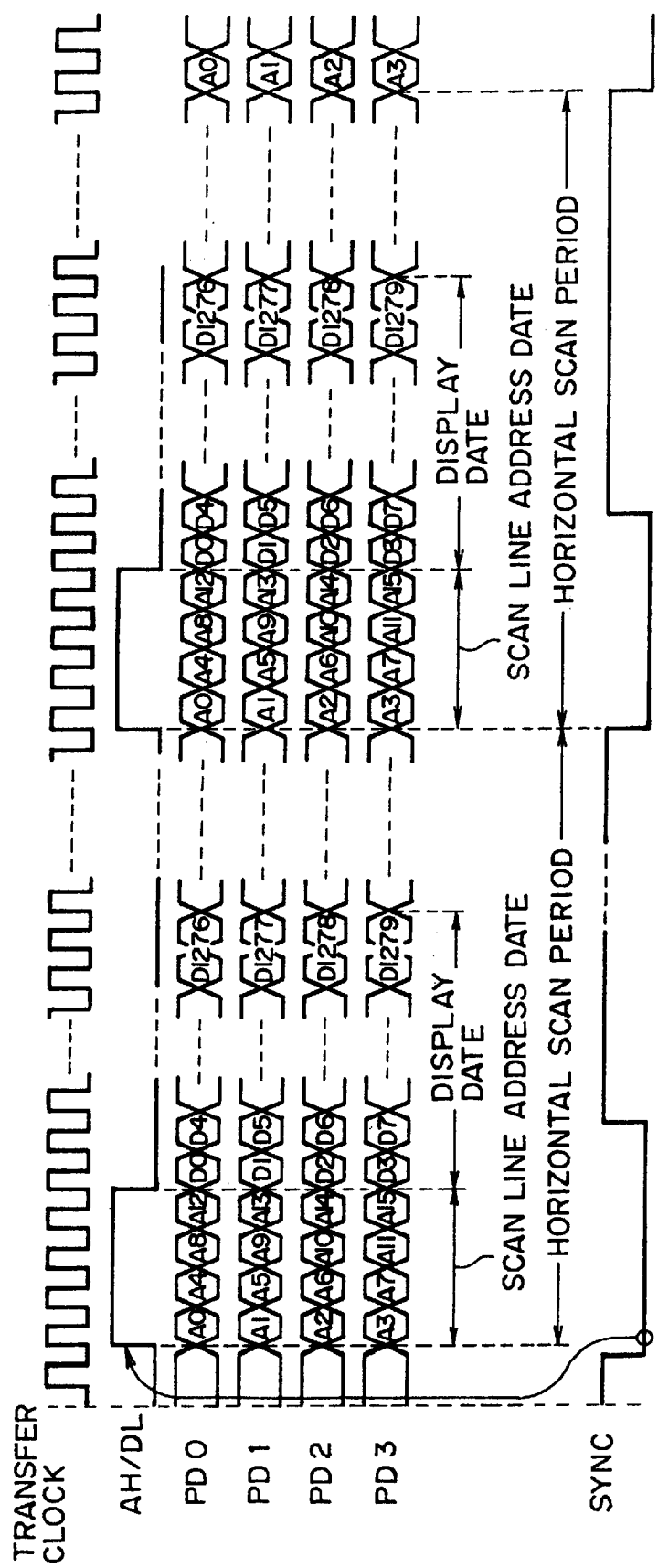
FIG. 3 is a time chart of image data communication showing time correlation between signal transfer and driving with respect to a liquid crystal display apparatus and a graphic controller.

Based on an arrangement appearing hereinbelow and data format comprising image data accompanied with scanning line address data and by adopting communication synchronization using a SYNC signal as shown in FIGS. 2 and 3, there is provided a liquid crystal display apparatus of the present invention which uses the liquid crystal device according to the present invention as a display panel portion.

Referring to FIG. 2, a(chiral smectic) liquid crystal display apparatus 101 includes a graphic controller 102, a display panel 103, a scanning line drive circuit 104, a data line drive circuit 105, a decoder 106, a scanning signal generator 107, a shift resistor 108, a line memory 109, a data signal generator 110, a drive control circuit 111, a graphic central processing unit (GCPU) 112, a host central processing unit (host CPU) 113, and an image data storage memory (VRAM) 114.

Image data are generated in the graphic controller 102 in an apparatus body and transferred to a display panel 103 by signal transfer means. The graphic controller 102 principally comprises a CPU (central processing unit, hereinafter referred to as "GCPU") 112 and a VRAM (video-RAM, image data storage memory) 114 and is in charge of management and communication of image data between a host CPU 113 and the liquid crystal display apparatus (FLCD) 101. The control of the display apparatus is principally performed by the graphic controller 102. A light source (not shown) is disposed behind the display panel 103.

The liquid crystal display apparatus of the present invention employs the above-described liquid crystal device showing a good switching characteristic as a display panel (medium), so that the display apparatus exhibits excellent drive characteristics and reliability and provides high-definition and large-area display images at high speed.

The liquid crystal device according to the present invention may be driven by driving methods as disclosed in, e.g., JP-A 59-193426, JP-A 59-193427, JP-A 60-156046 and JP-A 60-156047.

Figure 6A:
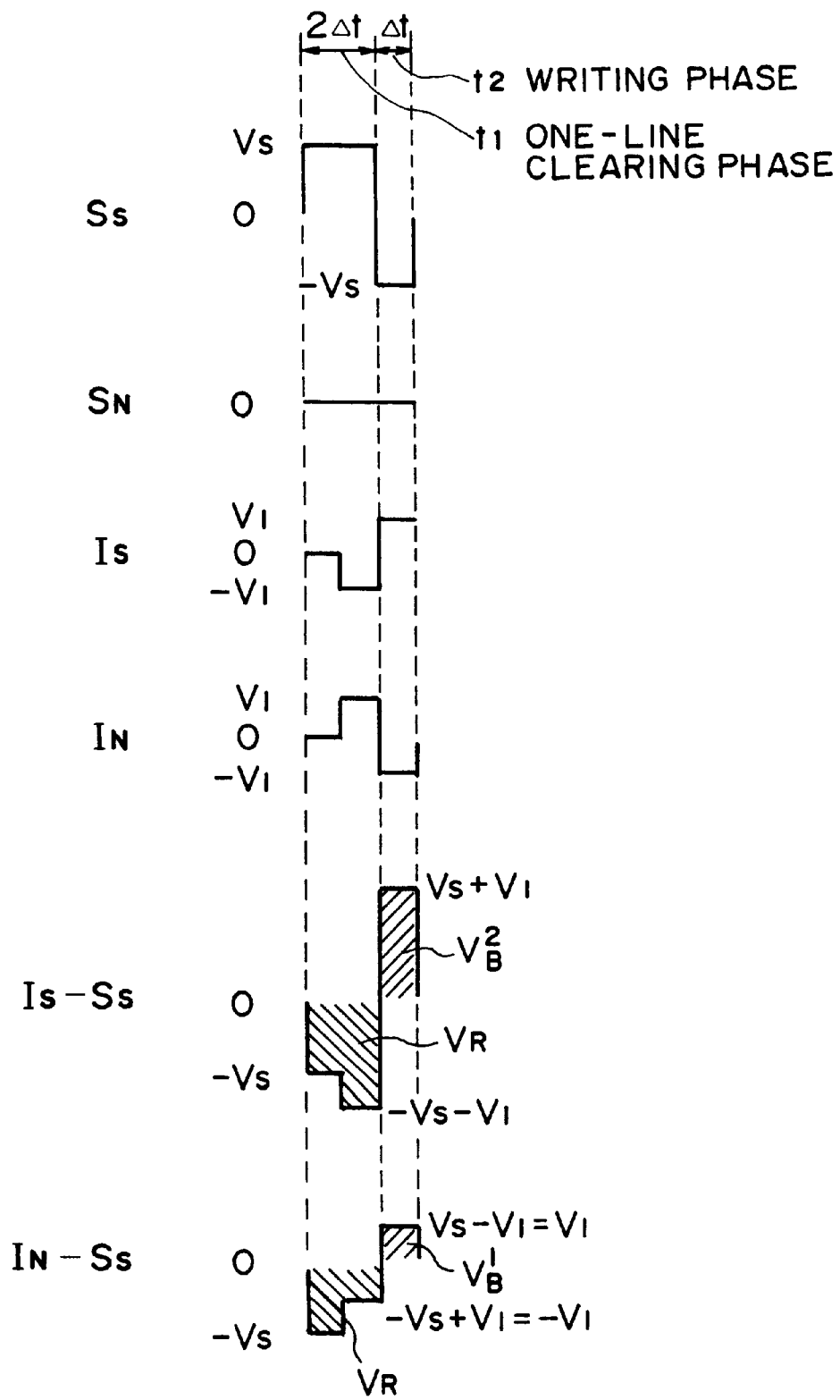
FIG. 6A shows an embodiment of unit driving waveforms and FIG. 6B is time-serial waveforms comprising a succession of such unit waveforms.
Figure 6B:
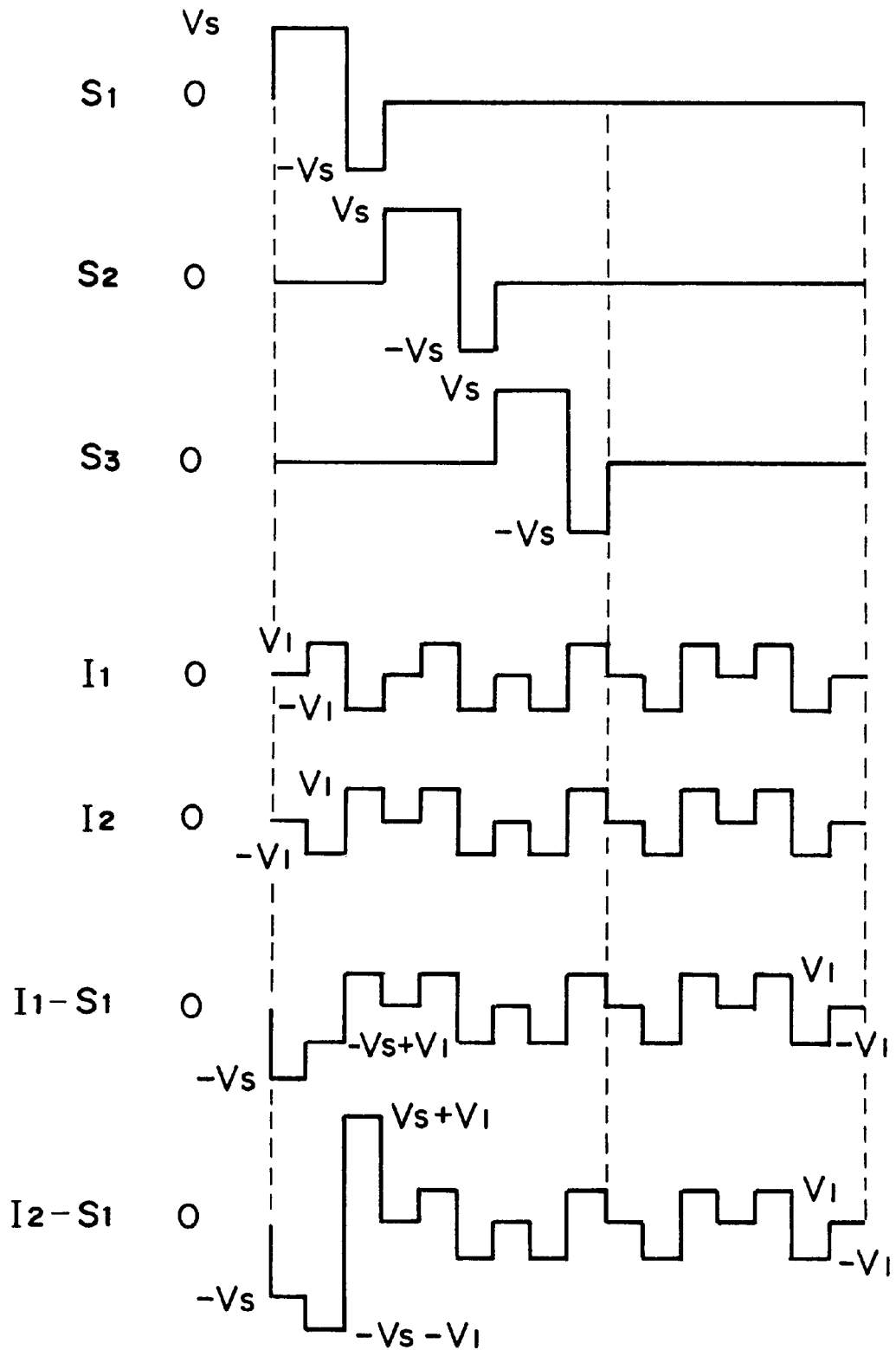

FIGS. 6A and 6B are waveform diagrams showing an example set of driving waveforms used in such a driving method. FIG. 5 is a plan view showing an electrode matrix used in a chiral smectic liquid crystal panel 51 of a simple matrix-type. The liquid crystal panel 51 shown in FIG. 5 includes scanning electrodes 52 ($S_1$, $S_2$, $S_3$, ... $S_m$) and data electrodes 53 ($I_1$, $I_2$, $I_3$, ... $I_n$) intersecting each other so as to constitute a pixel at each intersection together with a chiral smectic liquid crystal disposed between the scanning electrodes 52 and data electrodes 53.

Figure 4:
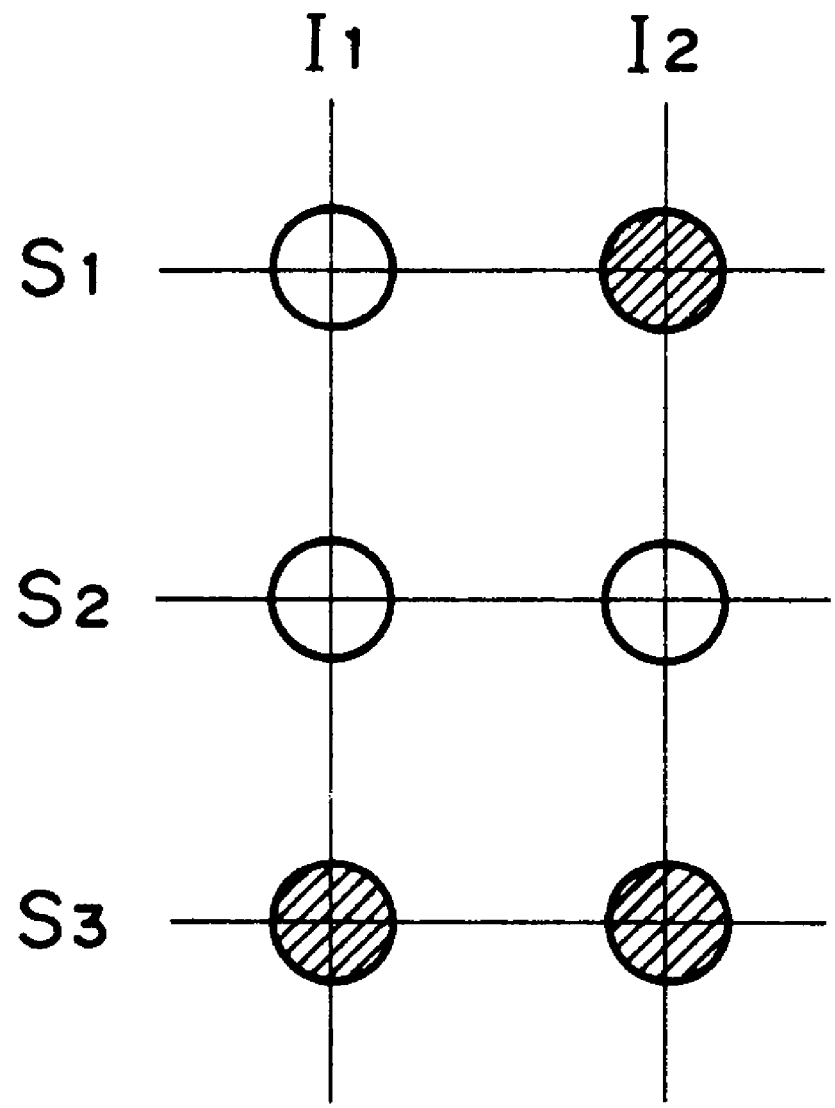
FIG. 4 is an illustration of a display pattern obtained by an actual drive using the time-serial waveforms shown in FIG. 6B.

Referring to FIG. 6A, at $S_S$ is shown a selection scanning signal waveform applied to a selected scanning line, at $S_N$ is shown a non-selection scanning signal waveform applied to a non-selected scanning line, at $I_S$ is shown a selection data signal waveform (providing a black display state) applied to a selected data line, and at $I_N$ is shown a non-selection data signal waveform applied to a non-selected data line. Further, at $I_S$-$S_S$ and $I_N$-$S_S$ in the figure are shown voltage waveforms applied to pixels on a selected scanning line, whereby a pixel supplied with the voltage $I_S$-$S_S$ assumes a black display state and a pixel supplied with the voltage $I_N$-$S_S$ assumes a white display state. FIG. 6B shows a time-serial waveform used for providing a display state as shown in FIG. 4.

In the driving embodiment shown in FIGS. 6A and 6B, a minimum duration (application time) $\Delta t$ of a single polarity voltage applied to a pixel on a selected scanning line corresponds to the period of a writing phase $t_2$, and the period of a one-line clearing phase $t_1$ is set to $2\Delta t$.

The parameters $V_S$, $V_I$ and $\Delta t$ in the driving waveforms shown in FIGS. 6A and 6B are determined depending on switching characteristics of a liquid crystal material used.

Figure 7:
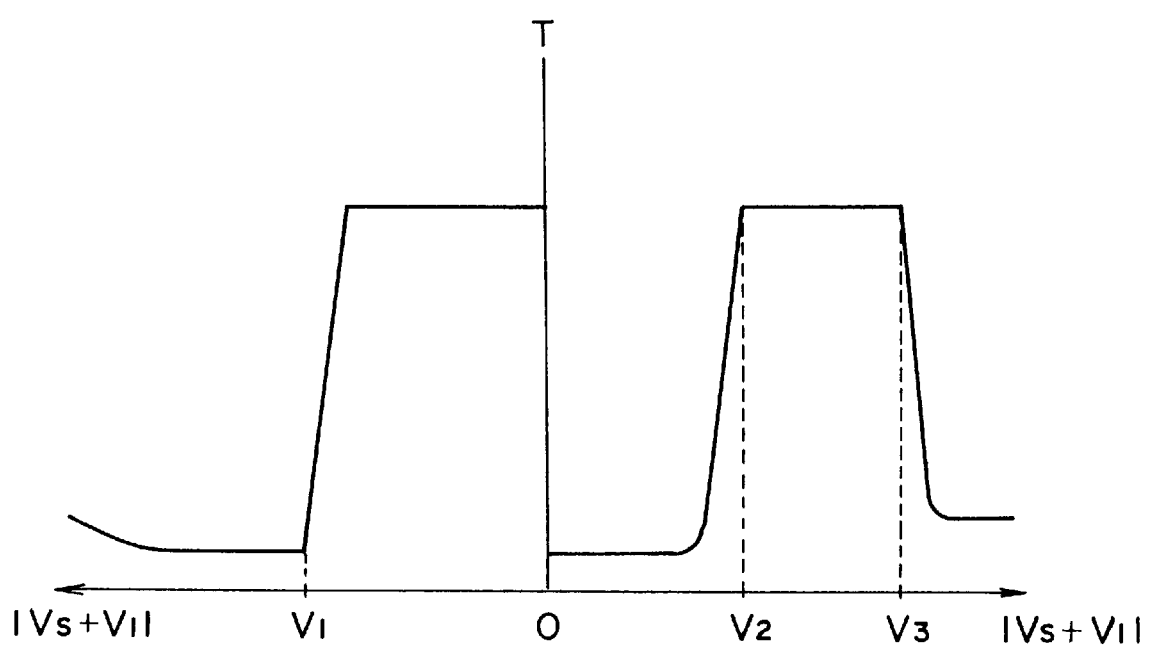
FIG. 7 is a V-T characteristic chart showing a change in transmittance under application of different drive voltages.
Figure 8:
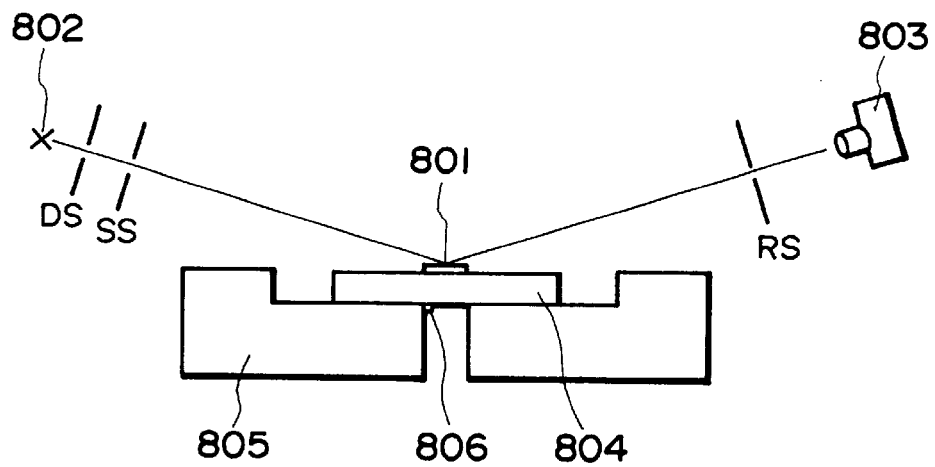
FIG. 8 is a schematic view of an X-ray diffraction apparatus used in Experimental Examples as to the present invention.

FIG. 7 shows a V-T characteristic, i.e., a change in transmittance T when a driving voltage denoted by ($V_S$+$V_I$) is changed while a bias ratio as mentioned hereinbelow is kept constant. In this embodiment, the parameters are fixed at constant values of $\Delta t$=50 ps and a bias ratio $V_I/(V_I+V_S)$=⅓. On the right side of FIG. 7 is shown a result when the voltage ($I_N$-$S_S$) shown in FIG. 6A is applied to a pixel concerned, and on the left side of FIG. 8 is shown a result when the voltage ($I_S$-$S_S$) is applied to a pixel concerned, respectively while increasing the voltage ($V_S$+$V_I$). On both sides of the ordinate, the absolute value of the voltage ($V_S$+$V_I$) is separately indicated. At ($I_N$-$S_S$) and ($I_S$-$S_S$), a previous (display) state is cleared by applying a voltage $V_R$ and a subsequent (display) state is determined by voltages $V_B^1$ and $V_B^2$, respectively. Referring to FIG. 8, a relationship of $V_2$<$V_1$<$V_3$ holds. The voltage $V_1$ may be referred to as a threshold voltage in actual drive and the voltage $V_3$ may be referred to as a crosstalk voltage. More specifically, as shown in FIG. 6A, a voltage $V_1$ denotes a voltage value causing switching by applying a voltage signal $V_B^2$ and a voltage $V_3$ denotes a voltage value causing switching by applying a voltage signal $V_B^1$. Further, a voltage $V_2$ denotes a voltage value required for clearing the previous state by applying a voltage signal $V_R$. The crosstalk voltage $V_3$ is generally present in actual matrix drive of a ferroelectric liquid crystal device. In an actual drive, $\Delta V$=($V_3$-$V_1$) provides a range of |$V_S$+$V_I$| allowing a matrix drive and may be referred to as a (drive) voltage margin, which is preferably large enough. It is of course possible to increase the value of $V_3$ and thus $\Delta V$ (=$V_3$-$V_1$) by increasing the bias ratio (i.e., by causing the bias ratio to approach a unity). However, a large bias ratio corresponds to a large amplitude of a data signal and leads to an increase in flickering and a lower contrast, thus being undesirable in respect of image quality. According to our study, a bias ratio of about ⅓–¼ was practical. On the other hand, when the bias ratio is fixed, the voltage margin $\Delta V$ strongly depends on the switching characteristics of a liquid crystal material used, and it is needless to say that a liquid crystal material providing a large $\Delta V$ is very advantageous for matrix drive.

Further, it is possible to drive the liquid crystal device by changing a voltage application time (duration) $\Delta t$ while keeping the driving voltage ($V_I$+$V_S$) so as to provide a certain (constant) value. In this case, the drive characteristic of the liquid crystal device can be evaluated in terms of a duration margin (voltage application time margin) $\Delta T=\Delta t_2-\Delta t_1$ wherein $\Delta t_1$ denotes a threshold duration and $\Delta t_2$ denotes a crosstalk duration. The duration margin $\Delta T$ means a duration allowing a matrix drive under application of a certain driving voltage ($V_r+V_s$).

The upper and lower limits of application voltages or durations and a difference therebetween (driving voltage margin $\Delta V$ or duration margin $\Delta T$) by which selected pixels are written in two states of "black" and "white" and non-selected pixels can retain the written "black" and "white" states at a constant temperature as described above, vary depending on and are intrinsic to a liquid crystal material used and a cell structure employed. Further, the driving margin (voltage or duration margin) is deviated according to a change in environmental temperature, so that optimum driving conditions should be required of an actual display apparatus in view of a liquid crystal material used, a cell (device) structure and an environmental temperature.

Figure 14:
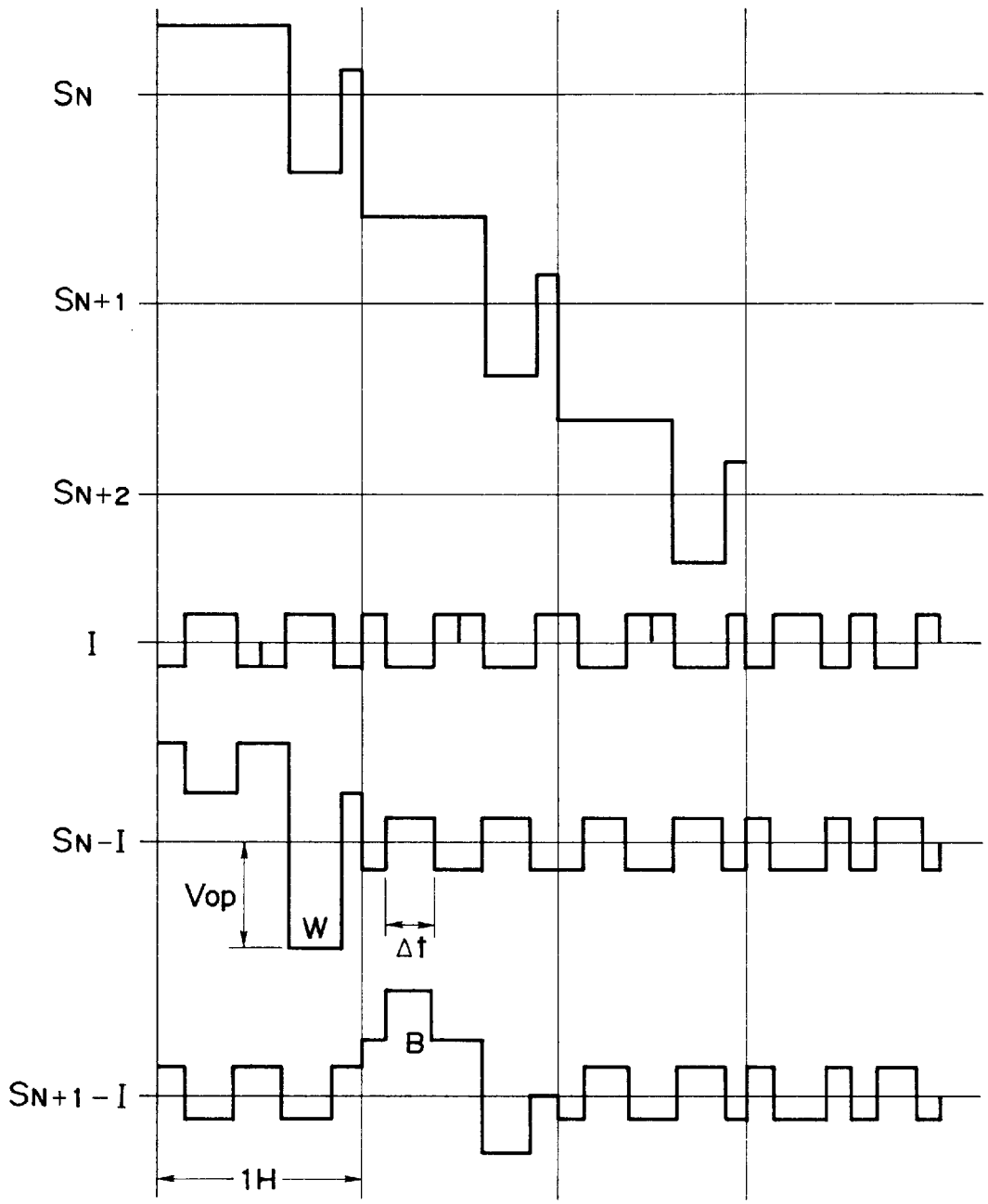
FIG. 14 is a set of drive waveforms used for measurement of a contrast in Experimental Examples as to the present invention.

In the present invention, in order to effect a quantitative evaluation of the drive margin, the above threshold duration $\Delta t_1$ and the crosstalk duration $\Delta t_2$ are measured by using a certain driving waveform (as shown in FIG. 14) to obtain a duration margin parameter M2 (M2 margin) which is a parameter of a duration range of the basis of an average (central) value of these values. The M2 margin is represented by the following equation:

(M2 margin)=$(\Delta t_2-\Delta t_1)/(\Delta t_2+\Delta t_1)$.

Hereinbelow, the present invention will be described more specifically based on Examples. It is however to be understood that the present invention is not restricted to these Examples.

EXPERIMENTAL EXAMPLE 1

Liquid crystal compositions FLC-1, FLC-2 and FLC-3 were prepared by mixing the following compounds (a) to (f) in the indicated proportions, respectively, and each showed a phase transition series (°C.), a spontaneous polarization (Ps), a layer spacing $d_{TAC}$ at $T_{AC}$ (a temperature of phase transition from smectic A (SmA) phase to chiral smectic C (SmC*) phase), a layer spacing $d_c$ at 30° C., and a calculated layer inclination angle $\delta cal$ at 30° C. shown below, respectively.

The layer spacings dc and $d_{TAC}$ were measured in a manner described hereinafter and the calculated layer inclination angle $\delta cal$ were obtained from the equation:

$\delta cal=\cos^{-1}(dc/d_{TAC})$.

| Compound No. | Structural formula |
|---|---|
| (a) | 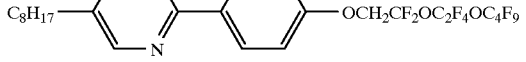 |
| (b) | 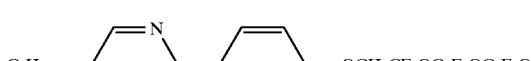 |
| (c) | 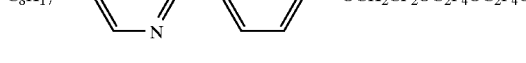 |
| (d) | 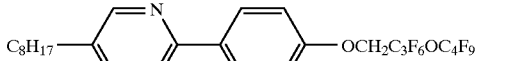 |
| (e) | 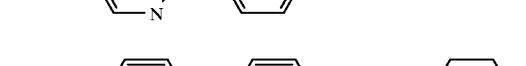 |
| (f) | 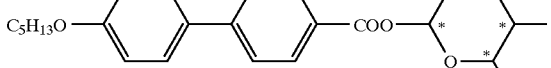 |

<FLC-1>

(components) (wt. parts)
(a):(b):(c):(d):(e) = 45:30:15:5:2
Phase transition (° C.):

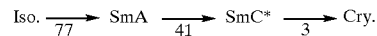

Ps (30° C.) = 31.1 nC/cm$^2$
$d_{TAC}$ ($T_{AC}$ = 41° C.) = 31.756 Å
$d_c$ (30° C.) = 31.636 Å
δcal (30° C.) = cos$^{-1}$ ($d_c/d_{TAC}$) = 5.0 deg.
<FLC-2>

(components) (wt. parts)
(a):(f):(d) = 40:40:5
Phase transition (° C.):

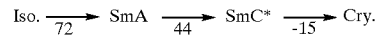

Ps (30° C.) = 20.7 nC/cm$^2$
$d_{TAC}$ ($T_{AC}$ = 44° C.) = 31.596 Å
$d_c$ (30° C.) = 31.360 Å
δcal (30° C.) = 7.0 deg.
<FLC-3>

(components) (wt. parts)
(f):(d) = 90:5
Phase transition (° C.):

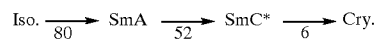

Ps (30° C.) = 22.1 nC/cm$^2$
$d_{TAC}$ ($T_{AC}$ = 52° C.) = 31.62 Å
$d_c$ (30° C.) = 31.04 Å
δcal (30° C.) = 11.0 deg.

Then, five black cells A, B-1, B-2, C-1 and C-2 were prepared in the following manner.

<Cell A>

Two 1.1 mm-thick glass substrates each provided with an about 70 nm-thick ITO film (transparent electrode) were each coated with a precursor to a polyimide having a recurring unit of the formula shown below by spin coating, followed by pre-drying at 80° C. for 5 min. and hot baking at 200° C. for 1 hour to form a 5 nm-thick alignment control film, which was then rubbed with a nylon cloth as a uniaxial aligning treatment.

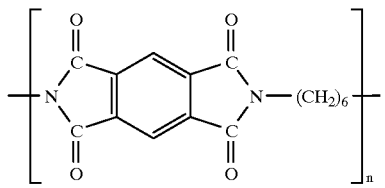

Then, spacer silica beads of 2.0 μm in average diameter were dispersed on one of the substrates and the other substrate was superposed thereon to form a blank cell.

<Cell B-1>

One 1.1 mm-thick glass substrate provided with an about 70 nm-thick ITO film (transparent electrode) was coated with a precursor to a polyimide represented by a recurring unit of the formula shown below by spin coating, followed by pre-drying at 80° C. for 5 min. and hot baking at 200° C. for 1 hour, to form a 5 nm-thick alignment control film, which was then rubbed with a nylon cloth as a uniaxial aligning treatment.

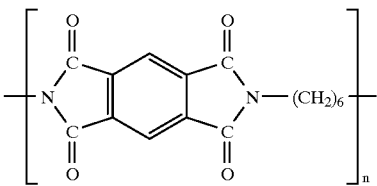

The other glass substrate having a thickness of 1.1 mm was coated with 10 wt. % (solid content)-solution in ethanol of a ladder-type polysiloxane containing SnOx fine particles (particle size: 100 Å) dispersed therein by spin coating in a thickness of 2000 Å, followed by pre-drying at 80° C. for 5 min and hot-drying at 200° C. for 1 hour.

Then, spacer silica beads of 2.0 μm in average diameter were dispersed on the first substrate and the other substrate was superposed thereon to form a blank cell.
<Cell B-2>(for X-ray diffraction analysis)

A blank cell was prepared in the same manner as in Cell B-1 except that the two 1.1 mm-thick glass substrates were changed to two 80 μm-thick glass sheets having a prescribed size.
<Cell C-1>

One 1.1 mm-thick glass substrate provided with an about 70 nm-thick ITO film (transparent electrode) was coated with a precursor to a polyimide represented by a recurring unit of the formula shown below by spin coating, followed by pre-drying at 80° C. for 6 min. and hot baking at 200° C. for 1 hour, to form a 6 nm-thick alignment control film, which was then rubbed with a nylon cloth as a uniaxial aligning treatment.

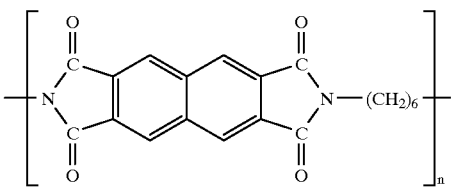

The other glass substrate having a thickness of 1.1 mm was coated with 10 wt. % (solid content)-solution in ethanol of a ladder-type polysiloxane containing SnOx fine particles (particle size: 100 Å) dispersed therein by spin coating in a thickness of 2000 Å, followed by pre-drying at 80° C. for 5 min and hot-drying at 200° C. for 1 hour.

Then, spacer silica beads of 2.0 μm in average diameter were dispersed on the first substrate and the other substrate was superposed thereon to form a blank cell.
<Cell C-2>(for X-ray diffraction analysis)

A blank cell was prepared in the same manner as in Cell C-1 except that the two 1.1 mm-thick glass substrates were changed to two 80 μm-thick glass sheets having a prescribed size.

The liquid crystal compositions FLC-1, FLC-2 and FLC-3 were filled into the above-prepared cells A, B-1, B-2, C-1 and C-2 in the indicated combinations shown in Table 1 below and were cooled at a rate of 0.5° C./min. to form liquid crystal devices.

Then, each the liquid crystal devices was then heated to isotropic liquid temperature and cooled to room temperature (re-orientation or re-alignment) at a prescribed cooling rate indicated in Table 1 to prepare liquid crystal devices 1, 2-1, 2-2, 3-1, 3-2, 4', 4-1, 4-2, 5, 6, 7, 8, 9 and 10.

As a result of microscope observation, in the liquid crystal devices 1, 2-1, 2-2, 3-1, 3-2 and 4', a region (several microns to several hundred microns in diameter) in various shapes (generally in an elliptical shape) wherein no alignment defects were observed was confirmed.

Incidentally, the alignment defects were confirmed in the following manner.

Under no electric application, the liquid crystal device was set in a certain position so as to provide a darkest state in combination with cross nicol polarizers. Through a polarizing microscope, observation of a degree of light leakage in the liquid crystal device was performed while rotating the device within about ±10 degrees. When the light leakage was observed in a region, the region was evaluated as a region in which alignment defects occurred.

TABLE 1

| Device No. | Cell No. | Composition No. | Cooling rate (°C./min) | P1*[1] area (%) | P2*[2] area (%) |
|---|---|---|---|---|---|
| 1 | A | FLC-1 | 3 | 15 | 85 |
| 2-1 | B-1 | FLC-1 | 2 | 25 | 75 |
| 2-2 | B-2 | " | " | " | " |
| 3-1 | C-1 | FLC-2 | 3 | 15 | 85 |
| 3-2 | C-2 | " | " | " | " |
| 4 | B-1 | FLC-2 | 2 | 10 | 90 |
| 4-1 | B-1 | FLC-2 | 1 | 5 | 95 |
| 4-2 | B-2 | " | " | " | " |
| 5 | C-1 | FLC-1 | 0.5 | 5 | 95 |
| 6 | C-1 | FLC-2 | 0.5 | 0 | 100 |
| 7 | B-1 | FLC-3 | 3 | 0 | 100 |
| 8 | C-1 | FLC-3 | 1 | 0 | 100 |
| 9 | A | FLC-2 | 1 | 5 | 95 |
| 10 | A | FLC-3 | 3 | 2 | 98 |

*[1]: P1 area represents an areal ratio or percentage (%) of a region wherein no alignment defects are observed.
*[2]: P2 area represents an areal ratio or percentage (%) of a region wherein minute alignment defects are observed.

Further, P1 area (%) and P2 area (%) are determined in the following manner.

A photomicrograph of a specific region (a 1 mm-square area) randomly selected was taken while effecting microscopic observation (magnification: 20–100). The photomicrograph was cut and divided into P1 region pieces (cuttings) and P2 region pieces (cuttings) to measure a total weight ($W_{P1}$) of the P1 region pieces and a total weight ($W_{P2}$) of the P2 region pieces, respectively. The P1 area (%) and P2 area (%) were determined based on the following equations, respectively.

$P1$ area $(\%)=W_{P1}/(W_{P1}+W_{P2})\times 100$ $P2$ area $(\%)=W_{P2}/(W_{P1}+W_{P2})\times 100$ The thus-prepared liquid crystal devices were subjected to 1) layer structure analysis according to X-ray diffraction (for devices 2-2, 3-2 and 4-2),
2) measurement of a contrast ratio (C/R) (for all the devices), and
3) measurement of an M2 margin.

1) Layer structure analysis according to X-ray diffraction

First, the layer spacings d (dc and $d_{TAC}$) and the layer inclination angle δ were measured in the following manner.

The methods used were basically similar to the method used by Clark and Lagerwall (Japan Display '86, Sept. 30–Oct. 2, 1986, p.p. 456–458) or the method of Ohuchi et al (J.J.A.P., 27 (5) (1988), p.p. L725–L728). The measurement was performed by using an X-ray diffraction apparatus (available from MAC Science having a rotary cathode-type X-ray generating unit) as shown in FIG. 8, and an 80 μm-thick glass sheet 804 ("Microsheets", available from Corning Glass Works) were used as a substrate so as to minimize the heat capacity and the X-ray absorption with the glass substrate.

More specifically, for measurement of the layer spacing d, a sample liquid crystal 801 (FLC-1, FLC-2, FLC-3) was applied in a 5 mm-square size so as to form a flat surface on the 80 μm-thick glass sheet and, while being temperature-controlled by a temperature-controlling plate 805 and a temperature-monitoring thermocouple 806, irradiated with X-rays from a rotary X-ray source 802, so that the output light including diffraction rays was detected by a detector (counter) 803, similarly as in the ordinary powder X-ray diffraction. An angle providing a peak of X-ray intensity was substituted in the Bragg's formula for diffraction condition to obtain a layer spacing d.

Each sample liquid crystal was first brought to its isotropic phase temperature, and the measurement was repeated every 3° C. or every 1° C. in the vicinity of a transition point while cooling the sample down to a temperature where no diffraction peak was observed. The automatic temperature controller used allowed a control accuracy of ±0.3° C. at each measurement temperature.

The measurement was performed by using CuKα-rays (1.54050 Å) at a power of 45 kV–100 mA as analyzing rays and using a slit system including DS of 0.05 mm, SS of 0.05 mm and RS of 0.05 mm. The scanning was performed at a rate of 3 deg./min.

For the measurement of smectic layer inclination angle δ, a sample liquid crystal filling a sample cell (Cell B-2 or C-2 prepared above) was heated to isotropic phase and then gradually cooled. Then, the X-ray detector was set at the angle 2θ giving the above-mentioned layer spacing d, and the sample cell was subjected to θ-scanning. From the measured values, δx-ray at a prescribed measurement temperature was calculated according to the method described in the above-mentioned references.

Incidentally, herein, the calculated layer inclination angle δcal was a value calculated from the equation: $\delta cal=\cos^{-1}(dc/d_{TAC})$ based on the layer spacings dc and $d_{TAC}$ measured in the above manner.

In the above X-ray diffraction analysis, a beam size of the X-ray was appropriately decreased and a count time was increased, as desired, in order to measure with respect to a minute region to obtain several X-ray diffraction profiles (patterns) at measurement temperatures shown in FIGS. 9–13.

Hereinbelow, results of X-ray diffraction analysis of layer structure in P1 and P2 regions with respect to the liquid crystal devices 2-2, 3-2 and 4-2 are explained.

<Device 2-2>

Figure 9:
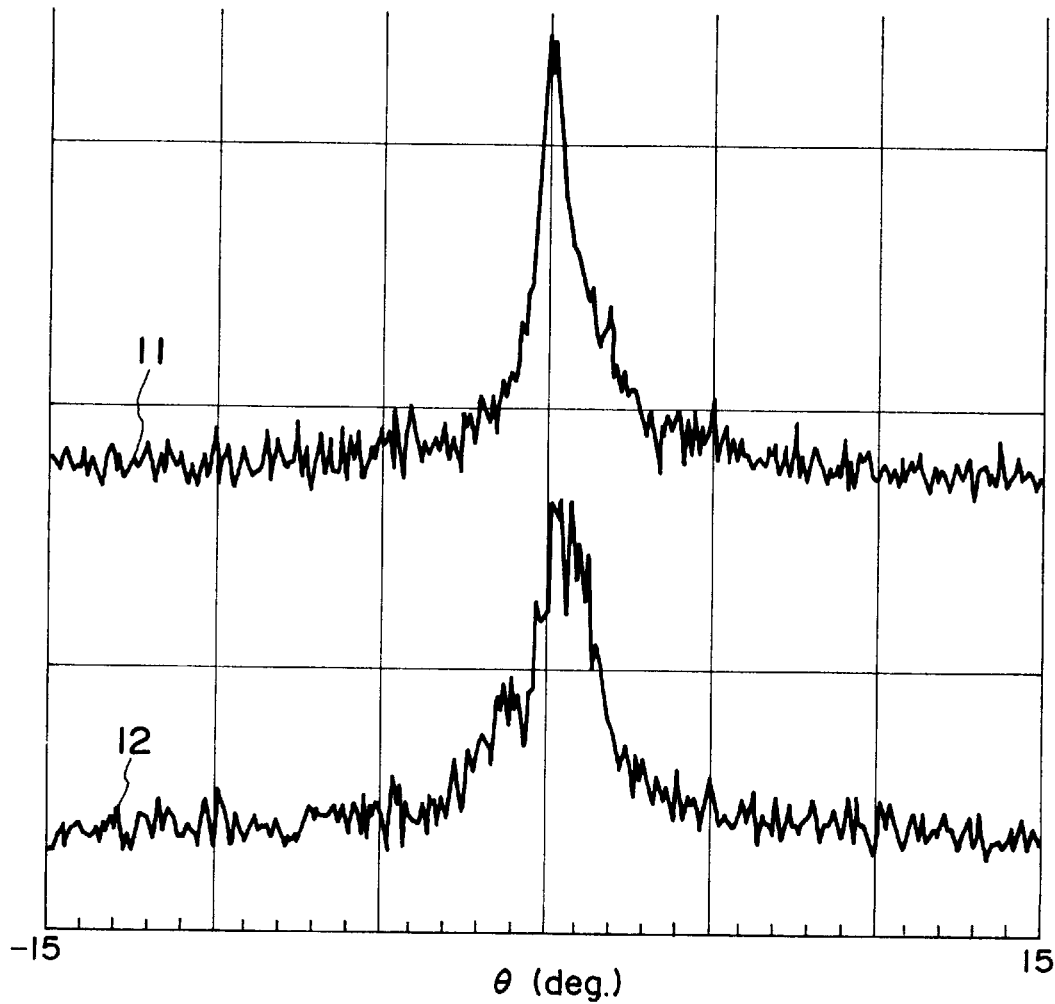
FIGS. 9–13 are respectively a chart showing an X-ray profile of a liquid crystal within a liquid crystal device measured in Experimental Examples, as to the present invention.

In the P1 region, as shown in X-ray diffraction profiles 11 and 12 in FIG. 9, a single distinct peak was obtained at θ leading to a δx-ray of 0 degree and accordingly the δx-ray was found to substantially show a complete bookshelf structure in view of the description of the references for X-ray diffraction described above.

Figure 10:
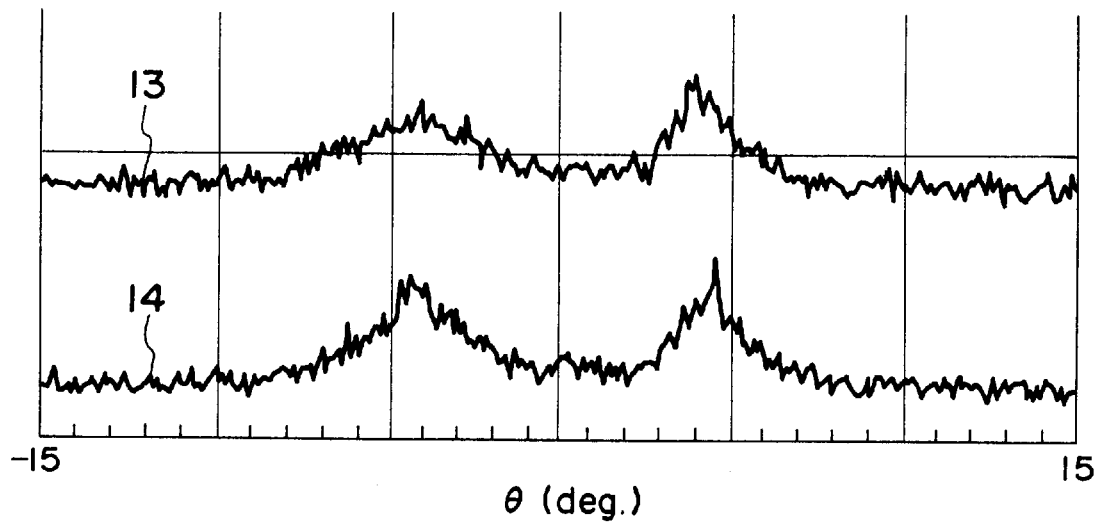

In the P2 region, as shown in X-ray diffraction profiles 13 and 14 in FIG. 10, two distinct peaks resulting from a chevron structure was obtained at θ leading to a δx-ray. The δx-ray was found to be substantially equal to the calculated layer inclination angle δcal (at the same measurement temperature) calculated based on a temperature-dependence of a layer spacing. Further, in the P2 region, many minute alignment defects like zig-zag defects were observed although they were not clear and the respective X-ray diffraction peaks were a broad shape as a whole, so that it was considered that two chevron structures different in a bending direction of the smectic layer were co-present in the P2 region.

<Device 3-2>

Figure 11:
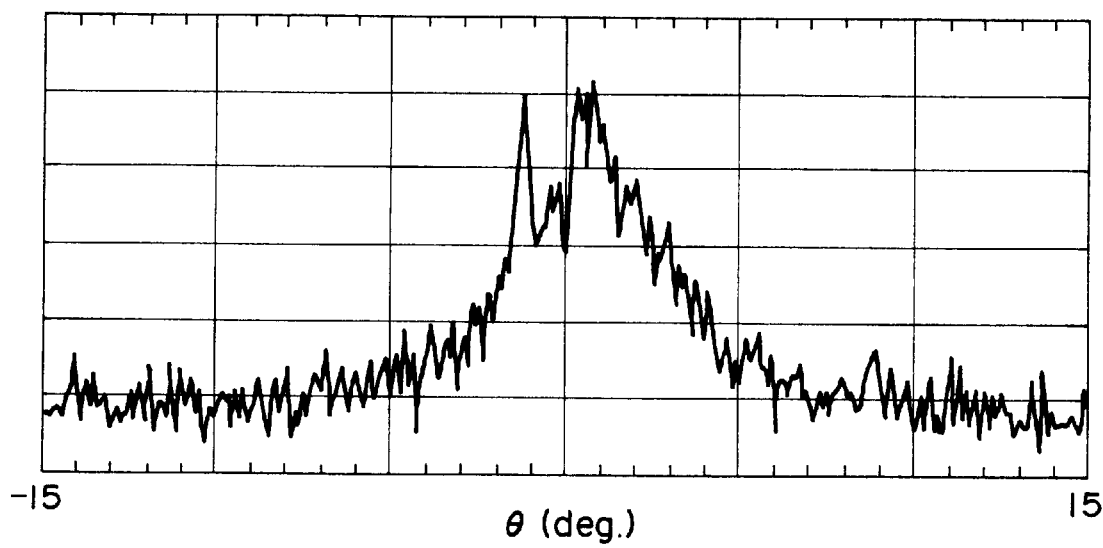

In the P1 region, as shown in an X-ray diffraction profile in FIG. 11, two distinct peaks were obtained at θ leading to a δx-ray. The δx-ray was found to be much smaller than the δcal at the same measurement temperature.

Figure 12:
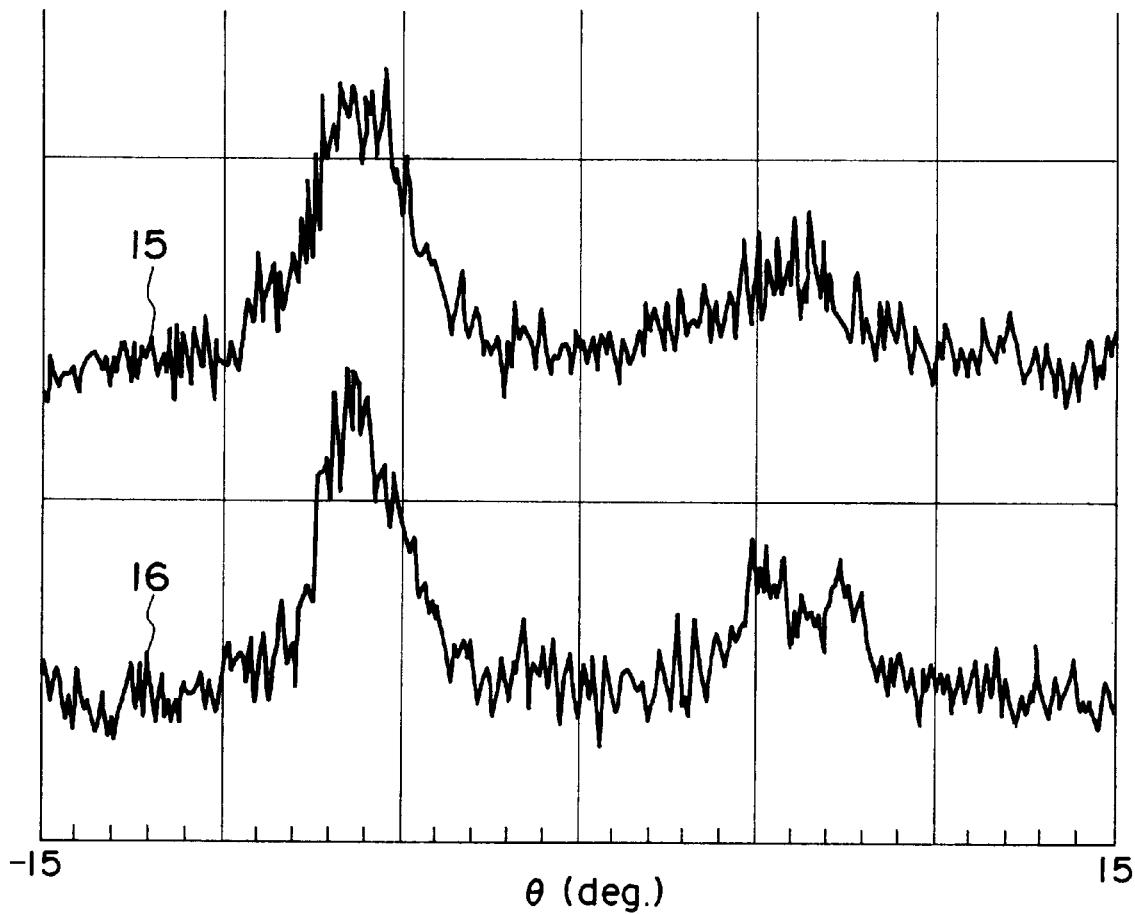

In the P2 region, as shown in X-ray diffraction profiles 15 and 16 in FIG. 12, two distinct peaks resulting from a chevron structure was obtained at θ leading to a δx-ray. The δx-ray was found to be substantially equal to the calculated layer inclination angle δcal (at the same measurement temperature) calculated based on a temperature-dependence of a layer spacing. Further, in the P2 region, similarly as in the device 2-2, many minute alignment defects like zig-zag defects were observed although they were not clear and the respective X-ray diffraction peaks were a broad shape as a whole, so that it was considered that two chevron structures different in a bending direction of the smectic layer were co-present in the P2 region.

<Device 4-2>

In this device, the P1 region (wherein no minute alignment defects were observed) having a measurable area (at least several microns in diameter) was not found and accordingly the measurement was performed with respect to arbitrary two points.

Figure 13:
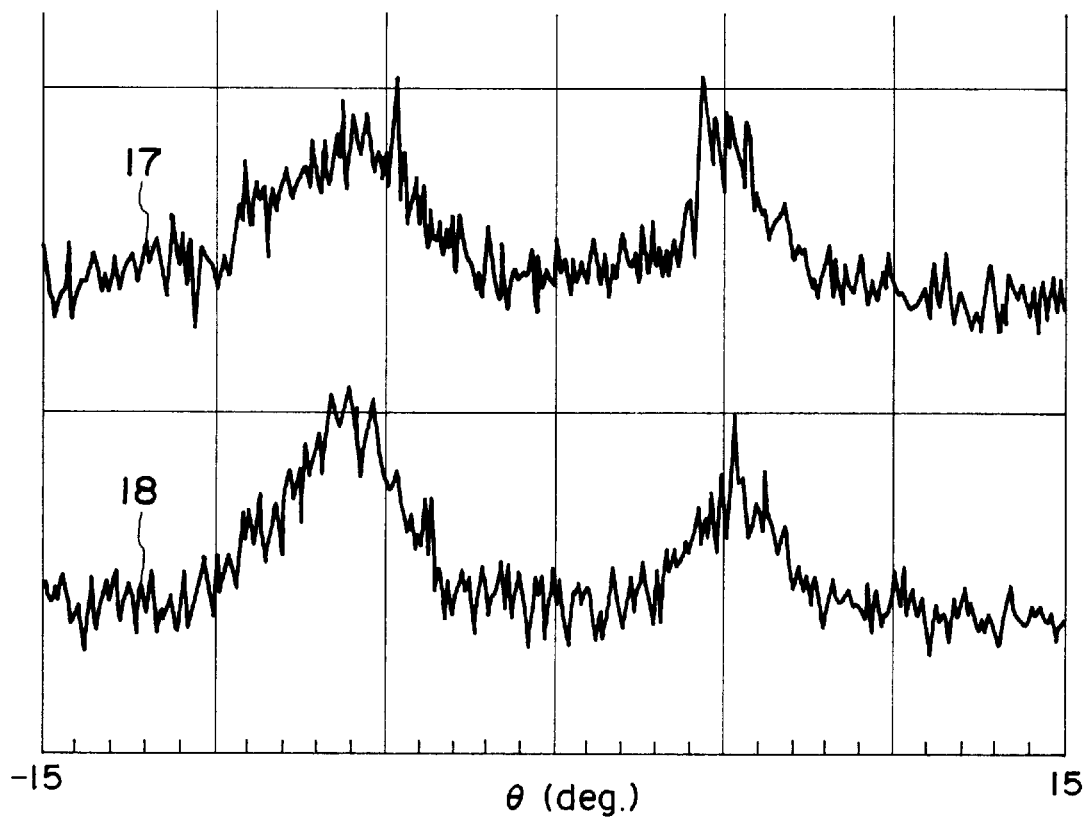

As shown in FIG. 13, each of X-ray diffraction profiles 17 and 18 provided two broad peaks at θ leading to a δx-ray. The δx-ray was fund to be substantially equal to the δcal at the same measurement temperature.

Further, similarly as in the P2 regions of the devices 2-2 and 3-2, unclear but many minute alignment defects were observed and a broad X-ray diffraction peak shape as a whole was obtained. Therefore, in the P2 region of this device, it was considered that two chevron structures different in a bending direction of the smectic layer were present in mixture.

As described above, based on the above X-ray diffraction analysis of the layer structure of the P1 and P2 regions, we conclude that the P1 region is a region having a bookshelf structure or a quasi-bookshelf structure having a very small layer inclination angle δx-ray (compared with δcal) and that the P2 region is a region having a substantial layer inclination angle δx-ray substantially equal to a δcal calculated based on a a temperature-dependent layer spacing changing characteristic and is a region having two co-present chevron structures different in a bending direction of smectic layers.

Figure 16A:
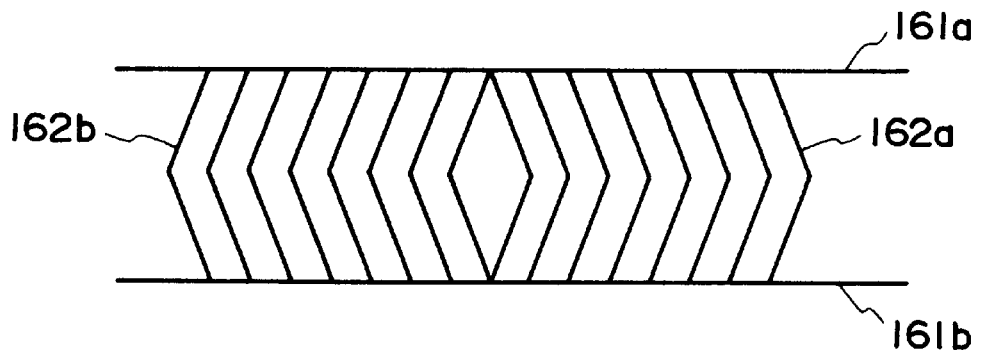
Figure 16B:
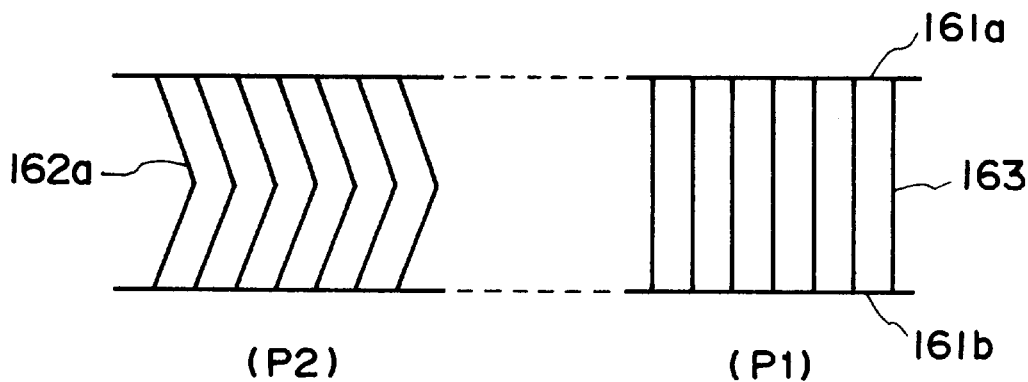

The smectic layer structures will be described more specifically with reference to FIGS. 16A, 16B and 16C wherein FIG. 16A shows chevron structure in a conventional liquid crystal device; FIG. 16B shows an embodiment of a mixed layer structure of a bookshelf structure and a chevron structure in the liquid crystal device of the present invention; and FIG. 16C shows another embodiment of a mixed layer structure of a bookshelf structure and a chevron structure in the liquid crystal device of the present invention.

Referring to FIG. 16A, between a pair of substrates 161a and 161b, smectic liquid crystal layers 162a are bent rightward (">") at a midpoint thereof and smectic layers 162b are bent leftward ("<") at a midpoint thereof to form two-types of a chevron structure different in bending direction. These smectic liquid crystal layers 162a and 162b may be bent at an intermediate point thereof in a same (one) direction.

Figure 16C:
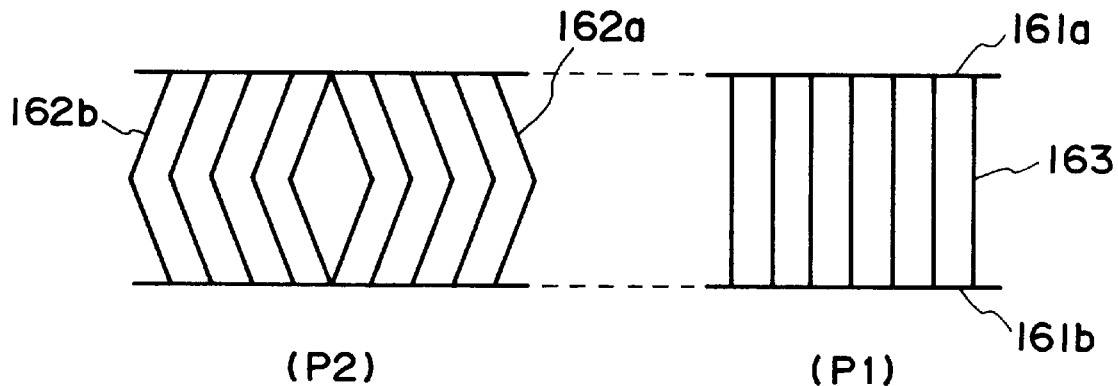

In the liquid crystal device of the present invention, as shown in FIGS. 16B and 16C, smectic liquid crystal 163 are substantially perpendicular to a pair of substrates 161a and 161b to form a bookshelf structure in a P1-region and smectic liquid crystal layers 162a (and 162b) are bent at a midpoint thereof to form a chevron structure in a P2 region. These P1 and P2 region are co-present in an effective optical modulation region in certain areal ratios, respectively.

In the P2 region, as shown in FIGS. 16B and 16C, the smectic liquid crystal layers may be bent in one direction (162a in FIG. 16B) or in different directions (162a and 162b in FIG. 16C). On the other hand, in the P1 region, the smectic liquid crystal layers 163 can have a layer inclination angle (δx-ray) smaller than a calculated layer inclination angle (δcal), preferably below 80% of δcal or at most 3 degrees and can be bent so long as the δx-ray and δcal satisfy the above relationship, thus forming a quasi-bookshelf structure as described hereinabove.

2) Measurement of contrast ratio (C/R)

A sample liquid crystal device was sandwiched between a pair of polarizers disposed in right-angle cross nicols and supplied with driving waveforms as shown in FIG. 14 (Vop=20 V, 1/3.3 bias, duty factor of 1/1000). Pulse widths were adjusted to cause bistable switching. At a first switched state, the liquid crystal device was rotated so as to find the darkest position where the transmitted light intensity Ib was measured by a photomultiplier. Then, after switching into a second state in such an arrangement, the light intensity Iw at the brightest state was measured. From the results, a contrast ratio (C/R) as an evaluation factor was obtained as a ratio Iw/Ib.

Further, contrast ratios (CR) in the P1 and P2 regions were measured by concentrating beams of the X-rays on either the P1 region or the P2 region.

3) Measurement of M2 margin

By using drive waveforms similar to those for measurement of contrast ratio (FIG. 14, Vop=20 V, 1/3.3 bias, duty factor of 1/1000), "dark" and "bright" states were displayed while charging a voltage application time (duration) Δt of an applied pulse.

Figure 15:
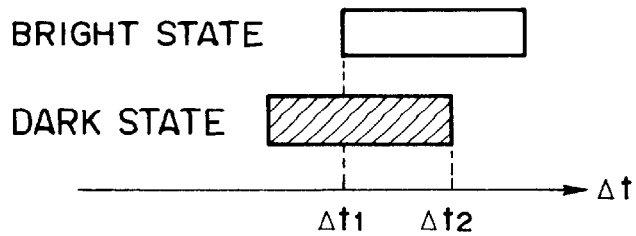
FIG. 15 is a schematic view of illustrating a drive margin (M2 margin).

At this time, when a relationship between Δt ($\Delta t_1$, $\Delta t_2$) and display states is shown in FIG. 15, a drive margin parameter M2 (M2 margin) is obtained from the following formula:

$$M2 \text{ margin} = (\Delta t_2 - \Delta t_1)/(\Delta t_2 + \Delta t_1).$$

The M2 margin measurement was performed with respect to the P1 region, the P2 region and the entire region including the P1 and P2 regions, respectively.

The results of the measurements of a contrast ratio (C/R) and an M2 margin are shown in Table 2.

TABLE 2

| Device | P1 area | P2 area | C/R | | | M2 margin | | |
|---|---|---|---|---|---|---|---|---|
| No. | (%) | (%) | P1 region | P2 region | Whole region | P1 region | P2 region | Whole region |
| 1 | 15 | 85 | 85 | 55 | 63 | 0.22 | 0.09 | 0.12 |
| 2-1 | 25 | 75 | 105 | 55 | 75 | 0.36 | 0.20 | 0.24 |
| 2-2 | " | " | 100 | 55 | 80 | 0.36 | 0.21 | 0.24 |
| 3-1 | 15 | 85 | 70 | 45 | 55 | 0.34 | 0.19 | 0.22 |

TABLE 2-continued

| Device No. | P1 area (%) | P2 area (%) | C/R P1 region | C/R P2 region | C/R Whole region | M2 margin P1 region | M2 margin P2 region | M2 margin Whole region |
|---|---|---|---|---|---|---|---|---|
| 3-2 | " | " | 70 | 43 | 53 | 0.31 | 0.19 | 0.21 |
| 4' | 10 | 90 | 74 | 40 | 51 | 0.33 | 0.20 | 0.23 |
| 4-1 | 5 | 95 | (60)* | 42 | 44 | (0.26)* | 0.17 | 0.17 |
| 4-2 | " | " | (58)* | 40 | 41 | (0.25)* | 0.18 | 0.18 |
| 5 | 5 | 95 | — | 51 | 52 | — | 0.19 | 0.19 |
| 6 | 0 | 100 | — | 43 | 43 | — | 0.17 | 0.17 |
| 7 | 0 | 100 | — | 34 | 34 | — | 0.15 | 0.15 |
| 8 | 0 | 100 | — | 33 | 35 | — | 0.13 | 0.13 |
| 9 | 5 | 95 | — | 42 | 43 | — | 0.16 | 0.16 |
| 10 | 2 | 98 | — | 31 | 31 | — | 0.03 | 0.03 |

( )*: These values were measured values with poor accuracy due to a very small size of P1 region.

As apparent from Table 2, the P1 regions provided a larger contrast ratio (C/R) and a larger M2 margin when compared with the corresponding P2 regions, respectively. Further, the entire contrast ratio (C/R) and the entire M2 margin also become large in case where the devices had a whole region including a P1 region in a larger areal ratio (particularly 10% or 25%) when compared with other devices.

As described above, the liquid crystal devices (particularly the devices 1, 2-1, 2-2, 3-1, 3-2 and 4') having a region in an areal ratio at least 10% wherein the smectic layers form a bookshelf structure or a layer inclination angle δ (δx-ray) is much smaller than a calculated layer inclination angle δ (δcal) calculated based on a temperature-dependent layer spacing changing characteristic can effectively improve a contrast ratio (C/R) and an M2 margin.

EXPERIMENTAL EXAMPLE 2

The liquid crystal compositions FLC-1, FLC-2 were filled into the liquid crystal cells A, B-1, B-2, C-1 and C-2 prepared in Experimental Example 1 in the indicated combinations shown in Table 3 below and were cooled at a rate of 0.5° C./min. to form liquid crystal devices.

Then, each the liquid crystal devices was then heated to isotropic liquid temperature and cooled to room temperature (re-orientation or re-alignment) at a prescribed cooling rate while applying an electric field (rectangular waveform of ±30 V and 1 Hz) in all the SmA temperature range to half of the devices as indicated in Table 3 to prepare liquid crystal devices 11-1 to 14-4 wherein the devices 12-1, 12-3, 14-1 and 14-3 (prepared in this experimental example) corresponded to the devices 2-1, 2-2, 4-1 and 4-2 shown in Table 1 (for Experimental Example 1), respectively.

As a result of microscope observation, in all the liquid crystal devices 11-1 to 14-4, a region (several microns to several hundred microns in diameter) in various shapes (generally in an elliptical shape) wherein no alignment defects were observed was confirmed.

TABLE 3

| Device No. | Cell No. | Compo- sition No. | Cooling rate (°C./min) | Electric field appln. in SmA | P1*1 area (%) | P2*2 area (%) |
|---|---|---|---|---|---|---|
| 11-1 | A | FLC-1 | 2 | No | 15 | 85 |
| 12-1 | A | " | " | Yes | 60 | 40 |
| 12-2 | B-1 | " | " | No | 25 | 75 |
| 12-2 | B-1 | " | " | Yes | 70 | 30 |
| 12-3 | B-2 | " | " | No | 25 | 75 |

TABLE 3-continued

| Device No. | Cell No. | Compo- sition No. | Cooling rate (°C./min) | Electric field appln. in SmA | P1*1 area (%) | P2*2 area (%) |
|---|---|---|---|---|---|---|
| 12-4 | B-2 | " | " | Yes | 70 | 30 |
| 13-1 | C-1 | FLC-2 | 3 | No | 15 | 85 |
| 13-2 | C-1 | " | " | Yes | 50 | 50 |
| 13-3 | C-2 | " | " | No | 15 | 85 |
| 13-4 | C-2 | " | " | Yes | 50 | 50 |
| 14-1 | B-1 | FLC-2 | 1 | No | 5 | 95 |
| 14-2 | B-1 | " | " | Yes | 40 | 60 |
| 14-3 | B-2 | " | " | No | 5 | 95 |
| 14-4 | B-2 | " | " | Yes | 40 | 60 |

*1: P1 area represents an areal ratio (%) of a region wherein no alignment defects are observed.
*2: P2 area represents an areal ratio (%) of a region wherein minute alignment defects are observed.

The thus-prepared liquid crystal devices were subjected to
1) layer structure analysis according to X-ray diffraction (for devices 12-4, 13-3, 13-4 and 14-4),
2) measurement of a contrast ratio (C/R) (for all the devices), and
3) measurement of an M2 margin, in the same manner as in Experimental Example 1.

Hereinbelow, results of X-ray diffraction analysis of layer structure in P1 and P2 regions with respect to the liquid crystal devices 12-4, 13-3, 13-4 and 14-4 are explained.
<Device 12-4>

The results of the device 12-4 were similar to those of the devices 12-3 (corr. to those of the device 2-2 described above) while having different P1/P2 areal ratios. More specifically, in the P1 region within the device 12-4, as shown in X-ray diffraction profiles 11 and 12 in FIG. 9 for the device 12-3 (2-2), a single distinct peak was obtained at θ leading to a δx-ray of 0 degree and accordingly the δx-ray was found to substantially show a complete bookshelf structure in view of the description of the references for X-ray diffraction described above.

In the P2 region, as shown in X-ray diffraction profiles 13 and 14 in FIG. 10 for the device 12-3 (2-2), two distinct peaks resulting from a chevron structure was obtained at θ leading to a δx-ray. The δx-ray was found to be substantially equal to the calculated layer inclination angle δcal (at the same measurement temperature) calculated based on a temperature-dependence of a layer spacing. Further, in the P2 region, many minute alignment defects like zig-zag defects were observed although they were not clear and the respective X-ray diffraction peaks were a broad shape as a whole, so that it was considered that two chevron structures different in a bending direction of the smectic layer were co-present in the P2 region.

<Devices 13-3 and 13-4>

The devices 13-3 and 13-4 having different P1/P2 areal ratios provided similar layer structure analysis results. More specifically, in the P1 region within each of the devices 13-3 and 13-4, from X-ray diffraction profiles, two distinct peaks were obtained at θ leading to a δx-ray. The δx-ray was found to be much smaller than the corresponding δcal at the same measurement temperature.

In the P2 region, from X-ray diffraction profiles, two distinct peaks resulting from a chevron structure was structure having a very small layer inclination angle δx-ray (compared with δcal) and that the P2 region is a region having a substantial layer inclination angle δx-ray substantially equal to a δcal calculated based on a a temperature-dependent layer spacing changing characteristic and is a region having two co-present chevron structures different in a bending direction of smectic layers.

The results of the measurements of a contrast ratio (C/R) and an M2 margin are shown in Table 4.

TABLE 4

| Device No. | P1 area (%) | P2 area (%) | C/R | | | M2 margin | | |
|---|---|---|---|---|---|---|---|---|
| | | | P1 region | P2 region | Whole region | P1 region | P2 region | Whole region |
| 1-1 | 15 | 85 | 85 | 55 | 63 | 0.22 | 0.09 | 0.12 |
| 1-2 | 60 | 40 | 87 | 58 | 78 | 0.21 | 0.10 | 0.17 |
| 2-1 | 25 | 75 | 105 | 55 | 75 | 0.36 | 0.20 | 0.24 |
| 2-2 | 70 | 30 | 106 | 57 | 90 | 0.35 | 0.20 | 0.32 |
| 2-3 | 25 | 75 | 100 | 55 | 80 | 0.36 | 0.21 | 0.24 |
| 2-4 | 70 | 30 | 100 | 56 | 92 | 0.37 | 0.23 | 0.32 |
| 3-1 | 15 | 85 | 70 | 45 | 55 | 0.34 | 0.19 | 0.22 |
| 3-2 | 50 | 50 | 74 | 46 | 62 | 0.35 | 0.20 | 0.30 |
| 3-3 | 15 | 85 | 70 | 43 | 53 | 0.31 | 0.19 | 0.21 |
| 3-4 | 50 | 50 | 73 | 44 | 60 | 0.30 | 0.17 | 0.24 |
| 4-1 | 5 | 95 | (60) | 42 | 44 | (0.26) | 0.17 | 0.17 |
| 4-2 | 40 | 60 | 68 | 44 | 54 | 0.28 | 0.18 | 0.23 |
| 4-3 | 5 | 95 | (58) | 40 | 41 | (0.25) | 0.18 | 0.18 |
| 4-4 | 40 | 60 | 62 | 42 | 50 | 0.26 | 0.20 | 0.22 | obtained at θ leading to a δx-ray. The δx-ray was found to be substantially equal to the calculated layer inclination angle δcal (at the same measurement temperature) calculated based on a temperature-dependence of a layer spacing. Further, in the P2 region, similarly as in the device 12-4, many minute alignment defects like zig-zag defects were observed although they were not clear and the respective X-ray diffraction peaks were a broad shape as a whole, so that it was considered that two chevron structures different in a bending direction of the smectic layer were co-present in the P2 region.

<Device 14-4>

Similarly as in the devices 13-3 and 13-4, in the P1 region, two distinct peaks were obtained in an X-ray diffraction profile from which a layer inclination angle δ (δx-ray) was obtained and the value of δx-ray was much smaller than a value of a calculated layer inclination angle δ (δcal) calculated based on a temperature-dependent layer spacing changing characteristic.

On the other hand, in the P2 region, from an X-ray diffraction profile, two distinct peaks resulting from a chevron structure were obtained at θ leading to a δx-ray. The δx-ray was fund to be substantially equal to the δcal (calculated layer inclination angle) at the same measurement temperature.

Further, in the P2 region, unclear but many minute alignment defects were observed and a broad X-ray diffraction peak shape as a whole was obtained. Therefore, in the P2 region of this device, it was considered that two chevron structures different in a bending direction of the smectic layer were present in mixture.

As described above, based on the above X-ray diffraction analysis of the layer structure of the P1 and P2 regions with respect to the above devices, we conclude that the P1 region is a region having a bookshelf structure or a quasi-bookshelf As apparent from Table 4, the P1 regions provided a larger contrast ratio (C/R) and a larger M2 margin when compared with the corresponding P2 regions, respectively. Further, the entire contrast ratio (C/R) and the entire M2 margin also become large in case where the devices had a whole region including a P1 region in a larger areal ratio (particularly at least 40%) when compared with other devices.

As described above, the liquid crystal devices 11-1, 12-1, 12-3, 13-1, 13-3, 14-1 and 14-3 having a region in an areal ratio 5–25% wherein the smectic layers form a bookshelf structure or a layer inclination angle δ (δx-ray) is much smaller than a calculated layer inclination angle δ (δcal) calculated based on a temperature-dependent layer spacing changing characteristic can effectively improve a contrast ratio (C/R) and an M2 margin.

Particularly, in the liquid crystal devices 11-2, 12-2, 12-4, 13-2, 13-4, 14-2 and 14-4, the P1 regions are increased in an areal ratio of 40–70% by effecting a gradual cooling under an electric field application in all the temperature range showing SmA phase, thus further improving a contrast ratio (C/R) and an M2 margin.

As described hereinabove, according to the present invention, there is provided a liquid crystal device, particularly a chiral smectic liquid crystal device wherein smectic liquid crystal layers form a first (P1) region and a second (P2) region as described above, so that it is possible to improve display and driving characteristics including a contrast ratio (C/R) and a drive margin (M2 margin) and also to suppress a lowering in contrast when driven. There is also provided a liquid crystal apparatus using the liquid crystal device providing the above improved characteristic.

What is claimed is:

1. A liquid crystal device, comprising: a pair of substrates each having thereon an electrode, and a smectic liquid crystal disposed between the substrates, said smectic liquid crystal having a plurality of molecular layers each comprising a plurality of liquid crystal molecules, wherein said smectic liquid crystal is disposed to form an optical modulation region including a first region wherein the molecular layers are aligned to have a layer inclination angle smaller than a calculated layer inclination angle based on a temperature-dependent layer spacing-changing characteristic, and a second region wherein the molecular layers are aligned to form a chevron structure having a layer inclination angle above 3 degrees.

2. A device according to claim 1, wherein said second region includes plural regions in which the molecular layers have different bending directions.

3. A device according to claim 1, wherein said first region has an areal ratio of at least 10% based on said entire optical modulation region of the device.

4. A device according to claim 1, wherein said first region has an areal ratio of at least 40% based on said entire optical modulation region.

5. A device according to claim 1, wherein said substantial layer inclination angle in the second region is at most 7 degrees.

6. A device according to claim 1, wherein said smectic liquid crystal comprises at least one species of fluorine-containing mesomorphic compound comprising a fluorocarbon terminal portion and a hydrocarbon terminal portion, the terminal portions being connected with a central core, and having a smectic phase or a latent smectic phase.

7. A liquid crystal device according to claim 6, wherein said fluorocarbon terminal portion of the fluorine-containing mesomorphic compound is a group represented by the formula $-D^1-C_{xa}F_{2xa}-X$, where xa is 1–20; X is —H or —F; $-D^1-$ is —CO—O—$(CH_2)_{ra}$—, —O—$(CH_2)_{ra}$—, —$(CH_2)_{ra}$—, —)—$SO_2$—, —$SO_2$—, —$SO_2$—$(CH_2)_{ra}$—, —O—$(CH_2)_{ra}$—O—$(CH_2)_{rb}$—, —$(CH_2)_{ra}$—$N(C_{pa}H_{2pa+1})$—$SO_2$— or —$(CH_2)_{ra}$—$N(C_{pa}H_{2pa+1})$—CO—; where ra and rb are independently 1–20; and pa is 0–4.

8. A liquid crystal device according to claim 6, wherein said fluorocarbon terminal portion of the fluorine-containing mesomorphic compound is a group represented by the formula $-D^2-(C_{xb}F_{2xb}-O)_{za}-C_{ya}F_{2ya+1}$, where xb is 1–10 independently for each $(C_{xb}F_{2xb}-O)$; ya is 1–10; za is 1–10; $-D^2-$ is —CO—O—$C_{rc}H_{2rc}$—, —O—$C_{rc}H_{2rc}$—, —$C_{rc}H_{2rc}$—; —O—$(C_{sa}H_{2sa}-O)_{ta}-C_{rd}H_{2rd}$—, —O—$SO_2$—, —$SO_2$—, —$SO_2$—$C_{rc}H_{2rc}$—, —$C_{rc}H_{2rc}$—$N(C_{pb}H_{2pb+1})$—$SO_2$—, —$C_{rc}H_{2rc}$—$N(C_{pb}H_{2pb+1})$—CO—, or a covalent bond, where rc and rd are independently 1–20; sa is independently 1–10 for each $(C_{sa}H_{2sa}-O)$; ta is 1–6; and pb is 0–4.

9. A liquid crystal device according to claim 6, wherein said fluorine-containing mesomorphic compound is represented by the general formula (I):

Formula (I):

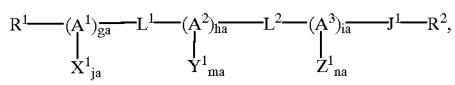

where $A^1$, $A^2$ and $A^3$ are each independently

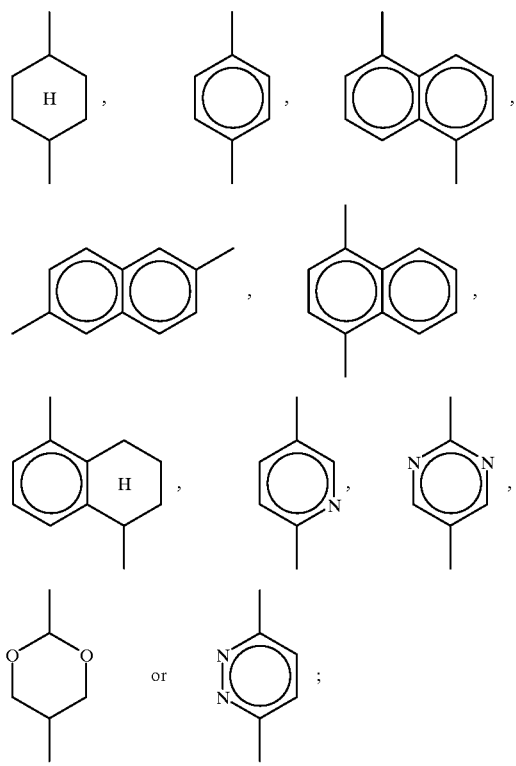

ga, ha and ia are independently an integer of 0–3 with the proviso that the sum of ga+ha+ia be at least 2;

$L^1$ and $L^2$ are each independently a covalent bond, —CO—O—, —O—CO—, —COS—, —S—CO—, —CO—Se—, —Se—CO—, —CO—Te—, —Te—CO—, —$CH_2CH_2$—, —CH=CH—, —C≡C—, —CH=N—, —N=CH—, —$CH_2$—O—, —O—$CH_2$—, —CO— or —O—;

$X^1$, $Y^1$ and $Z^1$ are each a substituent of $A^1$, $A^2$ and $A^3$, respectively, and each of $X^1$, $Y^1$ and $Z^1$ are independently —H, —Cl, —F, —Br, —I, —OH, —$OCH_3$, —$CH_3$, —CN or —$NO_2$;

each ja, ma and na are independently an integer of 0–4;

$J^1$ is —CO—O—$(CH_2)_{ra}$—, —O—$(CH_2)_{ra}$—, —$(CH_2)_{ra}$—, —O—$SO_2$—, —$SO_2$—, —$SO_2$—$(CH_2)_{ra}$—, —O—$(CH_2)_{ra}$—O—$(CH_2)_{rb}$—, —$(CH_2)_{ra}$—$N(C_{pa}H_{2pa+1})$—$SO_2$— or —$(CH_2)_{ra}$—$N(C_{pa}H_{2pa+1})$—CO—; where ra and rb are independently 1–20, and pa is 0–4;

$R^1$ is —O—$C_{qa}H_{2qa}$—O—$C_{qb}H_{2qb+1}$, —$C_{qa}H_{2qa}$—O—$C_{qb}H_{2qb+1}$, —$C_{qa}H_{2qa}$—$R^3$, —O—$C_{qa}H_{2qa}$—$R^3$, —CO—O—$C_{qa}H_{2qa}$—$R^3$, or —O—CO—$C_{qa}H_{2qa}$—$R^3$ which may be either straight chain or branched; where $R^3$ is —O—CO—$C_{qb}H_{2qb+1}$, —CO—O—$C_{qb}H_{2qb+1}$, —H, —Cl, —F, —$CF_3$, —$NO_2$ or —CN; and qa and qb are independently 1–20;

$R^2$ is $C_{xa}F_{2xa}$—X, where X is —H or —F, xa is an integer of 1–20.

10. A liquid crystal device according to claim 6, wherein said fluorine-containing mesomorphic compound is represented by the general formula (II):

Formula (II):

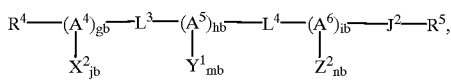

wherein $A^4$, $A^5$ and $A^6$ are each independently

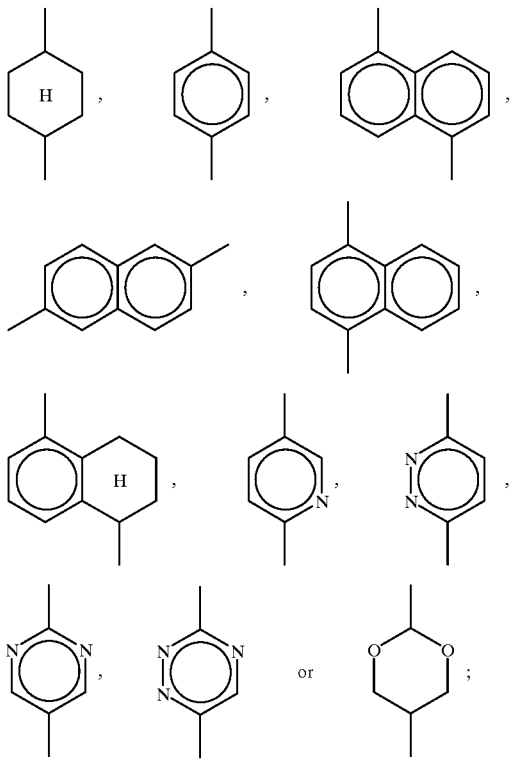

gb, hb and ib are each independently an integer of 0–3 with the proviso that the sum of gb+hb+ib be at least 2; each $L^3$ and $L^4$ are independently a covalent bond, —CO—O—, —O—CO—, —CO—S—, —S—CO—, —CO—Se—, —Se—CO—, —CO—Te—, —Te—CO—, —(CH$_2$CH$_2$)$_{ka}$— (ka is 1–4), —CH=CH—, —C≡C—, —CH=N—, —N=CH—, —CH$_2$—O—, —O—CH$_2$—, —CO— or —O—;

$X^2$, $Y^2$ and $Z^2$ are each a substituent of $A^4$, $A^5$ and $A^6$, respectively, and each $X_2$, $Y_2$ and $Z_2$ are independently —H, —Cl, —F, —Br, —I, —OH, —OCH$_3$, —CH$_3$, —CF$_3$, —O—CF$_3$, —CN or —NO$_2$; each jb, mb and nb are independently an integer of 0–4;

$J^2$ is —CO—O—C$_{rc}$H$_{2rc}$—, —O—C$_{rc}$H$_{2rc}$—, —C$_{rc}$H$_{2rc}$—, —O—(C$_{sa}$H$_{2sa}$—O)$_{ta}$—C$_{rd}$H$_{2rd}$—, —O—SO$_2$—, —SO$_2$—, —SO$_2$—C$_{rc}$H$_{2rc}$—, —C$_{rc}$H$_{2rc}$—N(C$_{pb}$H$_{2pb+1}$)—SO$_2$— or —C$_{rc}$H$_{2rc}$—N(C$_{pb}$H$_{2pb+1}$)—CO—; rc and rd are independently 1–20; sa is independently 1–10 for each (C$_{sa}$H$_{2sa}$—O), ta is 1–6; and pb is 0–4;

$R^4$ is —O—(C$_{qc}$H$_{2qc}$—O)$_{wa}$—C$_{qd}$H$_{2qd+1}$, —(C$_{qc}$H$_{2qc}$—O)$_{wa}$—C$_{qd}$H$_{2qd+1}$, —C$_{qc}$H$_{2qc}$—R$^6$, —O—C$_{qc}$H$_{2qc}$—R$^6$, —CO—O—C$_{qc}$H$_{2qc}$—R$^6$, or O—CO—C$_{qc}$H$_{2qc}$—R$^6$ which may be either straight chain or branched; $R^6$ is —O—CO—C$_{qd}$H$_{2qd+1}$; —CO—O—C$_{qd}$H$_{2qd+1}$, —Cl, —F, —CF$_3$, —NO$_2$, —CN or —H; qc and qd are independently an integer of 1–20; wa is an integer of 1–10;

$R^5$ is (C$_{xb}$F$_{2xb}$—O)$_{za}$—C$_{ya}$F$_{2ya+1}$, wherein xb is independently 1–10 for each (C$_{xb}$F$_{2xb}$—O); ya is 1–10; and za is 1–10.

11. A device according to claim 1, wherein said pair of substrates are further provided with alignment control layers, respectively, which have been subjected to mutually different aligning treatments.

12. A device according to claim 11, wherein one of said alignment control layers is subjected to a uniaxial aligning treatment.

13. A device according to claim 12, wherein said uniaxial aligning treatment is a rubbing treatment.

14. A device according to claim 1, wherein at least one of the substrates is further provided with an alignment control layer comprising a polyimide represented by the following formula (P):

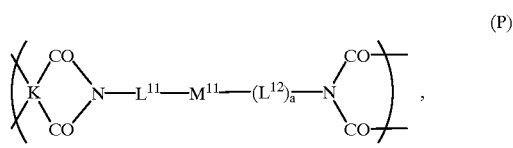

in which

K is

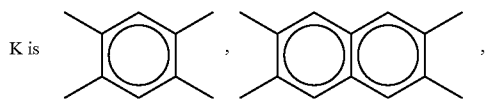

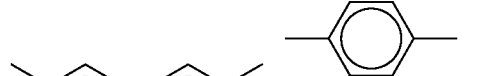

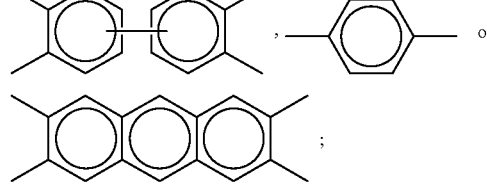

$L^{11}$ and $L^{12}$ independently denote

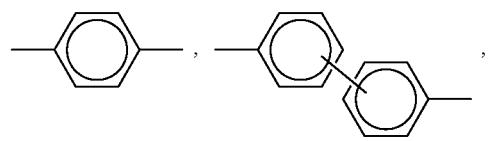

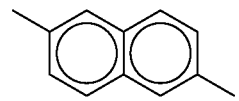

or an alkylene group having 1–20 carbon atoms; $M^{11}$ is a single bond or —O—; and a is 0, 1 or 2.

15. A device according to claim 14, wherein said alignment control layers have been subjected to mutually different aligning treatments.

16. A device according to claim 14, wherein one of said alignment control layers has been subjected to a uniaxial aligning treatment and the other alignment control layer has not been subjected to a uniaxial aligning treatment.

17. A device according to claim 1, wherein at least one of the substrates is further provided with a film comprising a matrix material containing fine particles doped with an electroconductivity-controlling impurity.

18. A device according to claim 16, wherein the other alignment control layer comprises a film comprising a matrix material containing fine particles doped with an electroconductivity-controlling impurity.

19. A liquid crystal device, comprising: a pair of substrates each having thereon an electrode, and a smectic liquid crystal disposed between the substrates, said smectic liquid crystal having a plurality of molecular layers each comprising a plurality of liquid crystal molecules, wherein said smectic liquid crystal is disposed to form a first region wherein the molecular layers are aligned to have a layer inclination angle smaller than a calculated layer inclination angle based on a temperature-dependent layer spacing-changing characteristic, and a second region wherein the molecular layers are aligned to form a chevron structure having a layer inclination angle substantially equal to a calculated layer inclination angle based on a temperature-dependent layer spacing-changing characteristic.

20. A device according to claim 19, wherein said second region includes plural regions in which the molecular layers have different bending directions.

21. A device according to claim 19, wherein said first region has an areal ratio of at least 10% based on said entire optical modulation region of the device.

22. A device according to claim 19, wherein said first region has an areal ratio of at least 40% based on said entire optical modulation region.

23. A device according to claim 19, wherein said layer inclination angle in the second region is at most 7 degrees.

24. A device according to claim 19, wherein said smectic liquid crystal comprises at least one species of fluorine-containing mesomorphic compound comprising a fluorocarbon terminal portion and a hydrocarbon terminal portion, the terminal portions being connected with a central core and having a smectic phase or a latent smectic phase.

25. A liquid crystal device according to claim 24, wherein said fluorocarbon terminal portion of the fluorine-containing mesomorphic compound is a group represented by the formula -$D^1$-$C_{xa}F_{2xa}$—X, where xa is 1–20; X is —H or —F; -$D^1$- is —CO—O—$(CH_2)_{ra}$—, —O—$(CH_2)_{ra}$—, —$(CH_2)_{ra}$—, —O—$SO_2$—, —$SO_2$—, —$SO_2$—$(CH_2)_{ra}$—, —O—$(CH_2)_{ra}$—O—$(CH_2)_{rb}$—, $(CH_2)_{ra}$—N($C_{pa}H_{2pa+1}$)—$SO_2$— or —$(CH_2)_{ra}$—N($C_{pa}H_{2pa+1}$)—CO—; where ra and rb are independently 1–20; and pa is 0–4.

26. A liquid crystal device according to claim 24, wherein said fluorocarbon terminal portion of the fluorine-containing mesomorphic compound is a group represented by the formula -$D^2$-$(C_{xb}F_{2xb}$—O$)_{za}$—$C_{ya}F_{2ya+1}$, where xb is 1–10 independently for each ($C_{xb}F_{2xb}$—O); ya is 1–10; za is 1–10; -$D^2$- is —CO—O—$C_{rc}H_{2rc}$—, —O—$C_{rc}H_{2rc}$—, —$C_{rc}H_{2rc}$—, —O—$(C_{sa}H_{2sa}$—O$)_{ta}$—$C_{rd}H_{2rd}$—, —O—$SO_2$—, —$SO_2$—, —$SO_2$—$C_{rc}H_{2rc}$—, —$C_{rc}H_{2rc}$—N($C_{pb}H_{2pb+1}$)—$SO_2$—, —$C_{rc}H_{2rc}$—N($C_{pb}H_{2pb+1}$)—CO—, or a covalent bond, where rc and rd are independently 1–20; sa is independently 1–10 for each ($C_{sa}H_{2sa}$—O); ta is 1–6; and pb is 0–4.

27. A liquid crystal device according to claim 24, wherein said fluorine-containing mesomorphic compound is represented by the general formula (I):

Formula (I):

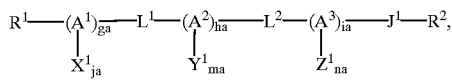

where $A^1$, $A^2$ and $A^3$ are each independently

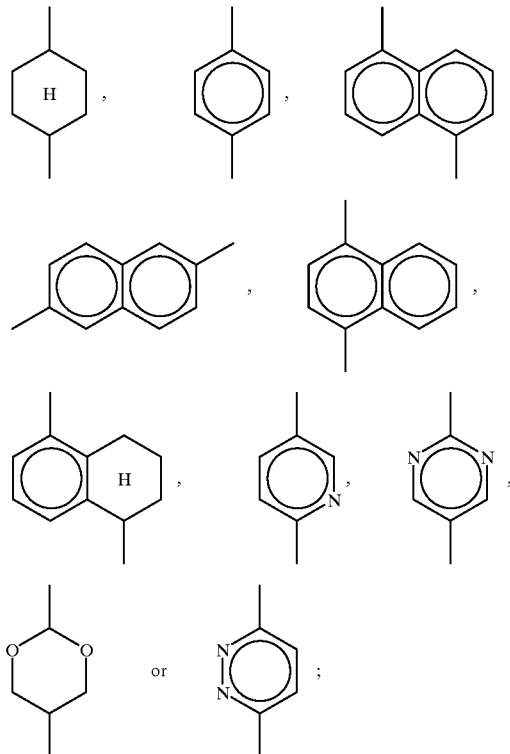

ga, ha and ia are independently an integer of 0–3 with the proviso that the sum of ga+ha+ia be at least 2;
$L^1$ and $L^2$ are each independently a covalent bond, —CO—O—, —O—CO—, —COS—, —S—CO—, —CO—Se—, —Se—CO—, —CO—Te—, —Te—CO—, —$CH_2CH_2$—, —CH=CH—, —C≡C—, —CH=N—, —N=CH—, —$CH_2$—O—, —O—$CH_2$—, —CO— or —O—;
$X^1$, $Y^1$ and $Z^1$ are each a substituent of $A^1$, $A^2$ and $A^3$, respectively, and each of $X^1$, $Y^1$ and $Z^1$ are independently —H, —Cl, —F, —Br, —I, —OH, —$OCH_3$, —$CH_3$, —CN or —$NO_2$;
each ja, ma and na are independently an integer of 0–4;
$J^1$ is —CO—O—$(CH_2)_{ra}$—, —O—$(CH_2)_{ra}$—, —$(CH_2)_{ra}$—, —O—$SO_2$—, —$SO_2$—, —$SO_2$—$(CH_2)_{ra}$—, —O—$(CH_2)_{ra}$—O—$(CH_2)_{rb}$—, —$(CH_2)_{ra}$—N($C_{pa}H_{2pa+1}$)—$SO_2$— or —$(CH_2)_{ra}$—N($C_{pa}H_{2pa+1}$)—CO—; where ra and rb are independently 1–20, and pa is 0–4;
$R^1$ is —O—$C_{qa}H_{2qa}$—O—$C_{qb}H_{2qb+1}$, —$C_{qa}H_{2qa}$—O—$C_{qb}H_{2qb+1}$, —$C_{qa}H_{2qa}$—$R^3$, —O—$C_{qa}H_{2qa}$—$R^3$, —CO—O—$C_{qa}H_{2qa}$—$R^3$, or —O—CO—$C_{qa}H_{2qa}$—$R^3$ which may be either straight chain or branched; where $R^3$ is —O—CO—$C_{qb}H_{2qb+1}$, —CO—O—$C_{qb}H_{2qb+1}$, —H, —Cl, —F, —$CF_3$, —$NO_2$ or —CN; and qa and qb are independently 1–20;
$R^2$ is $C_{xa}F_{2xa}$—X, where X is —H or —F, xa is an integer of 1–20.

28. A liquid crystal device according to claim 24, wherein said fluorine-containing mesomorphic compound is represented by the general formula (II):
Formula (II):

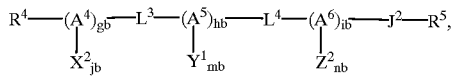

wherein $A^4$, $A^5$ and $A^6$ are each independently

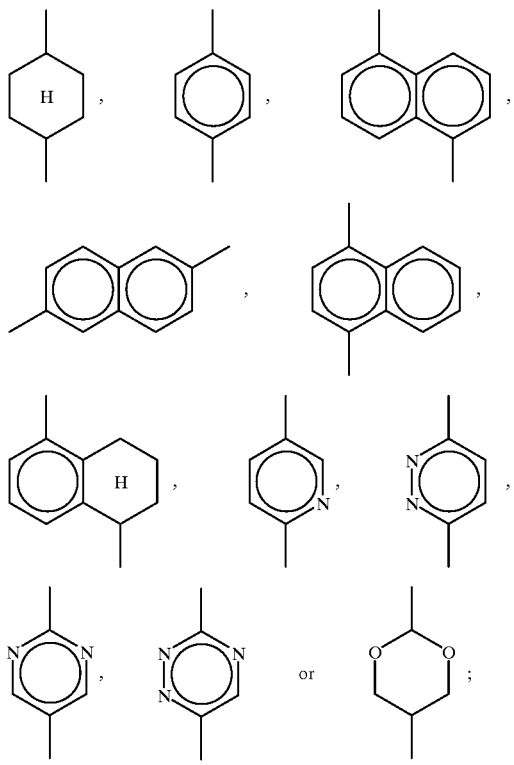

gb, hb and ib are each independently an integer of 0–3 with the proviso that the sum of gb+hb+ib be at least 2;

each $L^3$ and $L^4$ are independently a covalent bond, —CO—O—, —O—CO—, —CO—S—, —S—CO—, —CO—Se—, —Se—CO—, —CO—Te—, —Te—CO—, —(CH$_2$CH$_2$)$_{ka}$— (ka is 1–4), —CH=CH—, —C≡C—, —CH=N—, —N=CH—, —CH$_2$—O—, —O—CH$_2$—, —CO— or —O—;

$X^2$, $Y^2$ and $Z^2$ are each a substituent of $A^4$, $A^5$ and $A^6$, respectively, and each $X_2$, $Y_2$ and $Z_2$ are independently —H, —Cl, —F, —Br, —I, —OH, —OCH$_3$, —CH$_3$, —CF$_3$, —O—CF$_3$, —CN or —NO$_2$; each jb, mb and nb are independently an integer of 0–4;

$J^2$ is —CO—O—C$_{rc}$H$_{2rc}$—, —O—C$_{rc}$H$_{2rc}$—, —C$_{rc}$H$_{2rc}$—, —O—(C$_{sa}$H$_{2sa}$—O)$_{ta}$—C$_{rd}$H$_{2rd}$—, —O—SO$_2$—, —SO$_2$—, —SO$_2$—C$_{rc}$H$_{2rc}$—, —C$_{rc}$H$_{2rc}$—N(C$_{pb}$H$_{2pb+1}$)—SO$_2$— or —C$_{rc}$H$_{2rc}$—N(C$_{pb}$H$_{2pb+1}$)—CO—; rc and rd are independently 1–20; sa is independently 1–10 for each (C$_{sa}$H$_{2sa}$—O), ta is 1–6; and pb is 0–4;

$R^4$ is —O—(C$_{qc}$H$_{2qc}$—O)$_{wa}$—C$_{qd}$H$_{2qd+1}$, —(C$_{qc}$H$_{2qc}$—O)$_{wa}$—C$_{qd}$H$_{2qd+1}$, —C$_{qc}$H$_{2qc}$—R$^6$, —O—C$_{qc}$H$_{2qc}$—R$^6$, —CO—O—C$_{qc}$H$_{2qc}$—R$^6$, or O—CO—C$_{qc}$H$_{2qc}$—R$^6$ which may be either straight chain or branched; $R^6$ is —O—CO—C$_{qd}$H$_{2qd+1}$; —CO—O—C$_{qd}$H$_{2qd+1}$, —Cl, —F, —CF$_3$, —NO$_2$, —CN or —H; qc and qd are independently an integer of 1–20; wa is an integer of 1–10;

$R^5$ is (C$_{xb}$F$_{2xb}$—O)$_{za}$—C$_{ya}$F$_{2ya+1}$, wherein xb is independently 1–10 for each (C$_{xb}$F$_{2xb}$—O); ya is 1–10; and za is 1–10.

29. A device according to claim 19, wherein said pair of substrates are further provided with alignment control layers, respectively, which have been subjected to mutually different aligning treatments.

30. A device according to claim 29, wherein one of said alignment control layers is subjected to a uniaxial aligning treatment.

31. A device according to claim 30, wherein said uniaxial aligning treatment is a rubbing treatment.

32. A device according to claim 19, wherein at least one of the substrates is further provided with an alignment control layer comprising a polyimide represented by the following formula (P):

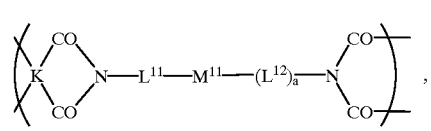

in which

K is 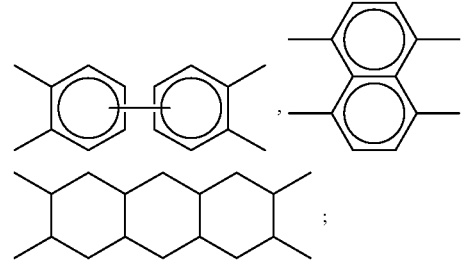 or

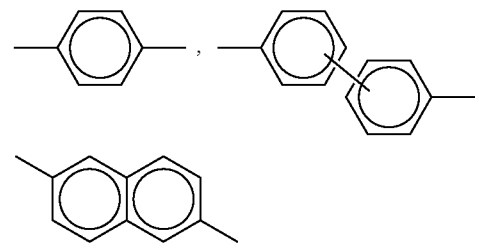

$L_{11}$ and $L^{12}$ independently denote

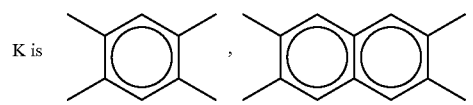

or an alkylene group having 1–20 carbon atoms;
$M^{11}$ is a single bond or —O—; and
a is 0, 1 or 2.

33. A device according to claim 32, wherein said alignment control layers have been subjected to mutually different aligning treatments.

34. A device according to claim 32, wherein one of said alignment control layers has been subjected to a uniaxial aligning treatment and the other alignment control layer has not been subjected to a uniaxial aligning treatment.

35. A device according to claim 19, wherein at least one of the substrates is further provided with a film comprising a matrix material containing fine particles doped with an electroconductivity-controlling impurity.

36. A device according to claim 34, wherein the other alignment control layer comprises a film comprising a matrix material containing fine particles doped with an electroconductivity-controlling impurity.

37. A liquid crystal device, comprising: a pair of substrates each having thereon an electrode, and a smectic liquid crystal disposed between the substrates, said smectic liquid crystal having a plurality of molecular layers each comprising a plurality of liquid crystal molecules disposed between the substrates, wherein said smectic liquid crystal is disposed to form an optical modulation region including a first region wherein the molecular layers are aligned in a direction substantially perpendicular to the substrates to form a bookshelf structure, and a second region wherein the molecular layers are aligned to form a chevron structure having a layer inclination angle above 3 degrees.

38. A device according to claim 37, wherein said second region includes plural regions in which the molecular layers have different bending directions.

39. A device according to claim 37, wherein said first region has an areal ratio of at least 10% based on said entire optical modulation region of the device.

40. A device according to claim 37, wherein said first region has an areal ratio of at least 40% based on said entire optical modulation region.

41. A device according to claim 37, wherein said substantial layer inclination angle in the second region is at most 7 degrees.

42. A device according to claim 37, wherein said smectic liquid crystal comprises at least one species of fluorine-containing mesomorphic compound comprising a fluorocarbon terminal portion and a hydrocarbon terminal portion, the terminal portions being connected with a central core and having a smectic phase or a latent smectic phase.

43. A liquid crystal device according to claim 42, wherein said fluorocarbon terminal portion of the fluorine-containing mesomorphic compound is a group represented by the formula $-D^1-C_{xa}F_{2xa}-X$, where xa is 1–20; X is —H or —F; $-D^1-$ is —CO—O—$(CH_2)_{ra}$—, —O—$(CH_2)_{ra}$—, —$(CH_2)_{ra}$—, —O—$SO_2$—, —$SO_2$—, —$SO_2$—$(CH_2)_{ra}$—, —O—$(CH_2)_{ra}$—O—$(CH_2)_{rb}$—, —$(CH_2)_{ra}$—$N(C_{pa}H_{2pa+1})$—$SO_2$— or —$(CH_2)_{ra}$—$N(C_{pa}H_{2pa+1})$—CO—; where ra and rb are independently 1–20; and pa is 0–4.

44. A liquid crystal device according to claim 42, wherein said fluorocarbon terminal portion of the fluorine-containing mesomorphic compound is a group represented by the formula $-D^2-(C_{xb}F_{2xb}-O)_{za}-C_{ya}F_{2ya+1}$, where xb is 1–10 independently for each $(C_{xb}F_{2xb}-O)$; ya is 1–10; za is 1–10; $-D^2-$ is —CO—O—$C_{rc}H_{2rc}$—, —O—$C_{rc}H_{2rc}$—, —$C_{rc}H_{2rc}$—, —O—$(C_{sa}H_{2sa}-O)_{ta}-C_{rd}H_{2rd}$—, —O—$SO_2$—, —$SO_2$—, —$SO_2$—$C_{rc}H_{2rc}$—, —$C_{rc}H_{2rc}$—$N(C_{pb}H_{2pb+1})$—$SO_2$—, —$C_{rc}H_{2rc}$—$N(C_{pb}H_{2pb+1})$—CO—, or a covalent bond, where rc and rd are independently 1–20; sa is independently 1–10 for each $(C_{sa}H_{2sa}-O)$; ta is 1–6; and pb is 0–4.

45. A liquid crystal device according to claim 42, wherein said fluorine-containing mesomorphic compound is represented by the general formula (I):

Formula (I):

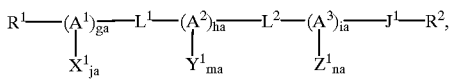

where $A^1$, $A^2$ and $A^3$ are each independently

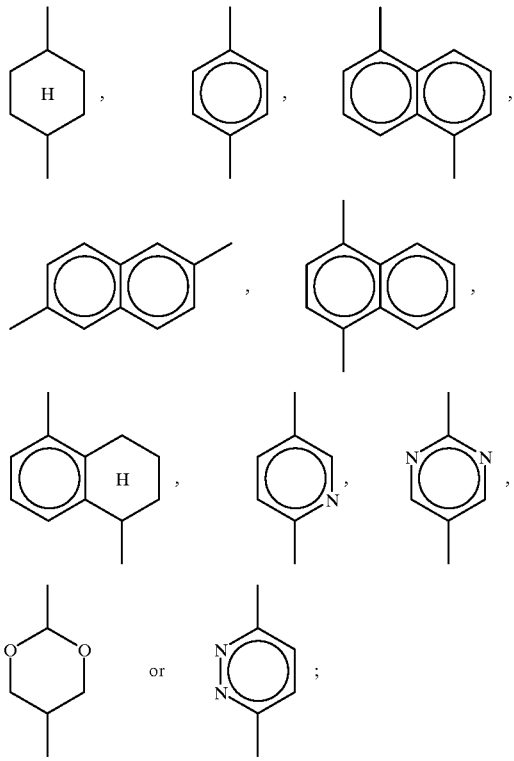

ga, ha and ia are independently an integer of 0–3 with the proviso that the sum of ga+ha+ia be at least 2;
$L^1$ and $L^2$ are each independently a covalent bond, —CO—O—, —O—CO—, —COS—, —S—CO—, —CO—Se—, —Se—CO—, —CO—Te—, —Te—CO—, —$CH_2CH_2$—, —CH=CH—, —C≡C—, —CH=N—, —N=CH—, —$CH_2$—O—, —O—$CH_2$—, —CO— or —O—;
$X^1$, $Y^1$ and $Z^1$ are each a substituent of $A^1$, $A^2$ and $A^3$, respectively, and each of $X^1$, $Y^1$ and $Z^1$ are independently —H, —Cl, —F, —Br, —I, —OH, —$OCH_3$, —$CH_3$, —CN or —$NO_2$;
each ja, ma and na are independently an integer of 0–4;
$J^1$ is —CO—O—$(CH_2)_{ra}$—, —O—$(CH_2)_{ra}$—, —$(CH_2)_{ra}$—, —O—$SO_2$—, —$SO_2$—, —$SO_2$—$(CH_2)_{ra}$—, —O—$(CH_2)_{ra}$—O—$(CH_2)_{rb}$—, —$(CH_2)_{ra}$—$N(C_{pa}H_{2pa+1})$—$SO_2$— or —$(CH_2)_{ra}$—$N(C_{pa}H_{2pa+1})$—CO—; where ra and rb are independently 1–20, and pa is 0–4;
$R^1$ is —O—$C_{qa}H_{2qa}$—O—$C_{qb}H_{2qb+1}$, —$C_{qa}H_{2qa}$—O—$C_{qb}H_{2qb+1}$, —$C_{qa}H_{2qa}$—$R^3$, —O—$C_{qa}H_{2qa}$—$R^3$, —CO—O—$C_{qa}H_{2qa}$—$R^3$, or —O—CO—$C_{qa}H_{2qa}$—$R^3$ which may be either straight chain or branched; where $R^3$ is —O—CO—$C_{qb}H_{2qb+1}$, —CO—O—$C_{qb}H_{2qb+1}$, —H, —Cl, —F, —$CF_3$, —$NO_2$ or —CN; and qa and qb are independently 1–20;
$R^2$ is $C_{xa}F_{2xa}$—X, where X is —H or —F, xa is an integer of 1–20.

46. A liquid crystal device according to claim 42, wherein said fluorine-containing mesomorphic compound is represented by the general formula (II):

Formula (II):

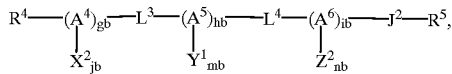

wherein $A^4$, $A^5$ and $A^6$ are each independently

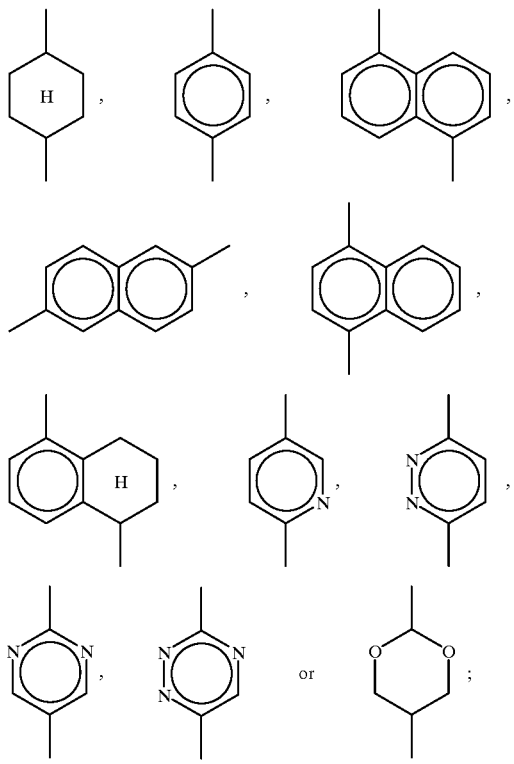

gb, hb and ib are each independently an integer of 0–3 with the proviso that the sum of gb+hb+ib be at least 2;

each $L^3$ and $L^4$ are independently a covalent bond, —CO—O—, —O—CO—, —CO—S—, —S—CO—, —CO—Se—, —Se—CO—, —CO—Te—, —Te—CO—, —(CH$_2$CH$_2$)$_{ka}$— (ka is 1–4), —CH=CH—, —C≡C—, —CH=N—, —N=CH—, —CH$_2$—O—, —O—CH$_2$—, —CO— or —O—;

$X^2$, $Y^2$ and $Z^2$ are each a substituent of $A^4$, $A^5$ and $A^6$, respectively, and each $X_2$, $Y_2$ and $Z_2$ are independently —H, —Cl, —F, —Br, —I, —OH, —OCH$_3$, —CH$_3$, —CF$_3$, —O—CF$_3$, —CN or —NO$_2$; each jb, mb and nb are independently an integer of 0–4;

$J^2$ is —CO—O—C$_{rc}$H$_{2rc}$—, —O—C$_{rc}$H$_{2rc}$—, —C$_{rc}$H$_{2rc}$—, —O—(C$_{sa}$H$_{2sa}$—O)$_{ta}$—C$_{rd}$H$_{2rd}$—, —O—SO$_2$—, —SO$_2$—, —SO$_2$—C$_{rc}$H$_{2rc}$—; —C$_{rc}$H$_{2rc}$—N(C$_{pb}$H$_{2pb+1}$)—SO$_2$— or —C$_{rc}$H$_{2rc}$—N(C$_{pb}$H$_{2pb+1}$)—CO—; rc and rd are independently 1–20; sa is independently 1–10 for each (C$_{sa}$H$_{2sa}$—O), ta is 1–6; and pb is 0–4;

$R^4$ is —O—(C$_{qc}$H$_{2qc}$—O)$_{wa}$—C$_{qd}$H$_{2qd+1}$, —(C$_{qc}$H$_{2qc}$—O)$_{wa}$—C$_{qd}$H$_{2qd+1}$, —C$_{qc}$H$_{2qc}$—R$^6$, —O—C$_{qc}$H$_{2qc}$—R$^6$, —CO—O—C$_{qc}$H$_{2qc}$—R$^6$, or O—CO—C$_{qc}$H$_{2qc}$—R$^6$ which may be either straight chain or branched; R$^6$ is —O—CO—C$_{qd}$H$_{2qd+1}$; —CO—O—C$_{qd}$H$_{2qd+1}$, —Cl, —F, —CF$_3$, —NO$_2$, —CN or —H; qc and qd are independently an integer of 1–20; wa is an integer of 1–10;

$R^5$ is (C$_{xb}$F$_{2xb}$—O)$_{za}$—C$_{ya}$F$_{2ya+1}$, wherein xb is independently 1–10 for each (C$_{xb}$F$_{2xb}$—O); ya is 1–10; and za is 1–10.

47. A device according to claim 37, wherein said pair of substrates are further provided with alignment control layers, respectively, which have been subjected to mutually different aligning treatments.

48. A device according to claim 47, wherein one of said alignment control layers is subjected to a uniaxial aligning treatment.

49. A device according to claim 48, wherein said uniaxial aligning treatment is a rubbing treatment.

50. A device according to claim 37, wherein at least one of the substrates is further provided with an alignment control layer comprising a polyimide represented by the following formula (P):

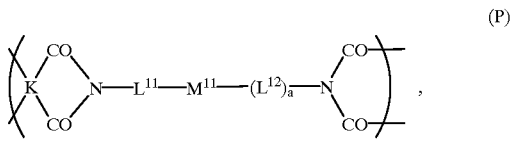

in which

K is

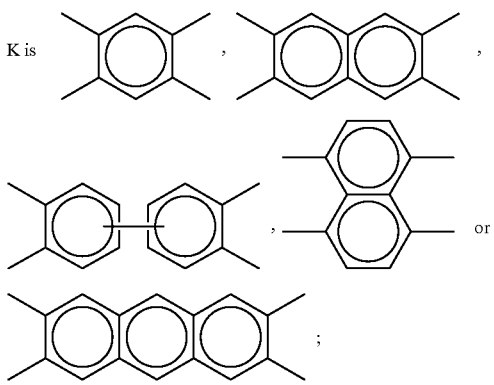

$L_{11}$ and $L^{12}$ independently denote

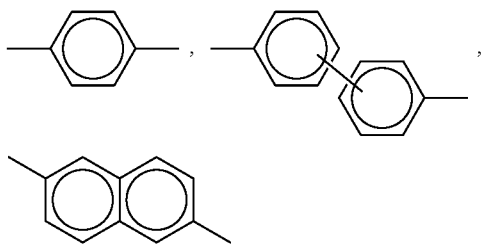

or an alkylene group having 1–20 carbon atoms;

$M^{11}$ is a single bond or —O—; and a is 0, 1 or 2.

51. A device according to claim 50, wherein said alignment control layers have been subjected to mutually different aligning treatments.

52. A device according to claim 50, wherein one of said alignment control layers has been subjected to a uniaxial aligning treatment and the other alignment control layer has not been subjected to a uniaxial aligning treatment.

53. A device according to claim 37, wherein at least one of the substrates is further provided with a film comprising a matrix material containing fine particles doped with an electroconductivity-controlling impurity.

54. A device according to claim 52, wherein the other alignment control layer comprises a film comprising a matrix material containing fine particles doped with an electroconductivity-controlling impurity.

55. A liquid crystal device, comprising: a pair of substrates each having thereon an electrode, and a smectic liquid crystal disposed between the substrates, said smectic liquid crystal having a plurality of molecular layers each comprising a plurality of liquid crystal molecules disposed between the substrates, wherein said smectic liquid crystal is disposed to form a first region wherein the molecular layers are aligned in a direction substantially perpendicular to the substrates to a form a bookshelf structure, and a second region wherein the molecular layers are aligned to form a chevron structure having a layer inclination angle substantially equal to a calculated layer inclination angle based on a temperature-dependent layer spacing-changing characteristics.

56. A device according to claim 55, wherein said second region includes plural regions in which the molecular layers have different bending directions.

57. A device according to claim 55, wherein said first region has an areal ratio of at least 10% based on said entire optical modulation region of the device.

58. A device according to claim 55, wherein said first region has an areal ratio of at least 40% based on said entire optical modulation region.

59. A device according to claim 55, wherein said layer inclination angle in the second region is at most 7 degrees.

60. A device according to claim 55, wherein said smectic liquid crystal comprises at least one species of fluorine-containing mesomorphic compound comprising a fluorocarbon terminal portion and a hydrocarbon terminal portion, the terminal portions being connected with a central core and having a smectic phase or a latent smectic phase.

61. A liquid crystal device according to claim 60, wherein said fluorocarbon terminal portion of the fluorine-containing mesomorphic compound is a group represented by the formula -D$^1$-C$_{xa}$F$_{2xa}$—X, where xa is 1–20; X is —H or —F; -D$^1$- is —CO—O—(CH$_2$)$_{ra}$—, —O—(CH$_2$)$_{ra}$—, —(CH$_2$)$_{ra}$—, —O—SO$_2$—, —SO$_2$—, —SO$_2$—(CH$_2$)$_{ra}$—, —O—(CH$_2$)$_{ra}$—O—(CH$_2$)$_{rb}$—, —(CH$_2$)$_{ra}$—N(C$_{pa}$H$_{2pa+1}$)—SO$_2$— or —(CH$_2$)$_{ra}$—N(C$_{pa}$H$_{2pa+1}$)—CO—; where ra and rb are independently 1–20; and pa is 0–4.

62. A liquid crystal device according to claim 60, wherein said fluorocarbon terminal portion of the fluorine-containing mesomorphic compound is a group represented by the formula -D$^2$-(C$_{xb}$F$_{2xb}$—O)$_{za}$—C$_{ya}$F$_{2ya+1}$, where xb is 1–10 independently for each (C$_{xb}$F$_{2xb}$—O); ya is 1–10; za is 1–10; -D$^2$- is —CO—O—C$_{rc}$H$_{2rc}$—, —O—C$_{rc}$H$_{2rc}$—, —C$_{rc}$H$_{2rc}$—, —O—(C$_{sa}$H$_{2sa}$—O)$_{ta}$—C$_{rd}$H$_{2rd}$—, —O—SO$_2$—, —SO$_2$—, —SO$_2$—C$_{rc}$H$_{rc}$—, —C$_{rc}$H$_{2rc}$—N(C$_{pb}$H$_{2pb+1}$)—SO$_2$—, —C$_{rc}$H$_{2rc}$—N(C$_{pb}$H$_{2pb+1}$)—CO—, or a covalent bond, where rc and rd are independently 1–20; sa is independently 1–10 for each (C$_{sa}$H$_{2sa}$—O); ta is 1–6; and pb is 0–4.

63. A liquid crystal device according to claim 60, wherein said fluorine-containing mesomorphic compound is represented by the general formula (I):

Formula (I):

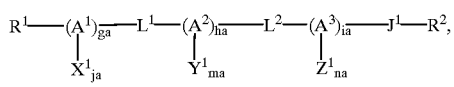

where A$^1_1$, A$^2$ and A$^3$ are each independently

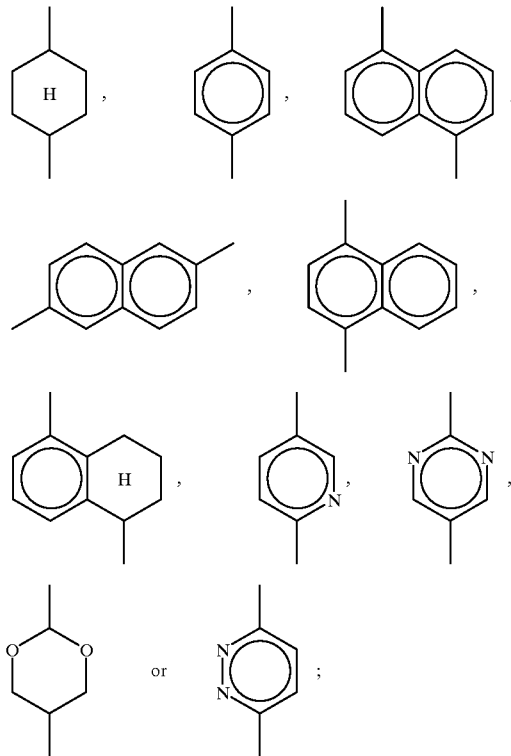

ga, ha and ia are independently an integer of 0–3 with the proviso that the sum of ga+ha+ia be at least 2;

L$^1$ and L$^2$ are each independently a covalent bond, —CO—O—, —O—CO—, —COS—, —S—CO—, —CO—Se—, —Se—CO—, —CO—Te—, —Te—CO—, —CH$_2$CH$_2$—, —CH=CH—, —C≡C—, —CH=N—, —N=CH—, —CH$_2$—O—, —O—CH$_2$—, —CO— or —O—;

X$^1$, Y$^1$ and Z$^1$ are each a substituent of A$^1$, A$^2$ and A$^3$, respectively, and each of X$^1$, Y$^1$ and Z$^1$ are independently —H, —Cl, —F, —Br, —I, —OH, —OCH$_3$, —CH$_3$, —CN or —NO$_2$;

each ja, ma and na are independently an integer of 0–4;

J$^1$ is —CO—O—(CH$_2$)$_{ra}$—, —O—(CH$_2$)$_{ra}$—, —(CH$_2$)$_{ra}$—, —O—SO$_2$—, —SO$_2$—, —SO$_2$—(CH$_2$)$_{ra}$—, —O—(CH$_2$)$_{ra}$—O—(CH$_2$)$_{rb}$—, (CH$_2$)$_{ra}$—N(C$_{pa}$H$_{2pa+1}$)—SO$_2$— or —(CH$_2$)$_{ra}$—N(C$_{pa}$H$_{2pa+1}$)—CO—; where ra and rb are independently 1–20, and pa is 0–4;

R$^1$ is —O—C$_{qa}$H$_{2qa}$—O—C$_{qb}$H$_{qb+1}$, —C$_{qa}$H$_{2qa}$—O—C$_{qb}$H$_{2qb+1}$, —C$_{qa}$H$_{2qa}$—R, —O—C$_{qa}$H$_{2qa}$—R$^3$, —CO—O—C$_{qa}$H$_{2qa}$—R$^3$, or —O—CO—C$_{qa}$H$_{2qa}$—R$^3$ which may be either straight chain or branched; where R$^3$ is —O—CO—C$_{qb}$H$_{2qb+1}$, —CO—O—C$_{qb}$H$_{2qb+1}$, —H, —Cl, —F, —CF$_3$, —NO$_2$ or —CN; and qa and qb are independently 1–20;

R$^2$ is C$_{xa}$F$_{2xa}$—X, where X is —H or —F, xa is an integer of 1–20.

64. A liquid crystal device according to claim 60, wherein said fluorine-containing mesomorphic compound is represented by the general formula (II):

Formula (II):

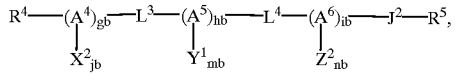

wherein $A^4$, $A^5$ and $A^6$ are each independently

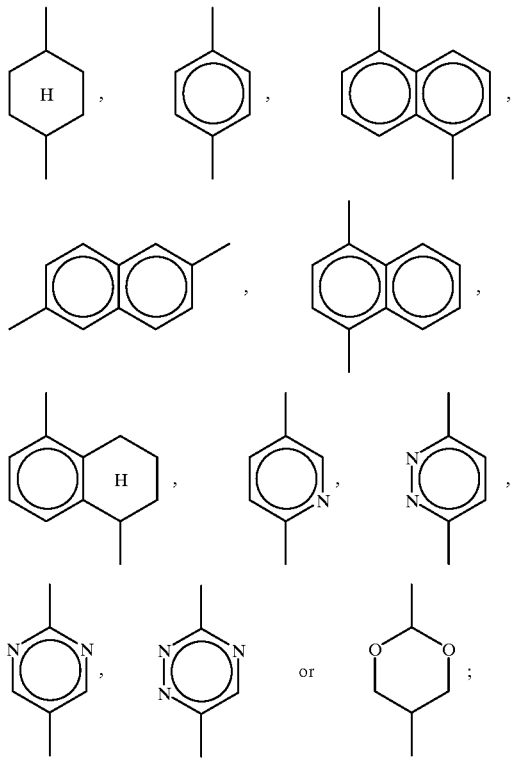

gb, hb and ib are each independently an integer of 0–3 with the proviso that the sum of gb+hb+ib be at least 2; each $L^3$ and $L^4$ are independently a covalent bond, —CO—O—, —O—CO—, —CO—S—, —S—CO—, —CO—Se—, —Se—CO—, —CO—Te—, —Te—CO—, —(CH$_2$CH$_2$)$_{ka}$— (ka is 1–4), —CH=CH—, —C≡C—, —CH=N—, —N=CH—, —CH$_2$—O—, —O—CH$_2$—, —CO— or —O—;

$X^2$, $Y^2$ and $Z^2$ are each a substituent of $A^4$, $A^5$ and $A^6$, respectively, and each $X_2$, $Y_2$ and $Z_2$ are independently —H, —Cl, —F, —Br, —I, —OH, —OCH$_3$, —CH$_3$, —CF$_3$, —O—CF$_3$, —CN or —NO$_2$; each jb, mb and nb are independently an integer of 0–4;

$J^2$ is —CO—O—C$_{rc}$H$_{2rc}$—, —O—C$_{rc}$H$_{2rc}$—, —C$_{rc}$H$_{2rc}$—, —O—(C$_{sa}$H$_{2sa}$—O)$_{ta}$—C$_{rd}$H$_{2rd}$—, —O—SO$_2$—, —SO$_2$—, —SO$_2$C$_{rc}$H$_{2rc}$—, C$_{rc}$H$_{2rc}$—N(C$_{pb}$H$_{2pb+1}$)—SO$_2$— or —C$_{rc}$H$_{2rc}$—N(C$_{pb}$H$_{2pb+1}$)—CO—; rc and rd are independently 1–20; sa is independently 1–10 for each (C$_{sa}$H$_{2sa}$—O), ta is 1–6; and pb is 0–4;

$R^4$ is —O—(C$_{qc}$H$_{2qc}$—O)$_{wa}$—C$_{qd}$H$_{2qd+1}$, —(C$_{qc}$H$_{2qc}$—O)$_{wa}$—C$_{qd}$H$_{2qd+1}$, —C$_{qc}$H$_{2qc}$—R$^6$, —O—C$_{qc}$H$_{2qc}$—R$^6$, —CO—O—C$_{qc}$H$_{2qc}$—R$^6$, or O—CO—C$_{qc}$H$_{2qc}$—R$^6$ which may be either straight chain or branched; R$^6$ is —O—CO—C$_{qd}$H$_{2qd+1}$; —CO—O—C$_{qd}$H$_{2qd+1}$, —Cl, —F, —CF$_3$, —NO$_2$, —CN or —H; qc and qd are independently an integer of 1–20; wa is an integer of 1–10;

$R^5$ is (C$_{xb}$F$_{2xb}$—O)$_{za}$—C$_{ya}$F$_{2ya+1}$, wherein xb is independently 1–10 for each (C$_{xb}$F$_{2xb}$—O); ya is 1–10; and za is 1–10.

65. A device according to claim 55, wherein said pair of substrates are further provided with alignment control layers, respectively, which have been subjected to mutually different aligning treatments.

66. A device according to claim 65, wherein one of said alignment control layers is subjected to a uniaxial aligning treatment.

67. A device according to claim 66, wherein said uniaxial aligning treatment is a rubbing treatment.

68. A device according to claim 55, wherein at least one of the substrates is further provided with an alignment control layer comprising a polyimide represented by the following formula (P):

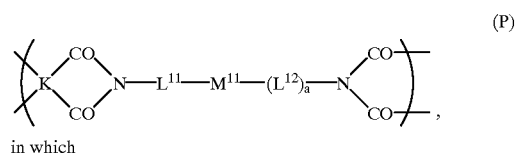

in which

K is

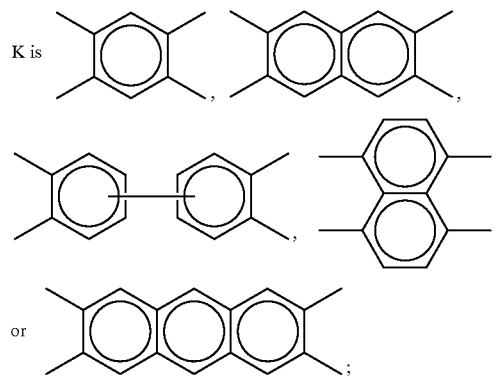

or

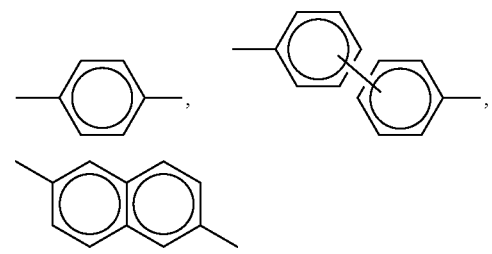

$L_{11}$ and $L^{12}$ independently denote or an alkylene group having 1–20 carbon atoms;

$M^{11}$ is a single bond or —O—; and a is 0, 1 or 2.

69. A device according to claim 68, wherein said alignment control layers have been subjected to mutually different aligning treatments.

70. A device according to claim 68, wherein one of said alignment control layers has been subjected to a uniaxial aligning treatment and the other alignment control layer has not been subjected to a uniaxial aligning treatment.

71. A device according to claim 55, wherein at least one of the substrates is further provided with a film comprising a matrix material containing fine particles doped with an electroconductivity-controlling impurity.

72. A device according to claim 70, wherein the other alignment control layer comprises a film comprising a matrix material containing fine particles doped with an electroconductivity-controlling impurity.

73. A liquid crystal apparatus, including: a liquid crystal device according to any one of claims 1, 19, 37 and 55 and a drive means for driving the liquid crystal device.

* * * * *

UNITED STATES PATENT AND TRADEMARK OFFICE
CERTIFICATE OF CORRECTION

PATENT NO.    : 5,932,136
DATED         : August 3, 1999
INVENTOR(S)   : MASAHIRO TERADA ET AL.

It is certified that error appears in the above-identified patent and that said Letters Patent is hereby corrected as shown below:

ON TITLE PAGE AT [56] REFERENCES CITED, FOREIGN PATENT DOCUMENTS

"59 193426" should read --59-193426--;
"59 193427" should read --59-193427--;
"60 156046" should read --60-156046--;
"60 156047" should read --60-156047--;
"2 142753" should read --2-142753--;
"6347796" should read --6-347796--.

ON TITLE PAGE AT [57] ABSTRACT

Line 16, "an" should read --and--.

COLUMN 1

Line 24, "retracted." should read --limited.--;

COLUMN 4

Line 20, "layer are bent in different two" should read
   --layers are bent in two different--;
Line 42, "a smectic" should read --smectic-;
Line 47, "a smectic" should read --smectic-;
Line 60, "realize" should read --realizes--.

COLUMN 5

Line 52, "fist" should read --first--.

COLUMN 7

Line 1, "substrate" should read --substrates--;
Line 35, "glow" should read --grow--;
Line 43, "includes" should read --include--.

COLUMN 12

Line 43, "the-pair" should read --the pair--.

UNITED STATES PATENT AND TRADEMARK OFFICE
CERTIFICATE OF CORRECTION

PATENT NO. : 5,932,136
DATED : August 3, 1999
INVENTOR(S) : MASAHIRO TERADA ET AL.

It is certified that error appears in the above-identified patent and that said Letters Patent is hereby corrected as shown below:

COLUMN 14

Line 52, "—O—$C_{qa}H_{21ga}$—$R^3$," should read --"—O—$C_{qa}H_{2qa}$—$R^3$--.

COLUMN 16

Formula I-1, " 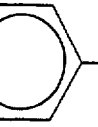 t-Bu " should read

-- 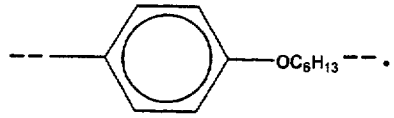 —$OC_6H_{13}$ --.

COLUMN 62

Table A Heading, "Σ'" should read --Σ**--;
Item 3, "$C_6H_{11}O$" should read -- $C_5H_{11}O$--;
Item 15, "$C_6H_{11}$" should read --$C_5H_{11}$--;
Item 17, "$C_9H_{18}$" should read --$C_9H_{19}$--;
Item 18, "$C_6H_{11}$" should read --$C_5H_{11}O$--;
Item 20, "$C_5H_{17}$" should read --$C_8H_{17}$--;
Item 21, "$C_4H_8$" should read --$C_4H_9$--;
Item 22, "$C_6H_{11}$" should read --$C_5H_{11}$--;
Item 23, "$C_6H_{11}$" should read --$C_5H_{11}$--; and
   "$C_{14}H_{28}$" should read --$C_{14}H_{29}$--.
Item 28, "$C_9H_{18}$" should read --$C_9H_{19}$--;
Item 29, "$C_6H_{19}$" should read --$C_5H_{11}$--.

COLUMN 63

Table Heading, "Σ'" should read --Σ**--;
Item 30, "$C_9H_{18}O$" should read --$C_9H_{19}O$--;
Item 36, "$C_9H_{18}$" should read --$C_9H_{19}$--;
Item 38, "$C_4H_8$" should read --$C_4H_9$--;
Item 40, "$C_4H_8$" should read --$C_4H_9$--;
Item 54, "$C_8H_{18}$" should read --$C_9H_{19}$--;
Item 58, "$C_4H_8$" should read --$C_4H_9$--;
Item 59, "$C_4H_3$" should read --$C_4H_9$--;

UNITED STATES PATENT AND TRADEMARK OFFICE
CERTIFICATE OF CORRECTION

PATENT NO.  : 5,932,136
DATED       : August 3, 1999
INVENTOR(S) : MASAHIRO TERADA ET AL.

Page 3 of 5

It is certified that error appears in the above-identified patent and that said Letters Patent is hereby corrected as shown below:

COLUMN 63

Item 61, "$C_9H_{18}$" should read --$C_9H_{19}$--;
Item 64, "$C_7H_{16}$" should read --$C_7H_{15}$--;
Item 65, "$C_6H_{23}$" should read --$C_6H_{13}$--;
Item 72, "$C_4H_8$" should read --$C_4H_9$--;
Item 76, "$C_7H_{16}$" should read --$C_7H_{15}$--;
Item 81, "H" should read --My--;
Item 83, "$C_4H_8$" should read --$C_4H_9$--;
Item 93, "$C_6H_{11}$" should read --$C_5H_{11}$--;
Item 101, "$C_4H_8$" should read --$C_4H_9$--.

COLUMN 67

Item 3, "$C_6H_{11}O$" should read -- $C_5H_{11}O$--;
Item 5, "$C_6H_{13}CHF(CH_3)_2O$" should read --$C_6H_{13}^*CHF(CH_3)_2O$-;
Item 8, "$C_6H_{11}$" should read --$C_5H_{11}$--;
Item 15, "$C_6H_{11}$" should read --$C_5H_{11}$--;
Item 17, $C_6H_{13}CHFCH_2O$" should read --$C_6H_{13}^*CHFCH_2O$--;
Item 18, "$C_6H_{11}O$" - Py2 - P23F" should read
  --$C_5H_{11}O$ - Py2 - Ph23F--;
Item 20, "$C_5H_{15}$" should read --$C_7H_{15}$--;
Item 21, "$C_8H_{13}$" should read --$C_6H_{13}$--.
Item 39, "$C_8H_{17}CFHCH_2O$" should read --$C_8H_{17}*CFHCH_2O$--;
Item 43, "$C_9H_{17}$" should read --$C_8H_{17}$--;
Item 48, "$C_6H_{11}$" should read --$C_5H_{11}$--;
Item 57, "$C_5H_{13}$" should read --$C_6H_{13}$--.

COLUMN 69

Item 75, "$C_1H_{17}$" should read --$C_8H_{17}$--;
Item 90, "$C_4H_8$" should read --$C_4H_9$--;
Item 101, "$C_4H_8$" should read --$C_4H_9$--.

COLUMN 87

Under "Device No.,", "4" should read --4'--.

UNITED STATES PATENT AND TRADEMARK OFFICE
CERTIFICATE OF CORRECTION

PATENT NO. : 5,932,136
DATED : August 3, 1999
INVENTOR(S) : MASAHIRO TERADA ET AL.

It is certified that error appears in the above-identified patent and that said Letters Patent is hereby corrected as shown below:

COLUMN 89

Line 7, "was" should read --were--;
Line 26, "fund" should read --found--.

COLUMN 90

Line 6, "crystal" should read --crystal layer--
Line 11, "region" should read --regions--.

COLUMN 91

Line 40, "each" should read --each of--.

COLUMN 92

Line 62, "6cal" should read --$\delta$cal--.

COLUMN 93

Line 55, "fund" should read --found--.

COLUMN 95

Line 38, "--)--$SO_2$--, "should read-- --O--$SO_2$-- --.

UNITED STATES PATENT AND TRADEMARK OFFICE
CERTIFICATE OF CORRECTION

PATENT NO. : 5,932,136
DATED : August 3, 1999
INVENTOR(S) : MASAHIRO TERADA ET AL.

It is certified that error appears in the above-identified patent and that said Letters Patent is hereby corrected as shown below:

<u>COLUMN 108</u>

Line 60, "—$C_{qa}H_{2qa}$—R," should read ---$C_{qa}H_{2qa}-R^3$,--.

Signed and Sealed this

Thirty-first Day of October, 2000

*Attest:*

Q. TODD DICKINSON

*Attesting Officer*   *Director of Patents and Trademarks*